US009690763B1

(12) United States Patent
Lee

(10) Patent No.: US 9,690,763 B1
(45) Date of Patent: Jun. 27, 2017

(54) DISPLAY OF WEBPAGE ELEMENTS ON A CONNECTED COMPUTER

(71) Applicant: Bryant Christopher Lee, Bethesda, MD (US)

(72) Inventor: Bryant Christopher Lee, Bethesda, MD (US)

(*) Notice: Subject to any disclaimer, the term of this patent is extended or adjusted under 35 U.S.C. 154(b) by 326 days.

(21) Appl. No.: 14/536,679

(22) Filed: Nov. 10, 2014

Related U.S. Application Data

(60) Provisional application No. 61/917,260, filed on Dec. 17, 2013.

(51) Int. Cl.
  *G06F 17/00* (2006.01)
  *G06F 17/22* (2006.01)
  *G06F 17/30* (2006.01)

(52) U.S. Cl.
  CPC .... *G06F 17/2247* (2013.01); *G06F 17/30896* (2013.01)

(58) Field of Classification Search
  None
  See application file for complete search history.

(56) References Cited

U.S. PATENT DOCUMENTS

| | | | |
|---|---|---|---|
| 5,629,984 A | 5/1997 | McManis | |
| 6,050,717 A | 4/2000 | Kosugi et al. | |
| 6,181,475 B1 | 1/2001 | Togino et al. | |
| 6,384,983 B1 | 5/2002 | Yamazaki et al. | |
| 7,209,557 B2 | 4/2007 | Lahiri | |
| 7,646,540 B2 | 1/2010 | Dolgoff | |
| 8,139,103 B2 | 3/2012 | McGrew | |
| RE43,362 E | 5/2012 | Yerazunis et al. | |
| 8,212,859 B2 | 7/2012 | Tang et al. | |
| 8,315,876 B2 | 11/2012 | Reuss | |
| 8,376,548 B2 | 2/2013 | Schultz | |
| 8,467,133 B2 | 6/2013 | Miller et al. | |
| 8,482,859 B2 | 7/2013 | Border et al. | |
| 8,502,780 B1 | 8/2013 | Park | |
| 2002/0101988 A1 | 8/2002 | Jones | |
| 2003/0165240 A1 | 9/2003 | Bantz et al. | |
| 2009/0055654 A1 | 2/2009 | Dunn et al. | |
| 2009/0244385 A1 | 10/2009 | Wakayama et al. | |
| 2010/0079585 A1 | 4/2010 | Nemeth et al. | |
| 2010/0085373 A1 | 4/2010 | Miyasaka et al. | |

(Continued)

OTHER PUBLICATIONS

Roberto Baldwin, 6 Glasses with Integrated Displays That You Can Buy Today, Wired Gadget Lab (Apr. 11, 2012) (accessed Mar. 3, 2013) (http://www.wired.com/2012/04/6-glasses-with-integrated-displays-that-you-can-buy-today/).

(Continued)

*Primary Examiner* — Asher Kells

(57) ABSTRACT

A first computer may download one or more webpage files containing code that specifies webpage elements for display on a first computer and second computer (or the second computer only). The first computer may send an indication of the webpage elements to the second computer for the second computer to display, or the first computer may send an indication of certain webpage files to the second computer for the second computer to download and process for display. Also, some webpage files may contain webpage elements for the first computer to display. In some cases, the first and second computer may both display elements of a webpage.

9 Claims, 38 Drawing Sheets

(56) References Cited

U.S. PATENT DOCUMENTS

| | | | |
|---|---|---|---|
| 2011/0018903 A1 | 1/2011 | Lapstun et al. | |
| 2012/0142415 A1 | 6/2012 | Lindsay | |
| 2012/0212499 A1 | 8/2012 | Haddick et al. | |
| 2012/0297292 A1* | 11/2012 | Dougherty | G06F 17/2229 715/238 |
| 2013/0021658 A1 | 1/2013 | Miao et al. | |
| 2013/0044042 A1 | 2/2013 | Olsson et al. | |
| 2013/0103943 A1 | 4/2013 | Hirsch et al. | |
| 2014/0129974 A1 | 5/2014 | Ben-Harrush et al. | |

OTHER PUBLICATIONS

Emilie Jones et al., The Dawn of the "Wearable Technology" Era, CovBrands (Jul. 11, 2013) (accessed Jul. 15, 2013) (http://www.covbrands.com/2013/07/11/the-dawn-of-the-wearable-technology-era/).
Steve Mann, My "Augmediated" Life, IEEE Spectrum (Mar. 1, 2013) (accessed Mar. 3, 2013) (http://spectrum.ieee.org/geek-life/profiles/steve-mann-my-augmediated-life).
David Pogue, Google Glass and the Future of Technology, NY Times (Sep. 13, 2012) (accessed Oct. 14, 2012) (http://pogue.blogs.nytimes.com/2012/09/13/google-glass-and-the-future-of-technology/?_php=true&_type=blogs&_r=0).
Christina Warren, Watch Google's Exhilarating, Sky-Diving Project Glass Demo, Mashable (Jun. 27, 2012) (accessed Oct. 14, 2012) (http://mashable.com/2012/06/27/project-glass-skydive-demo/).
Steve Dent, Google Glass Patent Application Shows Detailed Diagrams, Engadget (accessed Feb. 23, 2013 and Aug. 10, 2014) (http://www.engadget.com/2013/02/21/google-glass-patent-application-diagramsi/).
Darrell Etherington, New Google Glass Patent is the Most Comprehensive Yet for Google's Face-Based Wearable Computer, TechCrunch (Feb. 21, 2013) (accessed Feb. 23, 2013) (http://techcrunch.com/2013/02/21/new-google-glass-patent-is-the-most-comprehensive-yet-for-googles-face-based-wearable-computer/).
Roberto Baldwin, Google Glasses Face Serious Hurdles, Augmented-Reality Experts Say, Wired (Apr. 5, 2012) (accessed Feb. 24, 2013) (http://www.wired.com/2012/04/augmented-reality-experts-say-google-glasses-face-serious-hurdles/).
Owen Thomas, Revealed: The Designer Behind Google Glasses Explains the Top-Secret Project, Business Insider (Jun. 27, 2012) (accessed Feb. 23, 2013) (http://www.businessinsider.com/isabelle-olsson-interview-google-glasses-2012-6).
Steve Mann, 'Eudaemonic Eye': 'Personal Imaging' and Wearable Computing as Result of Deconstructing HCI; Towards Greater Creativity and Self-determination. CHI '97 Extended Abstracts on Human Factors in Computing, pp. 28-29 (1997).
Steve Mann et al., EyeTap Technology for Wireless Electronic News Gathering. ACM Sigmobile Mobile Computing and Communications Review, pp. 19-26 (Oct. 1999).
Felix Tang et al., Seeing Eye to Eye: A Shared Mediated Reality Using EyeTap Devices and the VideoOrbits Gyroscopic Head Tracker. ISMAR '02 Proceedings of the 1st International Symposium on Mixed and Augmented Reality, p. 267 (2002).
Steve Mann, Smart Clothing: The Shift to Wearable Computing. Communications of the ACM vol. 39, No. 8, pp. 23-24 (Aug. 1996).
Danny Goodman, Michael Morrison, Paul Novitski, Tia Gustaff Rayl, JavaScript Bible Seventh Edition, chps. 4, 6, 7, 10, 11, 25, 27, and 32 (Wiley Publishing 2010).
U.S. Appl. No. 14/455,894 to Bryant Lee.
U.S. Appl. No. 14/517,841 to Bryant Lee.

* cited by examiner

```
<!DOCTYPE html>
<html>
  <head>                                                              901
    <title>Car Page</title>
    <meta charset=utf-8>
    <link rel="stylesheet" href="mystyle.css">
  </head>
  <body>
    <div>
      <img src="car.png" id="car_image">
    </div>
    <div>
      <p>Choose your car</p>
      <form id="carform" action="handler.cgi" method="get">
      <p>
        Kind of car:
        <select name="maker" id="maker">
          <option selected="selected" value="Ford">Ford</option>
          <option value="Honda">Honda</option>
        </select>
      </p>
      <p> Doors: <input type="text" name="doors" id="doors"></p>
      <p><input type="submit" value="Submit"></p>
      </form>
      <p>
      Links: <a href="home.html">home</a>,
             <a href="bout.html">about</a>
      </p>
    </div>
```
```
    <!--
      Following code enclosed in <device> </device> tags is
      for execution on the second computer.  Other tag names could also
      be used to identify code for execution on the second computer,
      such as <mobile>, <phone>, <glasses>, or <TV>
    -->
    <device>
    <div>                                                              902
      <p> Choose Tire Type </p>
      <img src="l_arrow.png" onclick="goleft();">
      <img src="normal_tire.png" id="tire_image.png">
      <img src="r_arrow.png" onclick="goright();" id="right">
      <BR>
      <p class="centered">Normal</p>
    </div>
    <div>
      <form id="tireform" action="">
      <p>
      Manufacturer:
      <select name="mfg" id="mfg">
        <option selected="selected" value="Goodyear">Goodyear</option>
        <option value="Firestone">Firestone</option>
      </select>
      </p>
      <p> Special requests: <input type="text" name="sr" id="sr"></p>
```

FIG. 9A

```
   <p>
   <input type="button" value="Submit" onclick="chooseTire()">
   </p>
   </form>                                                          903
   <p>
   Links: <a href="http://www.goodyear.com">Goodyear.com</a>
   </p>
</div>
<script>
   function chooseTire() {                                           904
   var image = document.getElementById("car_image");
   var mfg = document.getElementById("mfg");
   var mfgVal = mfg.options[mfg.selectedIndex].value;

/*
     Another way to do the following is:
     image.src = mfgVal + "_car.png";
   */ var parent = image.parentNode;
   var newImage = new Image();
   newImage.src = mfgVal + "_car.png";

parent.removeChild(image);
   parent.appendChild(newImage);
   }
</script>
</device>
</body>
</html>
```

FIG. 9B

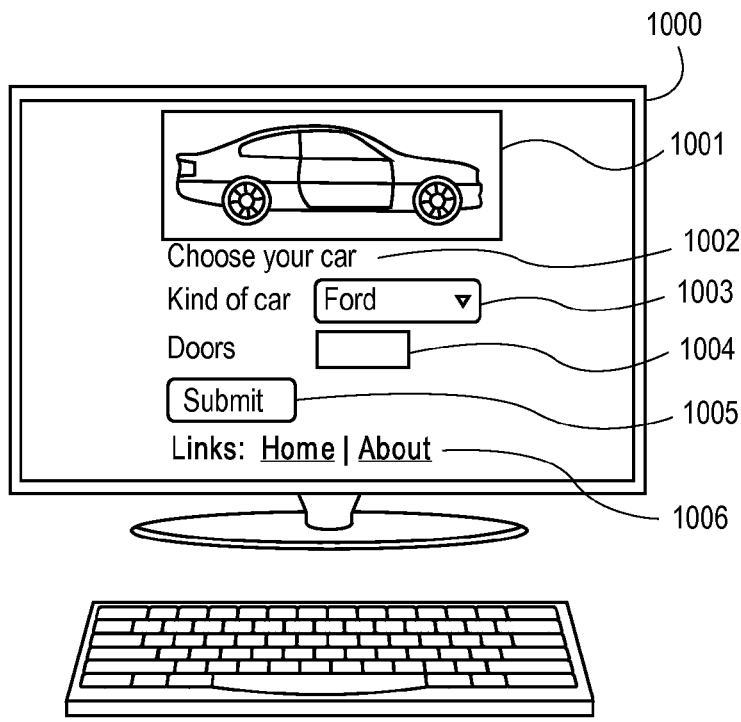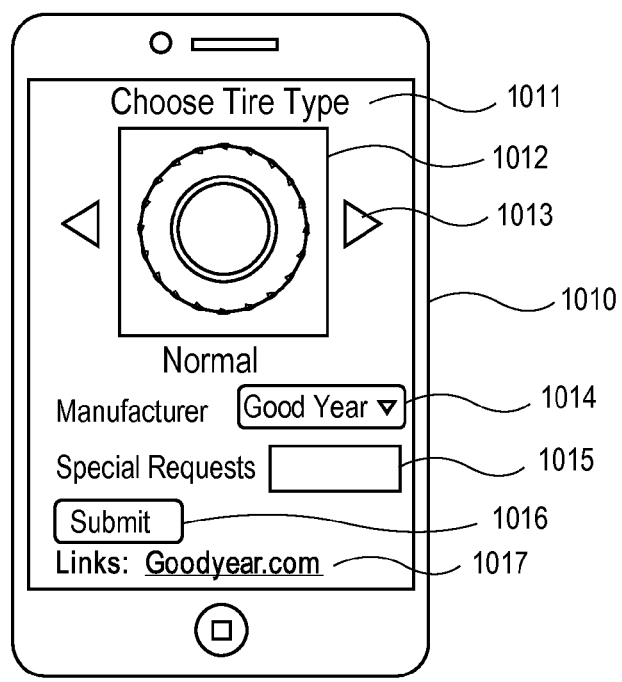
FIG. 10A

```
1    var parent = image.parentNode;        ←——— Block
2    var newImage = new Image();
3    newImage.src = mfgVal + "_car.png";
4
5    parent.removeChild(image);
6    parent.appendChild(newImage);
```

FIG. 13A

```
1    var parent = image.parentNode;        ←——— RPC Call
2    var newImage = new Image();                    ↓
3    newImage.src = mfgVal + "_car.png";
4
5    parent.removeChild(image);            ←——— Block
6    parent.appendChild(newImage);
```

FIG. 13B

```
1    var parent = image.parentNode;        ←——— RPC Call
2    var newImage = new Image();
3    newImage.src = mfgVal + "_car.png";
4
5    parent.removeChild(image);
6    parent.appendChild(newImage);
```

FIG. 13C

```
1    var parent = image.parentNode;        ←——— Bind
2    var newImage = new Image();
3    newImage.src = mfgVal + "_car.png";
4
5    parent.removeChild(image);            ←——— RPC Call
6    parent.appendChild(newImage);
```

FIG. 13D

```
1  <script>
2    window.onload = start;
3
4    function start () {
5      var image = document.getElementById("tire_image");
6      var right = document.getElementById("right");
7
8      var parent = image.parentNode;
9      var newImage = new Image();
10     newImage.src = "snow_tire.png";
11
12     parent.removeChild(image);
13     parent.insertBefore(newImage,right);
14   }
15 </script>
```

FIG. 14

```
<!DOCTYPE html>
<html>
  <head>                                                              1501
    <title>Car Page</title>
    <meta charset=utf-8>
    <link rel="stylesheet" href="mystyle.css">
  </head>
  <body>
    <div>
      <img src="car.png" id="car_image">
    </div>
    <div>
      <p>Choose your car</p>
      <form id="carform" action="handler.cgi" method="get">
      <p>
        Kind of car:
        <select name="maker" id="maker">
          <option selected="selected" value="Ford">Ford</option>
          <option value="Honda">Honda</option>
        </select>
      </p>
      <p> Doors: <input type="text" name="doors" id="doors"></p>
      <p><input type="submit" value="Submit"></p>
      </form>
      <p>
      Links: <a href="home.html">home</a>,
             <a href="bout.html">about</a>
      </p>
    </div>

<!--
      Following code linked in <device> </device> tags is
      for execution on the second computer.  Other tag names could also
      be used to identify code for execution on the second computer,
      such as <mobile>, <phone>, <glasses>, or <TV>
    -->

<device src="second_display.html"></device>          1502

</body>
</html>                                    1500
```

FIG. 15A

```html
<!DOCTYPE html>
<html>
  <head>                                                    1510
  </head>
  <body>
   <div>
      <p> Choose Tire Type </p>
      <img src="l_arrow.png" onclick="goleft();">
      <img src="normal_tire.png" id="tire_image.png">
      <img src="r_arrow.png" onclick="goright();" id="right">
      <BR>
      <p class="centered">Normal</p>
    </div>
    <div>
      <form id="tireform" action="">
      <p>
      Manufacturer:
      <select name="mfg" id="mfg">
        <option selected="selected" value="Goodyear">Goodyear</option>
        <option value="Firestone">Firestone</option>
      </select>
      </p>
      <p> Special requests: <input type="text" name="sr" id="sr"></p>
      <p>
      <input type="button" value="Submit" onclick="chooseTire()">
      </p>
      </form>
      <p>
      Links: <a href="http://www.goodyear.com">Goodyear.com</a>
      </p>
    </div>
    <script>
      function chooseTire() {
      var image = document.getElementById("car_image");
      var mfg = document.getElementById("mfg");
      var mfgVal = mfg.options[mfg.selectedIndex].value;

/*
        Another way to do the following is:
        image.src = mfgVal + "_car.png";
      */ var parent = image.parentNode;
      var newImage = new Image();
      newImage.src = mfgVal + "_car.png";

parent.removeChild(image);
      parent.appendChild(newImage);
      }
    </script>
   </body>
</html>
```

FIG. 15B

```
<!DOCTYPE html>
<html>
```
```
<head>
 <title>Car Page</title>
 <meta charset=utf-8>                                    1601
 <link rel="stylesheet" href="mystyle.css">
</head>
<body>
 <div>
   <img src="car.png" id="car_image">
 </div>
 <div>
   <p>Choose your car</p>
   <form id="carform" action="">
      <p>
        Kind of car:
        <select name="maker" id="maker">
          <option selected="selected" value="Ford">Ford</option>
          <option valuc="Honda">Honda</option>
        </select>
      </p>
      <p> Doors: <input type="text" name="doors" id="doors"></p>
      <p><input type="submit" value="Submit"></p>
   </form>
   <p>
      Links: <a href="home.html">home</a>, <a href="bout.html">about</a>
   </p>
 </div>
```

```
<!-- The following section is script -->
<script>                                                 1602
  window.onload = start;

function start() {
  var devicesList = document.getAvailableDevices();
  var glasses = devicesList[0];

var paragraph = document.createElement("p");
  paragraph.setAttribute('class', 'centered');
  var text = document.createTextNode("Choose Tire Type");
  paragraph.appendChild(text);
```

FIG. 16A

```
//
// May also use glasses.body.appendChild(paragraph)
//
glasses.appendChild(paragraph);

paragraph.appendChild(document.createTextNode("!"));             1603 var newImage = new Image();
newImage.src = "normal_tire.png";

//
// May also use glasses.body.appendChild(newImage)
//
glasses.appendChild(newImage);

/*
        Other webpage elements may be added to
        a second computer in a similar manner
        with calls to appendChild or other functions
*/

}
</script>
</body>
</html>
```

FIG. 16B

```
<!DOCTYPE html>
<html>
 <head>                                                    1611
  <title>Car Page</title>
  <meta charset=utf-8>
  <link rel="stylesheet" href="mystyle.css">
 </head>
 <body>
 <div>
   <img src="car.png" id="car_image">
 </div>
 <div>
  <p>Choose your car</p>
  <form id="carform" action="">
     <p>
       Kind of car:
       <select name="maker" id="maker">
         <option selected="selected" value="Ford">Ford</option>
         <option value="Honda">Honda</option>
       </select>
     </p>
     <p> Doors: <input type="text" name="doors" id="doors"></p>
     <p><input type="submit" value="Submit"></p>
  </form>
  <p>
      Links: <a href="home.html">home</a>, <a href="bout.html">about</a>
  </p>
 </div>
```

```
<!-- The following section is script -->
<script src="external.js"> </script>                       1612
```

```
 </body>
</html>
```

FIG. 16C

```html
<!DOCTYPE html>
<html>
  <head>
    <title>Car Page</title>
    <meta charset=utf-8>
    <link rel="stylesheet" href="mystyle.css">
  </head>
  <body>
                                                                    1700
   <device id="the_device">
   <div>
      <p> Choose Tire Type </p>
      <img src="l_arrow.png" onclick="goleft();">
      <img src="normal_tire.png" id="tire_image.png">
      <img src="r_arrow.png" onclick="goright();" id="right">
      <BR>
      <p class="centered">Normal</p>
    </div>
    <div>
      <form id="tireform" action="">
      <p>
      Manufacturer:
      <select name="mfg" id="mfg">
        <option selected="selected" value="Goodyear">Goodyear</option>
        <option value="Firestone">Firestone</option>
      </select>
      </p>
      <p> Special requests: <input type="text" name="sr" id="sr"></p>
      <p>
      <input type="button" value="Submit" onclick="chooseTire()">
      </p>
      </form>
      <p>
      Links: <a href="http://www.goodyear.com">Goodyear.com</a>
      </p>
    </div>
    <script>
      window.onload = start;                                        1701 function start() {
      var myDevice = document.getElementById("the_device");

var newImage = new Image();
      newImage.src = "new_image.png";

myDevice.appendChild(newImage);
      }
    </script>
   </device>

</body>
</html>
```

FIG. 17

```
<!DOCTYPE html>
<html>                                                    1800
  <head>
    <title>Car Page</title>
    <meta charset=utf-8>
    <link rel="stylesheet" href="mystyle.css">
  </head>
<viewset>
  <view name="first_computer" src="first_display.html" target=this>
  <view name="second_computer" src="second_display.html" target=device>
</viewset>
</html>
```

FIG. 18A

```
<!DOCTYPE html>
<html>
  <head>
    <title>Car Page</title>
    <meta charset=utf-8>
    <link rel="stylesheet" href="mystyle.css">
  </head>
  <body>
    <div>
      <img src="car.png" id="car_image">      1801
    </div>
    <div>
      <p>Choose your car</p>
      <form id="carform" action="handler.cgi" method="get">
      <p>
        Kind of car:
        <select name="maker" id="maker">
          <option selected="selected" value="Ford">Ford</option>
          <option value="Honda">Honda</option>
        </select>
      </p>
      <p> Doors: <input type="text" name="doors" id="doors"></p>
      <p><input type="submit" value="Submit"></p>
      </form>
      <p>
      Links: <a href="home.html">home</a>,
             <a href="bout.html">about</a>
      </p>
    </div>
  </body>
</html>
```

FIG. 18B

Exemplary Code:
document.getAvailableDevices();

document.getDevice();

document.getElementById("the_device");

document.device;

1900

Exemplary Code:
window.getAvailableDevices();

window.getDevice();

window.getElementById("the_device");

window.device;

1901

1902

1903

DISPLAY OF WEBPAGE ELEMENTS ON A CONNECTED COMPUTER

CROSS-REFERENCE TO RELATED APPLICATIONS

This application claims the benefit of U.S. Provisional Patent Application No. 61/917,260, filed Dec. 17, 2013, which is hereby incorporated by reference in its entirety.

FIELD OF THE INVENTION

The present invention relates generally to displaying webpages on a computer system.

BACKGROUND

The Internet is a system of interconnected computer networks, which allows computer systems on the Internet to communicate with each other. Computers may communicate according to certain services such as electronic mail and the World Wide Web (WWW or "the web"). The WWW service is a system of interlinked hypertext documents. Documents on the web can be viewed with web browsers or other web-enabled applications. Web pages, text, images, videos, and other multimedia are all types of media that can be accessed in a web browser and other web-enabled applications. To view a document on the web, a client computer would usually send a request to a web server that is hosting web content. The client computer may identify the requested resource using an identifier such as a Uniform Resource Locator (URL). The web server would respond to the request by sending the appropriate document to the client computer. The client computer can display the document in a web browser or other web-enabled application. Web pages can be specified in many formats and languages. Sometimes, the web pages may include scripts, which are executable code. Web pages may also be backed by a database. Access to a web page may cause code to be executed on the web server and may cause accesses to a database. Web applications may also be Rich Internet Applications (RIAs) that operate on a software platform such as Flash or Silverlight. An RIA may require installation of the software platform on the client computer, for example by browser plug-in, in order to function. Other RIAs are implemented using built-in browser functionality. HTML5 and Javascript may be used to implement RIAs and are commonly built into browsers.

A problem faced in current computer systems is that a webpage downloaded on to a first computer by a web browser or other computer application is displayed on that computer only. What is lacking is a technology for displaying webpage elements downloaded by the first computer on a second computer that is connected to the first computer. It would be desirable to allow webpage elements downloaded by a first computer to be displayed on a second computer. It would also be desirable to allow some portions of a single webpage to be displayed on the first computer and other portions of the same webpage to be displayed on the second computer.

For example, currently, if a webpage is downloaded by a laptop, the webpage is displayed on the laptop. If the user has a second computer connected to the laptop (e.g., wirelessly or by USB cable), such as a mobile phone, it may be desirable for a webpage to specify that some elements be displayed on the laptop and other elements be displayed on the mobile phone. Sometimes it may be desirable that all webpage elements be displayed on the mobile phone. The technologies described herein enable these and other advantages.

SUMMARY OF THE INVENTION

In some embodiments, a first computer may download a webpage file containing code that specifies webpage elements for display on a first computer and second computer (or the second computer only) that are connected by a communications channel. The first computer may send an indication of the webpage elements to the second computer for the second computer to display. In some cases, an indication of webpage elements may comprise code. Also, the webpage file may contain webpage elements for the first computer to display. The first and second computer may both display elements of a webpage.

In some embodiments, a webpage includes script code for displaying webpage elements on a second computer.

In some embodiments, script code executing on a second computer accesses objects on a first computer. Also, in some embodiments, script code executing on a first computer accesses objects on a second computer.

In some embodiments, a second computer sends an indication to the first computer when it has finished loading webpage elements, and the first computer triggers a finished loading event when both the first and second computer have finished loading webpage elements.

BRIEF DESCRIPTION OF THE DRAWINGS

FIGS. 9A-B show an exemplary HTML code listing containing code for displaying webpage elements on a first and second computer.

FIGS. 10A-B shows a display of a webpage having elements on a first and second computer.

FIGS. 13A-D illustrates making RPC calls in script code to access objects on another computer.

FIG. 14 illustrates exemplary script code that may execute on a first computer and access an object on a second computer.

FIGS. 15A-B shows an exemplary HTML code listing containing code for displaying webpage elements on a first and second computer.

FIGS. 16A-C shows an exemplary code listing including script code for displaying webpage elements on a second computer.

FIG. 17 illustrates exemplary code for displaying webpage elements on a second computer.

FIGS. 18A-B shows exemplary code using a viewset syntax for displaying webpage elements on a first and second computer.

DETAILED DESCRIPTION

I. Overview and Definitions

Figure 1A:
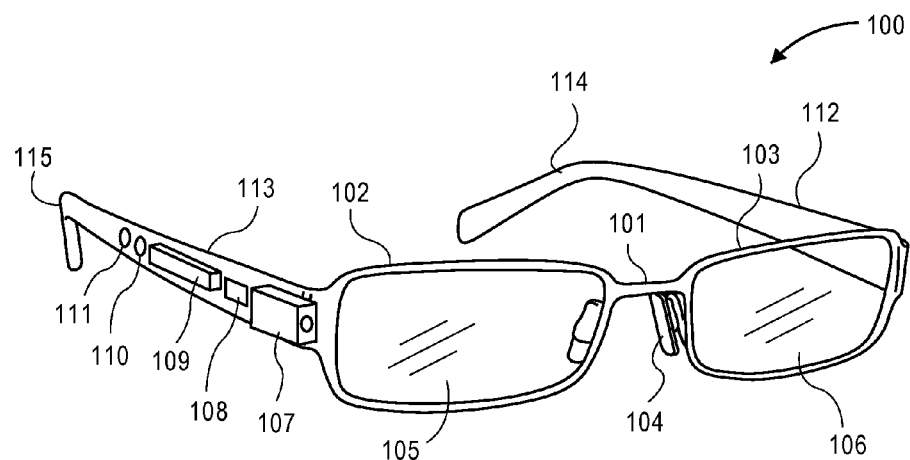
FIGS. 1A-B and FIGS. 2A-C illustrate exemplary wearable computing devices.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment. Further, some steps may be performed in part by one component in a network and other parts of the step may be performed by other components on the network. All method steps should be considered optional unless explicitly stated otherwise.

Embodiments of the invention may comprise one or more computers. Embodiments of the invention may comprise software and/or hardware. Some embodiments of the invention may be software only and may reside on hardware. A computer may be special-purpose or general purpose. A computer or computer system is defined to include without limitation personal computers, desktop computers, laptop computers, mobile devices, cellular phones, smart phones, PDAs, pagers, multi-processor-based devices, microprocessor-based devices, programmable consumer electronics, tablets, minicomputers, mainframe computers, server computers, microcontroller-based devices, DSP-based devices, embedded computers, wearable computers, electronic glasses, computerized watches, devices performing computations on a processor or CPU, and the like. A computer or computer system is further defined to include distributed systems, which are systems of multiple computers (of any of the aforementioned kinds) that interact with each other, possibly over a network, to achieve a goal (a goal includes performance of a method). Distributed systems may include clusters, grids, shared memory systems, message passing systems, and so forth. Thus, embodiments of the invention may be practiced in distributed environments involving local and remote computer systems. In a distributed system, aspects of the invention may reside on multiple computer systems.

Embodiments of the invention may comprise computer-readable media having computer-executable instructions or data stored thereon. A computer-readable media is physical media that can be accessed by a computer. It may be non-transitory. Examples of computer-readable media include, but are not limited to, RAM, ROM, hard disks, flash memory, DVDs, CDs, magnetic tape, and floppy disks.

Computer-executable instructions comprise, for example, instructions which cause a computer to perform a function or group of functions. Some instructions may include data. Computer executable instructions may be binaries, object code, intermediate format instructions such as assembly language, source code, byte code, scripts, and the like. Instructions may be stored in memory, where they may be accessed and/or executed by a processor. Memory is storage for instructions or data. Memory includes temporary, semi-permanent, and permanent storage.

A computer program is software that comprises multiple computer executable instructions. The term "computer program" includes any sequence of instructions. The term includes, for example, a software module. The term "computer program" is not limited to "separate" or "self-contained" computer programs.

Computer systems may have a processor, memory, a display, and peripherals like a keyboard, mouse, a USB port, a wireless communications unit, a network card, a Bluetooth controller, and so forth. The memory of a computer system may store instructions for execution.

A database is a collection of data and/or computer hardware used to store a collection of data. It includes databases, networks of databases, and other kinds of file storage, such as file systems. No particular kind of database must be used. The term database encompasses many kinds of databases such as hierarchical databases, relational databases, post-relational databases, object databases, graph databases, flat files, spreadsheets, tables, trees, and any other kind of database, collection of data, or storage for a collection of data.

A network comprises one or more data links that enable the transport of electronic data. Networks can connect computer systems. The term network includes local area network (LAN), wide area network (WAN), telephone networks, wireless networks, intranets, the Internet, and combinations of networks.

Some embodiments of the invention relate to wearable computers such as head-mounted displays. Head-mounted displays include glasses that have electronic components. Such glasses may be termed electronic glasses, smart glasses, or referred to by other similar terms. Head-mounted displays also include hats, helmets, and other displays that are substantially mounted on a user's head. Head-mounted displays may include a computer, such as a processor and memory.

In this patent, the term "transmit" includes indirect as well as direct transmission. A computer X may transmit a message to computer Y through a network pathway including computer Z. Similarly, the term "send" includes indirect as well as direct sending. A computer X may send a message to computer Y through a network pathway including computer Z. Furthermore, the term "receive" includes receiving indirectly (e.g., through another party) as well as directly. A computer X may receive a message from computer Y through a network pathway including computer Z.

Similarly, the terms "connected to" and "coupled to" include indirect connection and indirect coupling in addition to direct connection and direct coupling. These terms include connection or coupling through a network pathway where the network pathway includes multiple elements. "Connection" includes communication connections and not just physical connections. For example, two components can be "connected" by wireless connection even though not physically connected.

The term "present" encompasses various mechanisms for causing the display of information. "Present" includes actions by a local computer to cause the display of information, such as calling a function that causes information to be displayed to the user at the local computer. "Present" also includes actions by a remote computer connected to the local computer over a network that cause information to be displayed on the local computer; for instance, "present" includes the remote computer sending a web page to the local computer that the local computer displays and "present" also includes the remote computer sending data or instructions to the local computer that causes the local computer to display information. Thus, a remote computer may "present" information, data, documents, web pages, and so forth on a local computer.

The term "display" likewise includes actions by a local computer to directly display information and also actions by a remote computer to indirectly display information via the local computer.

To perform an action "based on" certain data or to make a decision "based on" certain data does not preclude that the action or decision may also be based on additional data as well. For example, a computer performs an action or makes a decision "based on" X, when the computer takes into account X in its action or decision, but the action or decision can also be based on Y. As a real world example, to perform an action, say providing an umbrella, "based on" the fact that it is raining or make a decision "based on" the fact that it is raining does not preclude the fact that the action or decision may also be based on additional information, such as the fact that it is Monday and the user must go to work rather than just staying home. The term "based on" should be given a broad meaning because it can be very difficult to enumerate all possible factors that may influence an entity's actions or decisions.

In this patent, "computer program" means one or more computer programs. A person having ordinary skill in the art would recognize that single programs could be rewritten as multiple computer programs. Also, in this patent, "computer programs" should be interpreted to also include a single computer program. A person having ordinary skill in the art would recognize that multiple computer programs could be rewritten as a single computer program.

The term computer includes one or more computers. The term computer system includes one or more computer systems. The term computer server includes one or more computer servers. The term computer-readable medium includes one or more computer-readable media. The term database includes one or more databases.

The above definitions should also be applied to common variations of the above terms. For example, "presenting," "presented," and other variations of the term "present" should be construed consistently with the above definition of "present." Likewise for "display," "transmit," "send," "receive," and other relevant terms, including the terms listed in the above paragraphs.

II. Exemplary Environments

This section describes exemplary environments where some embodiments of the invention may operate.

In an exemplary usage, a user has a first computer and a second computer available, which are connected by a communications channel. The terms "connected" or "communicably connected" may be used to describe the relationship of the first computer and second computer. The communications channel may be wired or wireless, and it may be encrypted or unencrypted. The first computer may receive a request from the user to access a webpage. This request may be received via a web browser or other web-enabled application of the first computer, including without limitation via the address field of the web browser (or other application) or by way of the user clicking on a hyperlink in the web browser (or other application). The first computer may download the webpage from a web server that is connected to the first computer over a network, such as the Internet. The webpage may comprise computer code such as HTML, Javascript, and so forth.

The first computer may parse the computer code of the webpage and determine that a portion of the code specifies webpage elements that are to be displayed on a second computer. The first computer may send to the second computer system an indication of webpage elements for display on the second computer system. An indication of webpage elements may be computer code specifying the webpage elements. Thus, in an exemplary implementation, the first computer sends an indication of the portion of computer code for displaying webpage elements on the second computer to the second computer (e.g., without limitation, the indication of a portion of code may be the code itself or a representation of the code). The second computer may then display the webpage elements specified by the indication of webpage elements it receives from the first computer. For example, if the indication of webpage elements comprises code, the second computer may interpret the code and display webpage elements specified by the code. The second computer may perform the displaying function through a web browser or other application.

The terms "computer" and "computer system" were already defined above in section I, and the first computer and second computer may be any type of "computer" or "computer system" as previously defined. A few exemplary usages will be further described herein, but such usages are exemplary only. It is emphasized that the "first computer" may be any computer and the "second computer" may be any computer.

For clarity, the "first computer" will also sometimes be referred to as the "client computer" (referring to its client relationship to the server), and the "second computer" will also sometimes be referred to as the "connected computer"

(referring to its connection to the "first computer"). The term "device" or "computerized device" may also be used and means "computer."

The term "mobile device," as used in this patent, refers to computers that are portable. Electronic glasses, mobile phones, tablets, computerized watches, laptops, and wearable computers are (non-limiting) examples of "mobile devices."

Figure 6:
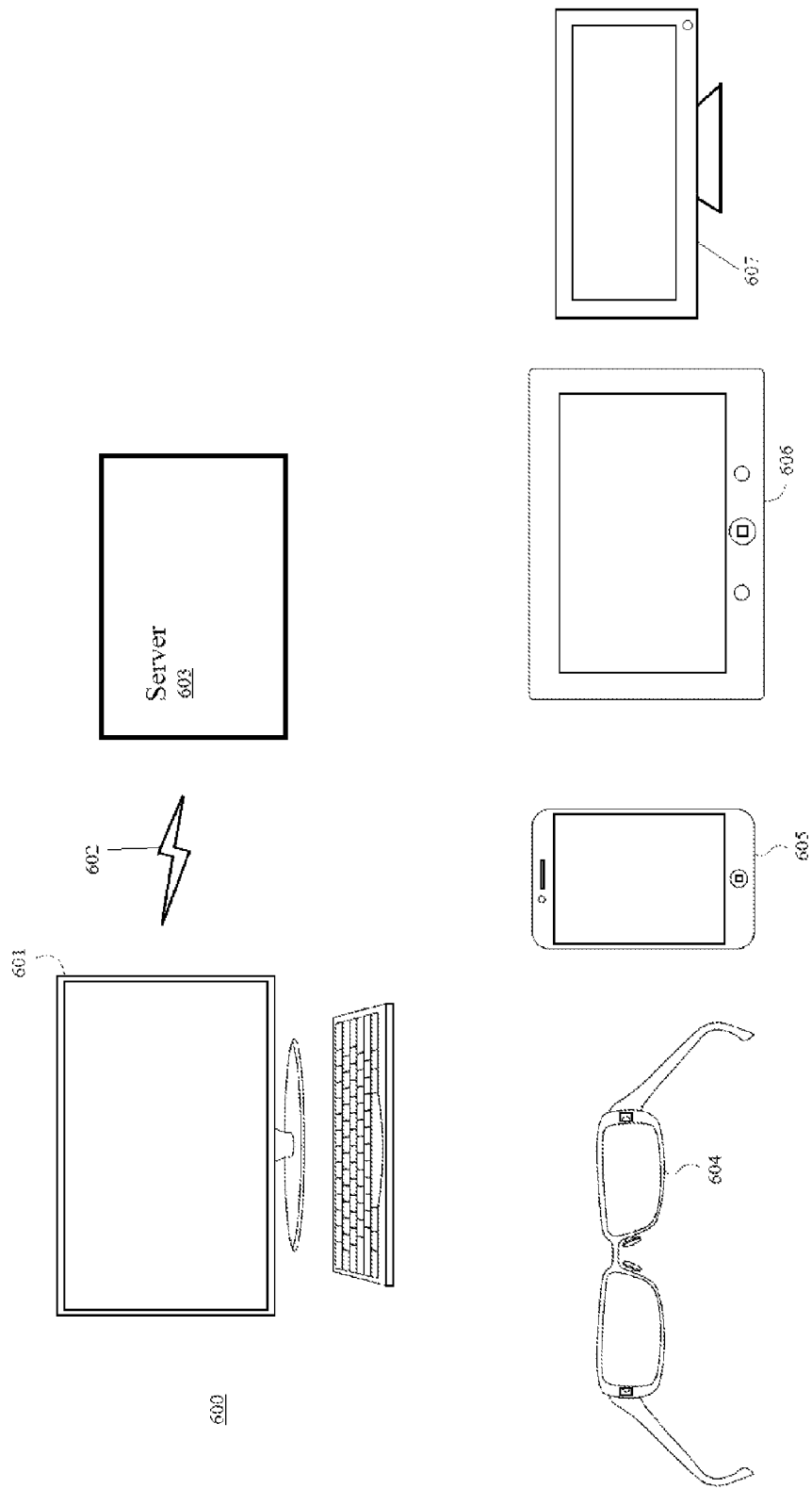
FIG. 6 illustrates an exemplary environment where some embodiments may be practiced.

FIG. 6 illustrates a few exemplary usages of embodiments of the invention. Exemplary environment 600 includes a first computer 601 connected over a network connection 602 to a server 603. A second computer such as electronic glasses 604, mobile phone 605, tablet 606, or television 607 may be connected to the first computer 601 over a wireless or wired connection. Although FIG. 6 shows several examples of a second computer 604, 605, 606, 607 connected to the first computer, exemplary usage may be made with just one of these devices connected to the first computer. For example, an exemplary usage may involve just electronic glasses 604 connected to the first computer 601, just mobile phone 605 connected to the first computer 601, just tablet 606 connected to the first computer 601, or just television 607 connected to the first computer 601. However, exemplary environments may also include multiple devices connected to the first computer 601 as illustrated in FIG. 6. Further, there may be multiple devices of the same type connected to the first computer 601, such as multiple mobile phones 605 connected to the first computer.

Also, although FIG. 6 only illustrates the first computer 601 connected to the server 603 over a network connection 602, the second computer 604, 605, 606, 607 may also be connected or connectable to the server 603. For example, in one embodiment, both the first computer and second computer are connected to the Internet, and the server 603 is accessible over the Internet.

The following paragraphs include additional description about electronic glasses, mobile phones, tablets, televisions, and other computers.

FIG. 1A shows a perspective drawing of an exemplary wearable computer system 100 in the form of electronic glasses. Electronic glasses may also be referred to as smart glasses, or just glasses. The following description is exemplary only and electronic glasses may come in a variety of forms. The exemplary glasses 100 include a nose portion 101 that is configured to be worn above a user's nose. The nose portion 101 can also be called a center frame portion. The padded arms 104 are configured to rest on the user's nose to support the glasses 100. The arms 104 may be adjustable, for example on hinges, so that the user can configure the height of the glasses on her face and also achieve a comfortable fit. In some cases the arms 104 are made of a bendable material, such as soft plastic, so that the arms can be configured in many possible positions. The pads may be attached to the arms 104 on a hinge, thereby allowing the pads themselves to be adjusted.

The nose portion 101 may be connected to a right brow portion 102 that may be positioned over the user's right brow. The right brow portion 102 may comprise a frame for holding a right lens 105. Similarly, a left brow portion 103 may be configured to be positioned over a user's left brow. The left brow portion may comprise a frame for holding a left lens 106. In some cases, the right brow portion 102 may not extend completely around the lens 105. For example, it may comprise only a top portion over a user's brow but no lower portion. Alternatively, the frame portion 102 may only comprise a lower portion around the bottom of the lens 105, but no upper portion. Similar configurations are possible for the left frame portion 103. The frame portions 101, 102, and 103 may together comprise the front frame of the glasses.

Side arms 112 and 113 may extend away from the frame portions 101, 102, and 103. The side arms may extend towards the user's ears. The ear portions 114 and 115 may be configured to rest on the user's ears. The ear portions 114 and 115 may support some of the weight of the glasses.

The side arms 112 and 113 may be connected to the front frame of the glasses by a hinge. The hinge may allow the side arms to be folded in towards the front frame for storage, such as in a glasses case. Also, there may be a hinge allowing the side arms to be moved up and down (terms of relative direction such as up and down are used relative to the position wherein the glasses are configured to be worn, e.g. up is towards the top of a user's head, and down is towards the user's feet; however, this usage is non-limiting and the glasses can of course be used in various orientations). The side arms may be attached to the front face by a fastener. A fastener is any kind of fastening device or material such as a screw, glue, hook and loop fasteners, magnets, and so on. Also, in some embodiments, the side arms may be made from a single piece with the front face.

The frame can be made of any desirable material such as metal, plastic, and so forth. The frame elements such as 101, 102, 103, 112, and 113 may be made of a solid material. Or some or all elements may be hollow to allow placing wiring or other components inside.

The lenses 105, 106 may comprise a display to allow the display of images generated or produced by a computer. The lenses may be see-through so that the user can see through the lenses into the environment, while also being able to view computer-generated images. The lenses may be generally transparent, meaning that they let enough light through that the user can see through the lenses, but do not necessarily let all light through (though they may). The lenses may be prescription, that is corrective to a user's vision, or non-prescription. The lenses may be sunglasses or non-sunglasses. The lenses may be made out of a variety of materials including, without limitation, glass and plastic.

The electronic glasses may comprise a camera 107 for capturing images. The camera 107 is shown in a front-facing direction, but the camera can also be placed in other orientations, such as up, down, left, right, or backwards. Also, a plurality of cameras can be included so that images can be taken from multiple viewpoints. Also, a camera may be attached to the left portion of the glasses so that images can be taken so that stereoscopic imagery may be created. The camera can be a still camera and/or can also be a video camera. The camera may be low resolution or may be high resolution. In some cases, the camera may capture imagery and/or video in high definition (HD).

The electronic glasses may comprise a housing 109 for a processor or other computer components. The size and shape of the housing 109 shown in diagram 1A is exemplary only. A variety of housing sizes and shapes could be used. The housing may be smaller or larger. In some embodiments, it may be desirable to have a much larger housing in order to house more components in order to provide more functionality (e.g., 2×5×0.5 inches). Also multiple housings can be used. For example, an embodiment is contemplated wherein there is at least one housing on the side arm 112 and at least one housing on the side arm 113.

A processor may be present in the electronic glasses. The processor may be any computing device for executing instructions such as a microprocessor, microcontroller, digital signal processor (DSP), or graphics processing unit (GPU). In some cases, the electronic glasses may have multiple processors. For example, it is often desirable to have a general purpose processor in addition to a DSP and also possibly a GPU. The processor may be cooled by a heatsink or fan. The external housing 109 is optional. The processor and other circuitry may be disposed inside the frame itself. For example, this may allow the processor and circuitry to be substantially not noticeable. The processor and circuitry may be inside either side arm or the front frame. The electronic glasses may include sensors such as an accelerometer and gyroscope. The electronic glasses may include a global positioning system (GPS) unit for obtaining GPS location data. The electronic glasses may include other sensors such as an altimeter, inclinometer, a speedometer/odometer, a laser rangefinder, and/or a magnetometer.

Various controls may also be included on the glasses 100. For example, the glasses may include a touchpad 108. The touchpad may detect the user touching the pad, or user movements in a planar or parallel motion on the surface of the pad. Also, the pad may sense changes in pressure so that it would be able to determine that the user is pushing down on the pad. A variety of touchpad types exist such as resistive touchpads, surface acoustic wave touchpads, capacitive touchpads, infrared grid, infrared acrylic projection, optical imaging, dispersive signal technology, and acoustic pulse recognition. Any of a variety of touchpad types may be used, including but not limited to the aforementioned types. The touchpad may have a raised, indented, or roughened surface to provide tactile feedback to the user. The touchpad may have different textures at the edges so as to alert that user that her finger is on the edge of the touchpad. Also, the touchpad may have a raised edge, or a sunken edge, to similarly provide feedback to the user. The glasses 100 may have multiple touchpads, each of which may be operated independently and provide independent inputs to the processor. The touchpads may be located on the sidearms, on the front frame, or on other portions of the glasses.

The exemplary glasses 100 have also been shown with two buttons 110 and 111. Buttons are an input mechanism that can be used to allow control of the device. For example, a button could be used to turn on or turn off the device. Buttons can also be used for volume control or to change brightness, contrast, or sharpness of the display. The glasses may also have other input mechanisms such as switches and scroll wheels (not shown).

The glasses may have a power supply, such as a battery, which in some embodiments may be rechargeable. Also, if a rechargeable battery is used, it may have a port for insertion of a plug that will allow charging from a socket, such as a wall socket or USB port. In one embodiment, the battery may located in one of the ear portions 114 or 115, which may help balance the glasses to place more weight on the user's ear and less weight on the user's nose. Also, in some cases the glasses may be recharged using wireless energy, rather than a wired connection. One method of passing energy wirelessly is the use of induction. An electric current can be pushed through a first coil to create a magnetic field. The magnetic field may produce an electronic current in a second coil that is in proximity to the first coil. Thereby, energy is wirelessly induced in the second coil.

Figure 1B:
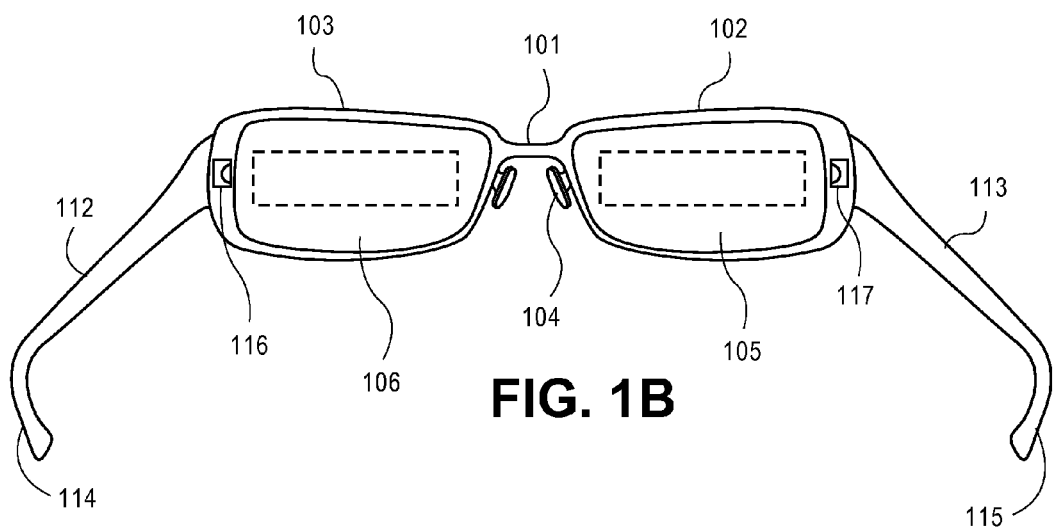

FIG. 1B shows another view of the exemplary head mounted display 100. Projectors 116 and 117 allow the creation and display of computer generated imagery in the lenses 105 and 106. A wide variety of mechanisms for displaying images in a see-through lens can be used. Some examples are described later in this patent. Some techniques use a light pipe or optical wave guide to transfer light from the projector into the lens and then use reflective or semi-reflective material to transmit light to the user's eye. Also, while the lenses in this example have a computer display area that is less than the area of the entire lens, in other embodiments the computer display area can cover substantially the entire lens.

In other embodiments it is also possible to display images by including a transparent or semi-transparent display in the lenses 105 and/or 106 themselves. For example an electroluminescent or liquid crystal display (LCD) could be placed in the lenses. Further, it is also possible to use a laser or LED source and scanning system to draw a raster display on the user's eye. Such systems are often referred to as a virtual retinal display (VRD). The Brother AiRScouter is a current head-mounted display that uses a VRD. The AiRScouter is one example of a HMD that can be used with the hardware and/or software applications described in this patent. In this patent, the term "display" or "presentation" includes a VRD even though it does not create an external display and instead creates an image only on the user's eye.

Figure 2A:
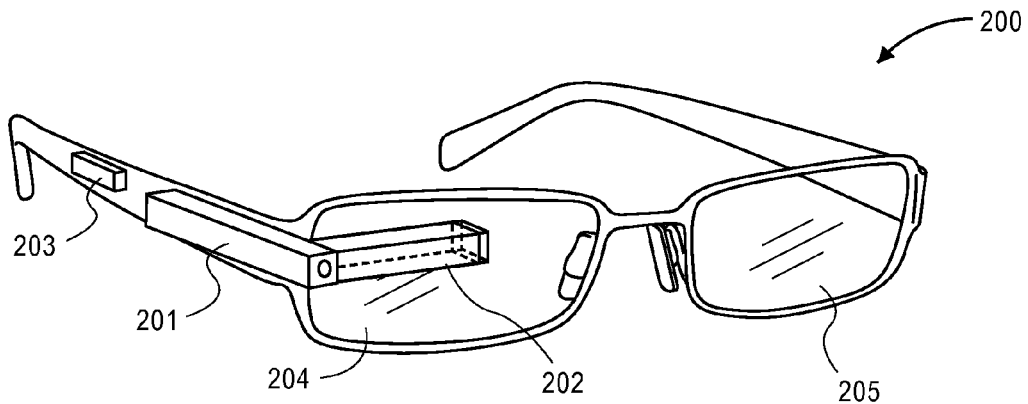

FIG. 2A shows another exemplary HMD 200 that can embody some aspects of the invention. The HMD 200 may include two lenses 204 and 205 that optionally are normal lenses, in other words lacking electronics or optical wave guides. The HMD 200 may include a housing 203 for a processor and circuitry and a camera 201. It may also include a display 202 that may extend from the side of the glasses into the user's view. In one embodiment, the display 202 accepts projected images from a projector and displays the images to the user via a reflective or semi-reflective material such as a beam splitter. The display 202 may be connected to a projector via an optical connection such as an optical wave guide or light pipe. The display 202 may be generally transparent so that the user can see the environment through the display 202. Also, the display 202 could be semi-transparent or translucent.

The display 202 may be on an adjustable arm that can be extended laterally (e.g., left to right or vice versa) or moved straight up or straight down. Also, arm may be on a hinge so that the display 202 may be rotated around an axis in a clockwise or counter-clockwise direction from the perspective of the user.

Figure 2B:
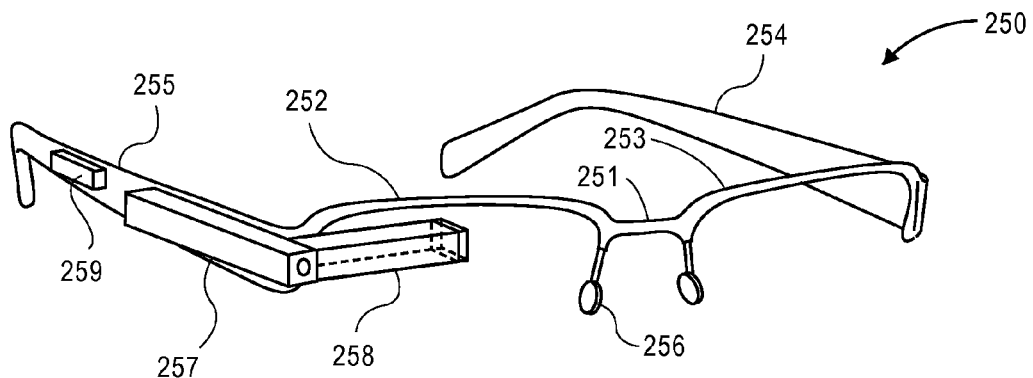

FIG. 2B shows another exemplary HMD 250. The HMD 250 lacks lenses. It has a center frame portion 251 and a left brow portion 252 and right brow portion 203. The center frame portion is configured to be disposed above the user's nose. The left brow portion is configured to be disposed over the user's left brow and the right brow portion is configured to be disposed over the user's right brow. The nose arms 256 may secure the frame to the user's nose. The side arms 254 and 255 may extend from the front frame toward the user's ears. The housing 259 may house a processor or other circuitry. The HMD may have a camera 257. Also, there may be a display 258 that extends from the frame into the user's field of view. The display 258 may be generally transparent and be configured to display computer generated imagery. Also the display 258 could be semi-transparent or translucent.

Figure 2C:
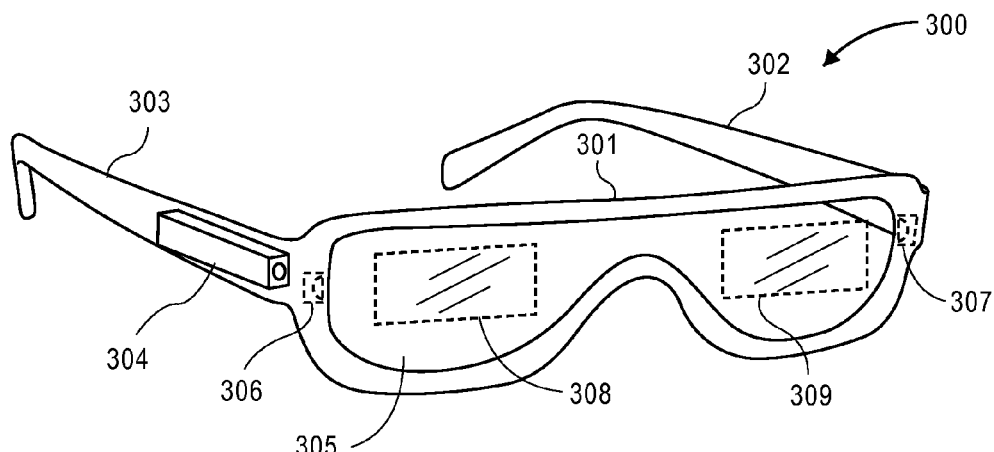

FIG. 2C shows an exemplary HMD 300 with a single lens 305 disposed in front of both eyes. The front frame 301 is configured to be disposed over part of the user's face. Side arms 302 and 303 may extend toward the user's ears. The HMD may have a camera 304. Projectors 306 and 307 may project imagery into the lens 305 to be visible to the user. The lens 305 may be generally transparent, semi-transparent, or translucent. It might even be opaque, for example if the user did not need to see the environment. Display areas 308 and 309 show imagery from the projectors. Also, rather than having two display areas, the HMD could have a single display area for the user that covers the majority of the lens. For example, the area between the display areas 308 and 309 could also be a display field so that a single display area is created. In some embodiments, the imagery is only visible to the user wearing the glasses and is not visible to individuals looking at the glasses from the front (e.g. looking head on at the front frame). However, in some cases, it would be possible to display the imagery on both sides of the lens or lenses. The HMD 300 may be goggles such as ski goggles or sporting goggles.

Figure 3:
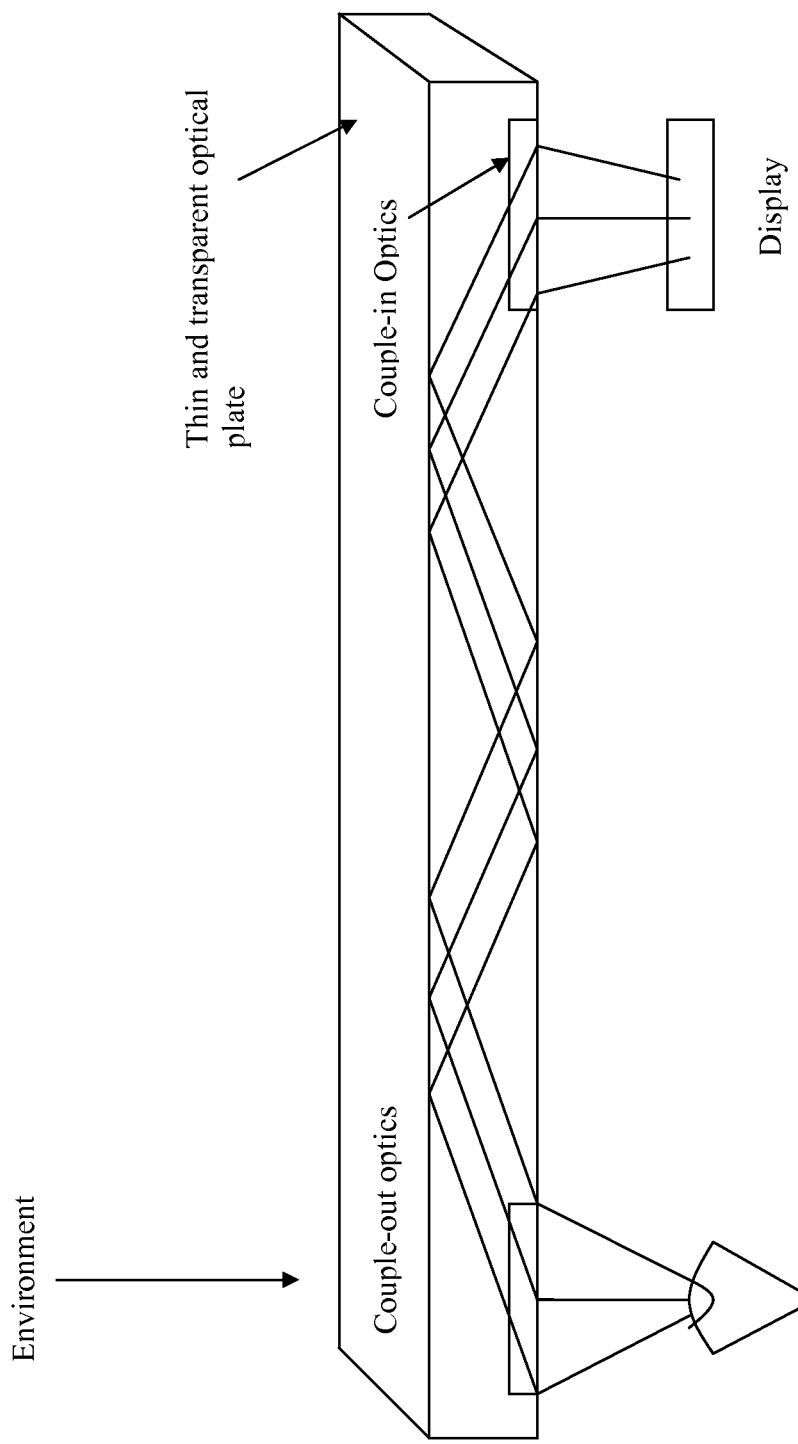
FIGS. 3 and 4 illustrate exemplary see-through displays.

FIG. 3 shows one exemplary optical display that can be used in electronic glasses. The figure shows an exemplary diffractive optical arrangement that can be used in a HMD. The figure shows a light-guided optical element (LOE) that may be made of transparent glass or plastic. It may be thin. For example, it may be about 2 mm. It may be see-through and may be encapsulated in a larger lens. In the example, a display source shows an image. For example, the display may be generated by an attached processor. The display may be, for example, an LCD or liquid crystal on silicon (LCoS). A binocular LOE and wedge display are described in U.S. Pat. No. 8,212,859 to Tang and Fadell in FIGS. 6B and 6C. U.S. Pat. No. 8,212,859 is hereby incorporated by reference in its entirety. Although the entire text of that patent should be treated as incorporated by reference, for avoidance of doubt, FIGS. 5A-C and FIGS. 6A-C of that patent and their associated text are particularly identified as being hereby incorporated by reference.

Figure 4:
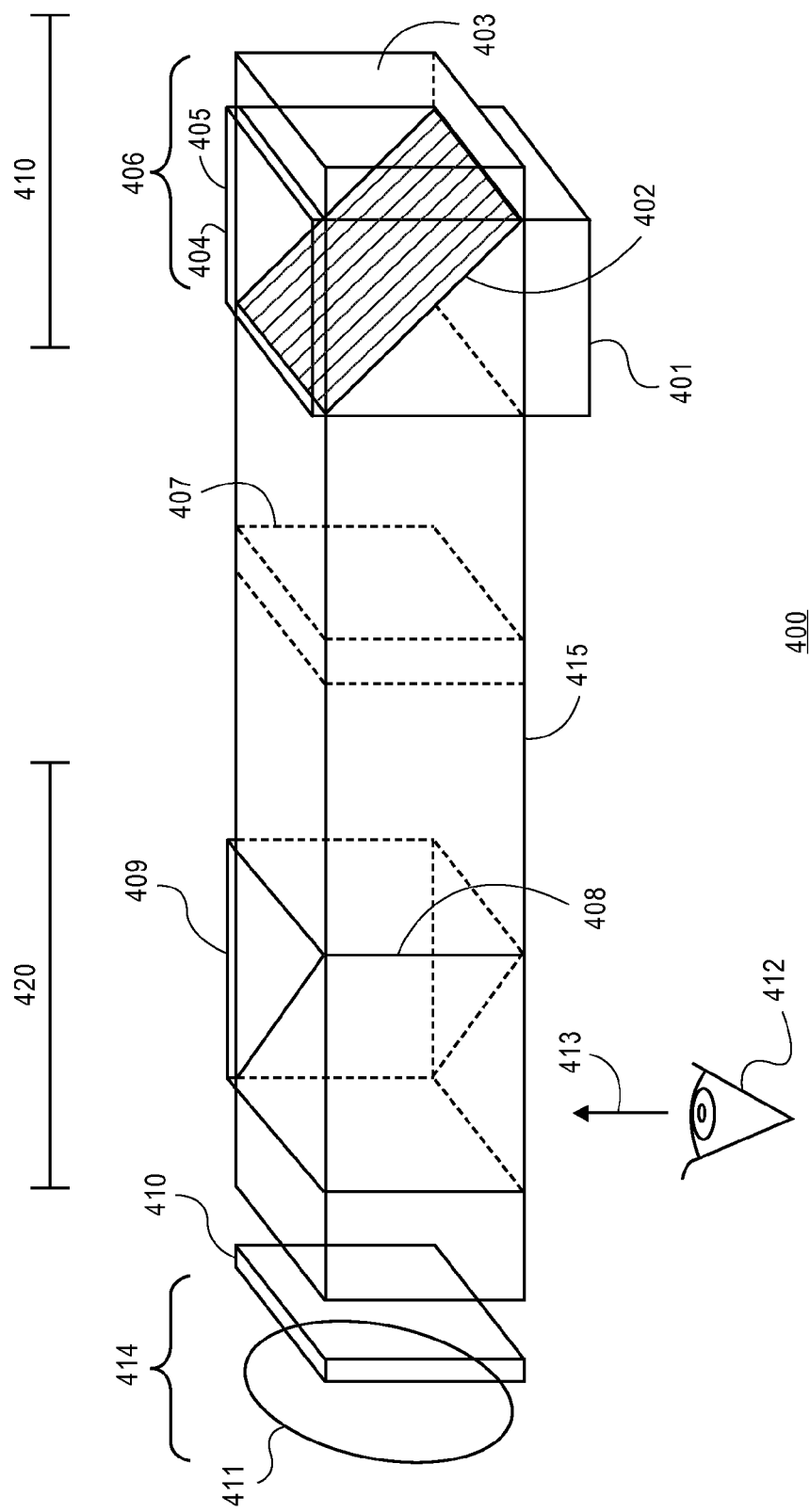

FIG. 4 shows an exemplary optical display 400 that can be used in electronic glasses. The mechanism is derived from U.S. Pat. Pub. 2013/0021658 "Compact See-Through Display System" to Miao, Wong, and Amirparviz, which is hereby incorporated by reference in its entirety. The mechanism includes a proximal portion 420 and a distal portion 410 connected by an optical pathway. The terms "proximal" and "distal" are used with reference to the user's eye. That is, the proximal portion is closer to the eye and the distal portion is farther. However, these terms are used only for convenience and of course various orientations are possible. The distal portion could be disposed vertically from the proximal portion or could be disposed to the left of the proximal portion.

The display panel 401 may be located underneath a distal beam splitter 402. In other embodiments, it may be located above or to the side of the distal beam splitter 402. The display panel may display an image, for instance, in response to processing from a processor. For example, display panel may be controlled by a display driver. The display panel may be an LCD, organic light emitting diode (OLED), LCoS, micro-mirror display such as digital light projector (DLP), or other display. The display panel may generate a light pattern by spatially modulating light from a light source 403. The display panel may be monochromatic or display multiple colors.

In this example, the distal beam splitter 402 is disposed at a 45 degree angle although other angles may be used. The distal beam splitter may be a polarizing beam splitter that reflects s-polarized light and transmits p-polarized light. A light source 403 may admit light into the device. The light source 403 may include a linear polarizer that selectively transmits s-polarized light. The s-polarized light from light source 403 may be reflected by the distal beam splitter 402 to the reflector 406. The reflector may comprise a plane mirror 404 and quarter-wave plate 405 disposed in front of the plane mirror. The light passes through the quarter-wave plate both before and after reflecting in the plane mirror 404. The light then reflected by the reflector 406 may then be p-polarized. The p-polarized light may pass through the distal beam splitter 402 so that it falls upon the display panel 401. The display panel may convert the incident p-polarized light into spatially modulated and s-polarized light.

The distal beam splitter 402 may then reflect the s-polarized light from the display panel 401 toward the proximal beam splitter 408. The light may travel through light pipe 415. The light pipe may be longer or shorter than shown in the diagram. The light may pass through a half-wave plate 407 that converts the light to p-polarized light.

The proximal beam splitter 408 may transmit p-polarized light and reflect s-polarized light. The p-polarized light from the distal portion 410 may then pass through the proximal beam splitter 408 to reach an image former 414. The image former may comprise a mirror, such as a concave mirror 411 or Fresnel reflector, with a quarter-wave plate 410 disposed in front of it. Because of the quarter-wave plate, light exiting the image former 414 is perpendicular to light entering the image former 414. So, the formerly p-polarized light may then be converted to s-polarized light. The s-polarized light may then be reflected by the proximal beam splitter 408 into the user's eye 412.

In the example the proximal beam splitter 408 is disposed at a 45 degree angle, though other angles may be used. A viewing window 409 may admit light from the environment. The viewing window may include a linear polarizer that selectively transmits p-polarized light. The p-polarized light may be transmitted through the proximal beam splitter 408 to the user's eye 412 along the viewing axis 413. In this way, the display 400 may provide a view of the environment through a lens in addition to displaying computer-generated imagery.

Some or all elements could be made of glass or plastic. One suitable material is Zeonex E48R cyclo olefin optical grade polymer available from Zeon Chemicals L.P. Another suitable material is polymethyl methacrylate (PMMA).

The entire disclosure of U.S. Pat. Pub. 2013/0021658 "Compact See-Through Display System" to Miao, Wong, and Amirparviz was incorporated by reference above. For avoidance of doubt, the inventor identifies with particularity that all sections of U.S. Pat. Pub. 2013/0021658 related to creating a see-through display are relevant and hereby incorporated by reference. The see-through displays of U.S. Pat. Pub. 2013/0021658 may be used in some electronic glasses.

HMDs are described in U.S. Patent Pub. 2013/0044042 "Wearable device with input and output structures" to Olsson et al., which is hereby incorporated by reference in its entirety. Although incorporated by reference in its entirety, for avoidance of doubt the inventor identifies with particularity that the HMDs described in that patent may be used as the "second computer system" ("connected computer system") in this patent.

Additional techniques for creating a see-through display are presented in U.S. Pat. No. 8,467,133 "See-through display with an optical assembly including a wedge-shaped illumination system" to Miller, which is hereby incorporated by reference in its entirety. Although Miller is incorporated by reference in its entirety, for avoidance of doubt inventor identifies with particularity that the see-through displays described in Miller may be used in embodiments of electronic glasses. For example, the HMDs described in Miller may be used as a "second computer system" in this patent.

Still more techniques for creating a see-through display are presented in U.S. Pat. No. 8,482,859 "See-through near-eye display glasses wherein image light is transmitted to and reflected from an optically flat film" to Border et al., which is hereby incorporated by reference in its entirety. Although Border et al. is incorporated by reference in its entirety, for avoidance of doubt inventor identifies with particularity that the see-through displays described in Border et al. may be used in embodiments of electronic glasses. For example, the HMDs described in Border et al. may be a "second computer system" in this patent.

Additional methods of near-eye display are discussed in U.S. Pat. Nos. 8,376,548 and 8,139,103, which are hereby incorporated by reference in their entirety. The near-eye display methods and mechanisms described in those patents may be used in some electronic glasses.

MEMS displays can also be used in some electronic glasses. MEMs displays are described in some of the aforementioned references such as U.S. Pat. No. 8,212,859 to Tang and Fadell at col. 2, ll. 3-22.

Further, some existing HMDs include the MOD and MOD Live from Recon Instruments, Vancouver, British Columbia; Vuzix Star 1200 from Vuzix Corporation, Rochester, N.Y.; Brother AiRScouter from Brother International Corporation, Bridgewater, N.J.; Epson Moverio BT-100 from Epson, Suwa, Nagano Prefecture, Japan; Sony HMZ T1 from Sony Corporation, Minato, Tokyo, Japan; and Silicon Micro Display ST1080 from Silicon Micro Display, Cambridge, Mass., among others. Those HMDs are examples of a "second computer" ("connected computer") that may be used in some embodiments.

Figure 5:
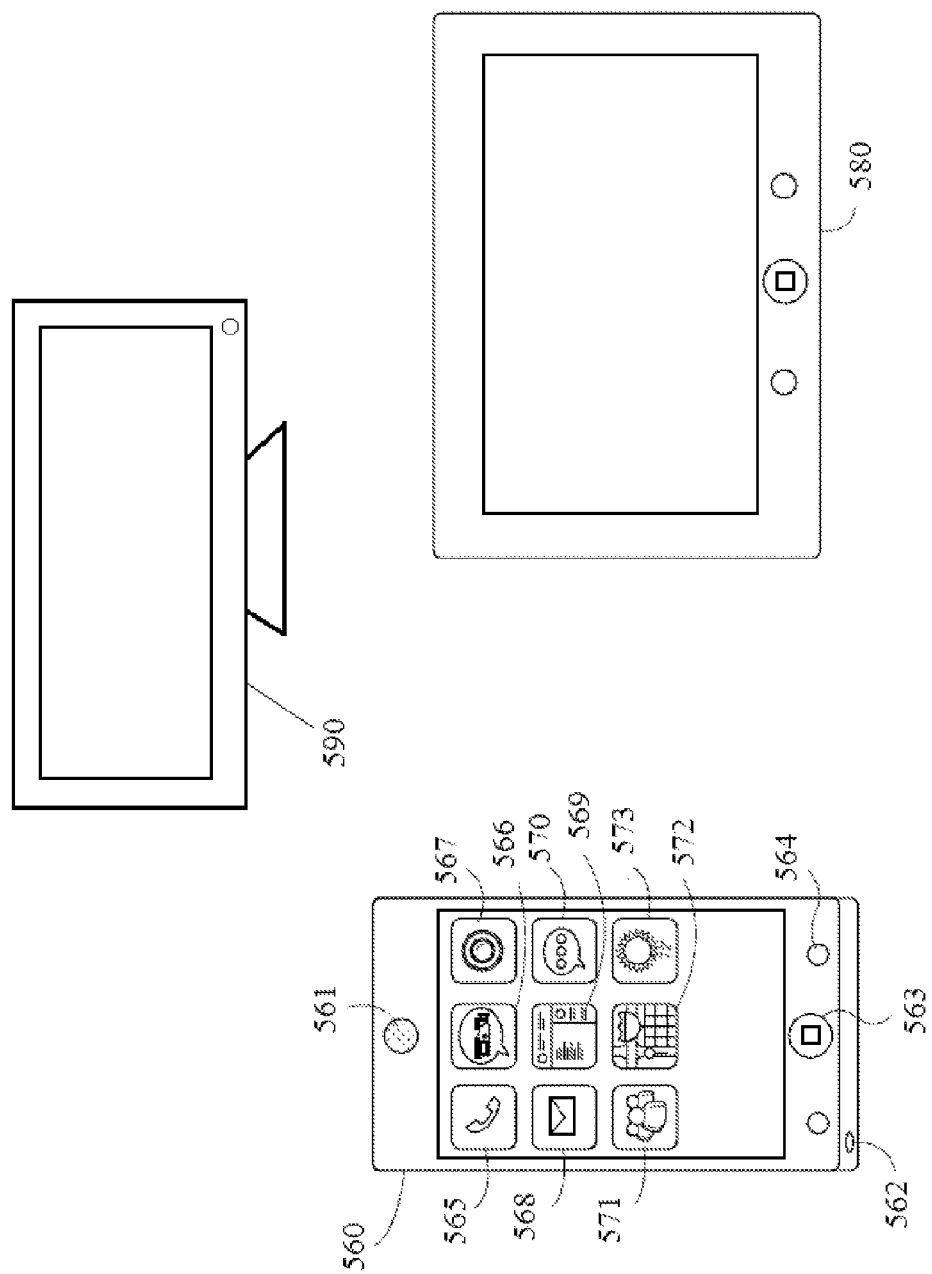
FIG. 5 illustrates a smartphone, tablet, and TV, which may be used in some embodiments of the invention.

FIG. 5 illustrates a smart phone 560, a tablet 580, and a television 590, any of which may be a "second computer" ("connected computer") in embodiments of the invention. The exemplary smart phone 560, tablet 580, and TV 590 may include a touch screen. Exemplary smart phone 560 has a speaker 561 for playing sounds, such as voice calls over a cellular or wireless system. It has an audio jack 562 for plugging in headphones or other devices. It includes a home button 563 for returning the user to a home screen and physical buttons 564 for causing other interactions. A smart phone 560 may include a number of functionalities available through computer programs run on the smart phone device 560.

The smart phone 560 may include the ability to make voice calls through a cell phone application 565. The cell phone application 565 may allow the user to dial a number on a virtual dialing pad and call that number through a cellular network. The cell phone application 565 may include a contacts list that stores information about contacts, including a name, phone numbers (e.g. mobile, home, work), address, email address, birthday, and other information. The cell phone application 565 may present a list of contacts that the user may choose from, and the user may select to call the contact via the cellular network. The user may also be allowed to elect to initiate other kinds of communications with a contact, such as sending an email.

The smart phone 560 may also include the ability to make video conference calls through a video conference application 566. The video conferencing capability may occur through the cellular network using cellular data or may occur over wireless or wired connection to a network, such as via Wi-Fi or Ethernet. In a video conference application 566, the user may dial a number using a virtual dialing pad or select a contact in order to initiate a video conference. In the video conference, one or multiple parties may be able to view a real-time video of the other. The smart phone 560 may include a front-facing camera (e.g. facing toward the user) to capture video of the user while she is viewing the touch screen. More than two parties may be involved in a video conference.

The smart phone 560 may also include the ability to take photos and video using a camera application 567. The smart phone may include multiple cameras, such as a front-facing camera (on the same side as the touch screen) and a back-facing camera (on the opposite side from the touch screen). Cameras may also be located on the sides of the device. The camera application 567 may allow the user to snap a photo or take a video using any of the cameras on the smart phone 560.

The smart phone 560 may also include the ability to send and receive email through an email application 568. The email application may communicate with an email server using protocols such as IMAP and SMTP. The email application 568 may download emails for the user from an email server when the user starts the application 568. The email application 568 may allow the user to compose new emails, which may be sent to email server for transmission to the ultimate recipient. The user may also reply or forward emails. The email application 568 may include a spam filter for removing unwanted spam emails.

Email is an electronic communication system that may be used over the Internet. A common protocol for sending and delivering email is SMTP, and common protocols for retrieving email are IMAP and POP3. An exemplary control flow for sending email is as follows: (1) a sender composes an email message on her client device, (2) the sender hits the send button, (3) the email is sent to an email server (e.g., an SMTP server), (4) the email server sends the email over the Internet to reach a second email server (e.g., an SMTP server), this one used by the recipient, (5) the second email server places the email in the recipient's mail box, (6) when the recipient elects to retrieve his mail, the email message is downloaded to the recipient's client computer, e.g. via IMAP or POP3 (alternatively the recipient might view the email message on the server by using a webmail system).

The smart phone 560 may also include the ability to access the World Wide Web (WWW) using a cellular data plan or using another wireless or wired network, such as Wi-Fi or Ethernet. The web application 569 may comprise a web browser. The web browser may include a field for entering a Uniform Resource Locator (URL). In response to entry of a URL, the web browser may access a network resource at the URL and display it to the user. The web browser may also include a search field. In response to entry of text in the search field, the web browser may perform a search over an index of the WWW for relevant web sites. It may do this by submitting the search to a search engine such as Google or Yahoo, for instance by using a Hypertext Transfer Protocol (HTTP) GET request.

The smart phone 560 may also include the ability to send and receive text messages using a text message application 570. A text message application 570 may display text messages received from other users and also allow the user to compose new text messages to be sent to others. It may include a text entry field and a send button, where activation of the send button causes the text to be sent. The user may indicate the individual to send the text message to by entering a number via a virtual dialing pad or by selecting a contact.

Text messages are electronic messages that may be sent over a text message protocol such as SMS or MMS, over the Internet, or over another network. SMS and MMS are text messaging services. MMS allows sending multimedia files, like pictures, via a text message. Text messages can also be sent over the Internet. For instance, a mobile phone may send the text message through an IP router and on through the Internet, where it may be received via the Internet or via an SMSC/MMSC to a recipient user's mobile device. Services like iMessage send their text messages over the Internet. Desktop and laptop computers can also be used to send and receive text messages via use of the Internet. Their text messages can be transmitted from the Internet to an SMS or MMS network via an SMS gateway or MMS gateway.

The smart phone 560 may also include the ability to connect to a social network using a social network application 571. The social network application 571 may connect to a remote server storing the social network using one or more databases. The social network may comprise one or more user profiles, stored in the databases, which may be "connected" to each other by links stored in the databases. Connected users may be referred to as "friends," "contacts," or other similar terms. The social network application 571 may display the user's profile and user profiles of other users on the social network. The social network application 571 may allow the user to post messages, pictures, videos, and other items for viewing by other users on the social network. Connection to the social network 571 may be made by a cellular data plan or other wireless or wired network.

The smart phone 560 may include a map application 572. The map application 572 may identify the user's location using GPS or another real time location system (RTLS) and display it on a map. The map may be zoomed in or out. The map application 572 may allow the user to enter the name of a different location in order to view a map of that area (e.g., "New York City"). The map application 572 may allow the user to enter a search query so that the user may search for locations, such as "restaurants," "grocery stores," "libraries," and so forth. The map application 572 may search for locations of the queried type in the local area and display them on the map. Also, the map application 572 may generate a set of directions from one location to another. It may include a first text field for entering a start location and a second text field for entering an end location. The map application 572 may then send a query to a remote server to compute a route from the start location to the end location. The remote server may compute the route using a database of roads. It may compute the shortest route using methods such as Dijkstra's algorithm or A* search. In some cases, the remote server may take into account current traffic conditions on roads. For example, if a road is currently congested, it may be given a higher weight according to the additional time that it would take to traverse. The remote server may send the resulting route to the smart phone 560 for display in the map application 572.

The smart phone 560 may also include a weather application 573. The weather application 573 may display the current weather at the user's location as well as a forecast for the weather at the user's location at later times. It may show forecasts for different intervals, such as 15 minute intervals or hour intervals. Further, interface elements may allow the user to add additional locations for which to track forecasts. The user may add these locations by typing their names (e.g., "New York City"). After receiving these additional locations, the weather application 573 may track and display forecasts for those locations.

A smart phone 560 may include a number of additional capabilities. It may include an application marketplace where the user may download additional applications to the smart phone. Additional applications may be free or may cost money to purchase. If the applications cost money to purchase, then the user may be prompted to login so that the purchase may be made using stored payment information. The smart phone may also include computer games.

The tablet 580 and television 590 may include the same capabilities described with respect to smart phone 560. The tablet 580 and television 590 may have speakers, an audio jack, a home button, and other physical buttons. They may have applications 565-573 described above.

Figure 7:
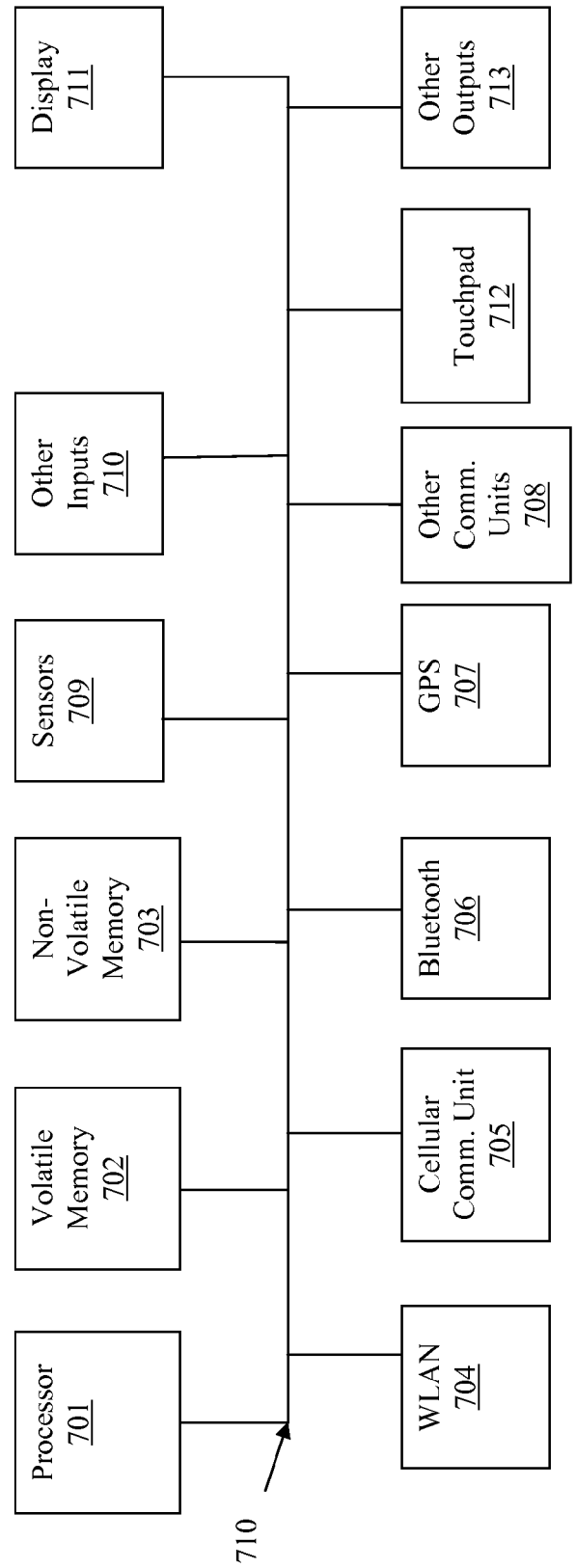
FIG. 7 illustrates components of an exemplary computer system.

FIG. 7 shows the components of an exemplary computer system 700. The computer system may have a processor 701 for processing instructions. The computer system may have a volatile memory 702 and non-volatile memory 703. There may be sensors 709, in a variety of forms. Also, there may be a touchpad 712 and other inputs 710. Other inputs include, without limitation, buttons, switches, scroll wheels, microphones, rangefinders, laser detection systems, and cameras. Also, there may be a display 711. There may also be other outputs 713, such as speakers, ports for earphones, or devices for haptic feedback, such as electronic devices for generating a vibration.

The computer system 700 may also have a number of communication units. It may have a WLAN unit 704 to enable wireless communication such as by Wi-Fi. The WLAN unit 704 may operate over an 802.11 standard network. The computer system 700 may also have a cellular communication unit 705, which may enable communication over a cellular system. Cellular systems include GSM and CDMA. Further, the computer system 700 may include a Bluetooth unit 706 for communicating over Bluetooth. It may also have a GPS unit 707 for obtaining and transmitting GPS location data. There may also be a variety of other communication units 708 such as for other wireless or wired technologies. It is contemplated that wired communication technologies could be used with the computer system 700, including USB and its varieties like mini-USB and micro-USB.

The elements of the computer system 700 may be connected by one or more interconnects such as interconnect 710. The interconnect 710 may be a bus, crossbar, network, and so forth. Some or all elements may be connected wirelessly rather than via wires. For example, the processor 701 may be connected to the display 711 via a wireless communication channel.

Any of the aforementioned elements of the exemplary computer system 700 may be omitted in some embodiments, or replaced by other components. Furthermore, any of the components can be used in plurality, for instance a plurality of volatile memories or a plurality of non-volatile memories may be used. Also a plurality of processors may be used, and so forth.

Figure 8:
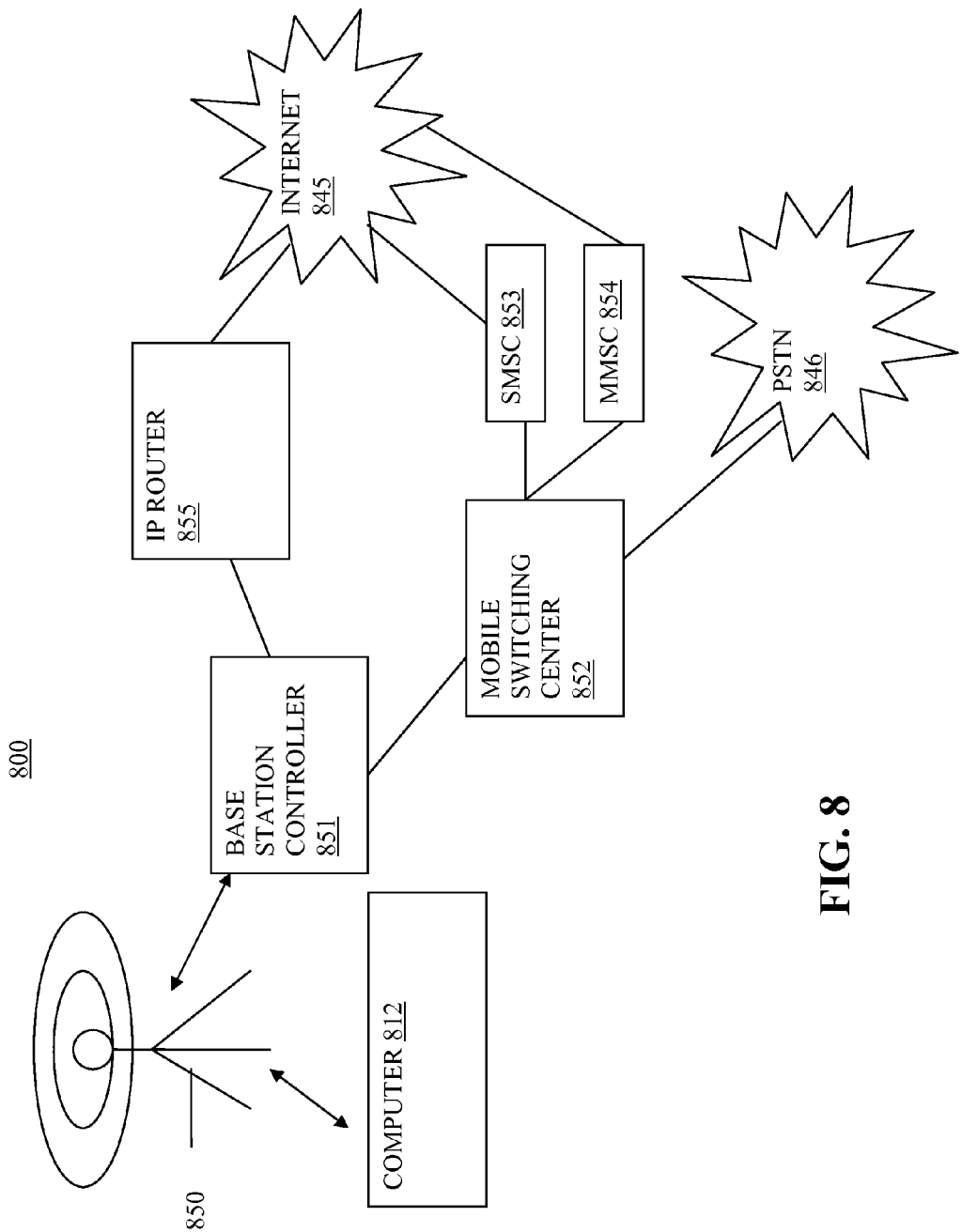
FIG. 8 illustrates an exemplary cellular network to which a computer system may be connected.

FIG. 8 illustrates elements that may exist in an exemplary cellular network 800 to which a computer may be connected. It should be understood that many other configurations of a cellular network 800 are possible. A computer 812 may connect wirelessly to a base transceiver station (BTS) 850. The BTS may comprise a cellular tower, which is a tower holding antenna arrays for communicating with computers. In other cases, the BTS may comprise a building that has antenna arrays mounted on it for communicating with cellular-enabled computers. (The term "cellular-enabled computer" shall be used to refer to a computer that has equipment for communicating on a cellular network).

The BTS may be connected to a base station controller (BSC) 851, which may serve several BTSs. The BSC may perform functions such as handover, cell configuration data, and control of radio frequency (RF) power levels in the BTSs. It may provide control functions and physical links between the mobile switching center (MSC) 852 and the BTSs. The BSC may be connected to an MSC 852, which may serve several BSCs. The MSC 852 may handle functions such as call routing, call setup, and basic switching functions. It may also connect to other MSCs. When a call is made within a mobile network, it may be routed as follows: calling computer to a BTS to a BSC to a MSC to a BSC to a BTS to the callee. When a call is made inter-network then a transfer to another MSC may be required: calling computer to a BTS to a BSC to a MSC to a MSC (of a different network) to a BSC to a BTS to the callee.

The MSC 852 may connect to the Public Switched Telephone Network (PSTN) 846, for instance via a Gateway Mobile Switching Center (GMSC). Thus, calls from computer may be made to and from phones on the PSTN.

The MSC 852 may also be connected to a Short Message Service Center (SMSC) 853 and Multimedia Message Service Center (MMSC) 854. The SMSC 853 may handle the Short Message Service (SMS) operations of a mobile network. It may forward an SMS message from the computer to the appropriate destination. Meanwhile, the MMSC 854 may handle the Multimedia Messaging Service (MMS) operations of a mobile network. It may forward an MMS message from the computer to the appropriate destination. The SMSC 853 and MMSC 854 may be connected to the Internet to allow SMS and MMS text messages to be sent, received, and/or viewed from computers on the Internet. The SMSC 853 may be connected to the Internet via an SMS gateway. One could set up an SMS gateway using free software such as Kannel. There are also many providers of SMS gateways such as ClickaTell. Similarly, the MMSC 854 may be connected to the Internet via an MMS gateway. Use of an MMS gateway can be obtained from various providers. An open source MMS gateway called Mbuni is available on SourceForce.

An IP router 855 may be connected to the base station controller 851. The IP router may be connected to the Internet 845. Thus, the computer may send and receive data from the Internet through use of a cellular network. This is enabled on many mobile devices via a data plan.

It should also be understood that computer may be able to connect to the Internet via other mechanisms, in addition to use of a cellular network. For instance, the computer may use Wi-Fi to connect to the Internet via a wireless network access point (hotspot). Wi-Fi includes, for instance, the IEEE 802.11 protocol. A hotspot may offer a fast Internet connection such as cable Internet, DSL, or T1.

Communications between a computer and a base transceiver station (BTS) in a cellular network may occur over various channels. For example, channels may occur in different time slots (TDMA), in different frequencies (FDMA), or according to different codes (CDMA). Channels may also be divided in other ways.

When a cellular-enabled computer is turned on it may access one or more known channels to determine whether there is a BTS within range. In fact it may detect multiple BTSs and determine which one has the best signal strength. The BTS may transmit a pilot channel as a timing beacon for cellular-enabled computers and may also identify the BTS to cellular-enabled computers. The BTS may transmit a synchronization channel in order to provide cellular-enabled computers a timing reference with which they may access information in the cell. Further, the BTS may have one or more paging or control channels. A cellular-enabled computer may transmit a message indicating its existence on a control channel for the BTS to pick up. The BTS may then store an indicator of the computer in a home location register (HLR) or visitor location register (VLR), if the computer is a registered user on the network or is a user from a foreign network, respectively. The computer may transmit a message to the BTS at intervals so that the MSC may keep the HLR or VLR up to date with the computer's location. When an MSC receives an incoming call for the computer, it may check the HLR or VLR to determine the BTS or group of BTSs where the computer is located. The MSC may then forward the call to the appropriate BTS or group of BTSs. The BTS may then transmit a paging message on a control channel indicating a call. The control channel carrying paging messages is often split into divisions so that a computer only needs to check for paging messages at intervals in order to save power. For example, if the paging channel is split into eight time slots and the computer knows that a paging message for it would only come in slot eight, then the computer may remain in off or low-power mode for the other seven slots. The paging message may contain the number of the computer for which it is intended (cell phones are a type of computer). Upon checking for a paging message and determining that the paging message is intended for it by checking the number stored in the paging message, the computer may then acknowledge the call. It may accomplish this by responding on a random access channel (RAC), which is a channel chosen through randomization. If two computers happen to transmit on the same RAC (a collision), they may back off for a certain time and try again. When the BTS receives an acknowledgement of a call from a computer, the BTS may send an acknowledgement to the computer along with details of a traffic channel for the computer to use for its call. The computer may then use the traffic channel to transmit a call.

III. Exemplary Code

This section discusses some example code that may be used to specify webpage elements for display on a second computer system. The following examples use HTML and Javascript but embodiments of the invention may be used with webpages written in any computer language. Embodiments are not limited to HTML or Javascript.

A markup language is a language including non-content elements that specify additional information about the content elements, such as formatting or style. Tags, for example, are non-content elements that may be used in a markup language to specify how certain elements of content may be displayed. Tags are used in many different markup languages and are not limited to just HTML. Tags may be referred to as a type of "delimiter." A "delimiter" is anything that marks the boundaries of something (e.g., the boundaries of a group of code, or the boundaries of code relating to a particular element).

Individual components of a document may be termed "elements." Tags may be used to delimit elements of a document. Attributes may be specified for tags, which may thereby define attributes for the element corresponding to the tag. For example, an attribute may include the source for an image element, an "ID" for an element, or the specification of certain styles to be used with the element. Tags, elements, and attributes may be used in many kinds of computer languages and are not limited to HTML.

HTML is one markup language that may be used to create webpages or other documents. An HTML document may have individual components called HTML elements. HTML elements may be specified by HTML tags, which may be denoted by angled brackets. In some cases, there is both a start tag and an end tag used to specify an HTML element (start and end tags can also called opening and closing tags). In other cases, only one HTML tag is used to identify an HTML element. HTML elements may have attributes such as "name," "src," "style," and so forth that specify certain properties of the HTML element.

As stated previously, embodiments may be written in a variety of computer languages of which HTML and Javascript are just two examples. Embodiments may operate on webpages written in other markup languages, imperative languages, declarative languages, functional languages, and other kinds of computer language.

Webpage code may be downloaded, parsed, and processed by web browsers or other web-enabled applications. Web browsers or other web-enabled applications may display webpage elements corresponding to webpage code.

Figure 10B:
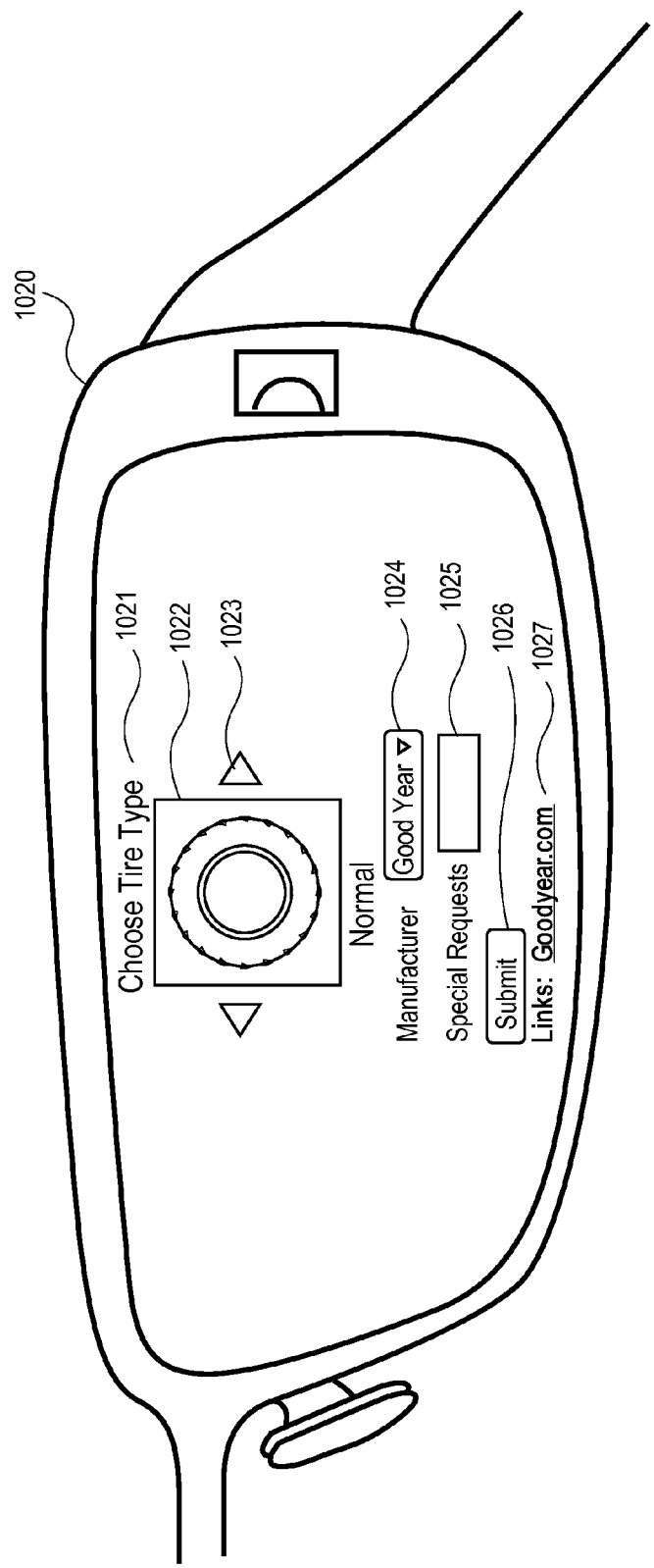

FIGS. 9A-B show a sample code listing for a webpage that may be used in one embodiment. FIG. 10A illustrates how the webpage elements may be displayed after the first computer 1000 and second computer 1010 (in this example, a cell phone) have interpreted the sample code from FIGS. 9A-B. FIG. 10B illustrates how the webpage elements may be displayed when the second computer 1020 is a pair of electronic glasses.

Before going into the sample code listing, I briefly set forth a refresher on HTML.

In FIGS. 9A-9B the <html> tag specifies the beginning and end of the HTML document. The <head> tag may specify a containing header element that may contain other header elements. It may contain a <title> tag for specifying the title of the page. It may contain a <script> tag for including script (<script> tags for script code may appear just about anywhere in a document and are not limited to the header). It may include a <meta> tag for including information about the document such as a description, character encoding, or name of the author. It may include a <link> tag for linking to other documents such as a style sheet.

A <body> tag may specify the body of a webpage. A <div> tag may act as a container element to hold other HTML elements. A <p> tag may be used to specify a paragraph. A <form> tag may be used to specify a form. A form may have multiple input elements such as a text field (<input type="text"> tag) or drop down menu (<select> tag). A form may also have a submit button (<input type="submit">) or other buttons (<input type="button">). Upon submission, the contents of the form fields may be submitted for processing to a server. The server-side script to process the form entry may be specified using the "action" attribute of the form element. When the form is submitted by the user pressing the submit button, or another action, the server side script may be run with the form contents passed as parameters to the server side script. Meanwhile, an <a> tag may be used to specify a hyperlink. The <a> tag may be used to make a text, image, or other element into a link to another webpage.

A <script> tag may be used to specify script, which is code. Script may be in the form of Javascript or other scripting languages such as VBScript.

Comments in HTML code can be specified by the <!-- opening tag and --> closing tag. Comments in Javascript can be specified by the /* opening tag and */ closing tag or by the // tag.

FIGS. 9A-B illustrate an exemplary webpage file that may be downloaded by a first computer system at the request of a user. The webpage illustrates an exemplary online application where the user can customize a car. For example, the webpage might allow a user to customize a car before buying it.

The exemplary webpage is written in HTML, with Javascript, but other computer languages may also be used. The exemplary webpage file includes HTML tags identifying code for displaying webpage elements on a second computer system. In particular, a novel HTML tag <device> and </device> is used to identify the code for displaying webpage elements on a second computer system. The <device> start tag and </device> end tag may be used to enclose or delimit the webpage elements for display on a second computer system.

The <device> tag is used as one example, but a device tag may be called by other names such as <mobile>, <phone>, <glasses>, or <TV>, which may be appropriate depending on what kind of device is used as the second computer.

Starting from the beginning of the webpage file, code section 901 identifies HTML code for displaying elements on the first computer (the "client computer" that downloaded the webpage file). The <head> tag identifies certain header information such as the title ("Car Page"), the character set (via the <meta> tag), and a CSS stylesheet that will be used in the page called mystyle.css.

The <body> tag identifies the start of the body section of the webpage. A first <div> includes an <img> element that shows an image of a car 1001 (see FIG. 10A). A second <div> element includes text and a form. The text "Choose your car" 1002 is displayed as part of a paragraph element. A form having id attribute "carform" and action "handler.cgi" is presented. Upon submission of the form, the contents of the form are submitted for processing to the "handler.cgi" server-side script. The form includes a drop down menu 1003 specified by a <select> tag. The drop down menu allows the user to select a kind of car. The form also includes a text entry field 1004 specified by an <input type="text"> tag, which allows the user to enter a number of doors for the car. The form also includes a submit button 1005 specified by an <input type="submit"> tag. After the form, the webpage file includes a set of links to other pages 1006, which are specified using <a> tags where the href attribute specifies the linked page.

Code section 902, 903 shows code that is enclosed by <device> start and end tags. The <device> tag is a novel tag used in embodiments of the invention to specify that code is for displaying elements on a second computer system. A device tag may be called by other names such as <mobile>, <phone>, <glasses>, or <TV>.

In this example, the first sub-element of the <device> element is a <div>. That <div> includes a paragraph <p> element with text "Choose Tire Type" 1011. The div also includes a left arrow and right arrow 1013 that may be used to manipulate what tire is chosen (with appropriate code, which is not shown in this example). The middle image specifies a current tire image 1012. A paragraph element states the name of the current selected tire ("Normal"). A class attribute is used to point to a class in the CSS stylesheet that will specify styles to apply to elements of the class. In this case, the paragraph element is centered by styles in the CSS stylesheet.

A second <div> element follows and includes a form. The form includes a drop down box 1014 for selecting a tire manufacturer. The form also includes a text entry box 1015 for entering special requests. Further a button 1016 element is provided, which when activated (via click, tap, or other action) will call the Javascript function chooseTire( ). A set of links 1017 is also included.

Code section 902, 903 also includes a <script> section, which is separately denoted as code section 904. Since the <script> section is enclosed in the <device> tags, it may be for execution by the second computer. The <script> section includes a function definition for function chooseTire( ), which takes no parameters. The code in the chooseTire( ) function will change the image shown in the <img> element with id "car_image" to be a different image based on the tire manufacturer chosen in the tire selection form. Notably, the "car_image"<img> element is being displayed on the first computer, but this script code is generally for execution on the second computer because it is enclosed in the <device> tags. The effect of modifying the "car_image"<img> element on the first computer may be achieved by using Remote Procedure Calls (RPC) as described later.

FIG. 10B illustrates how the webpage may look when electronic glasses 1020, rather than a cell phone 1010, are used as the second computer. As described previously, the code in the webpage file may cause the display of various webpage elements including "Choose Tire Type" text 1021, a tire image 1022, arrows 1023, a tire manufacturer drop down menu 1024, a special requests text entry field 1025, a button 1026, and links 1027. The glasses may execute the script in code section 904 as previously described.

In order that the second computer system, whether a mobile phone, glasses, or other computer, be able to display the webpage elements specified by code sections 902, 903, the first computer system may send an indication of the webpage elements specified by that code to the second computer. In one embodiment, the first computer system may send the code within the <device> tags (including the code in the <script> tags) over to the second computer system for execution and display (e.g., code sections 902, 903). It should be understood that code may be sent over to the second computer system in a variety of formats, and it need not be in the textual format shown in code sections 902, 903.

As just one example, computer systems sometimes represent webpages, such as HTML pages, using a Document Object Model (DOM). A portion of code may be represented in a DOM model and so an encoding of the DOM model for that portion of code may be transmitted by a first computer to a second computer in order to transmit an indication of the portion of relevant code to the second computer.

A DOM is an interface for representing and interacting with objects in a document. A DOM may be implemented as part of a web browser or other web-enabled application. A model in a DOM (a "DOM model") may be used to represent a particular document. The DOM model may represent the logical structure of the document; for example, it may specify the relationship between various elements in the document. In some embodiments, the DOM model of a webpage may be accessed and manipulated by script after the webpage has been loaded. A DOM model often has a number of elements. Elements in a DOM model may be referred to as DOM objects. The DOM model of a document and its elements may be stored in a web browser's memory (or the memory of another application displaying the document).

Figure 11:
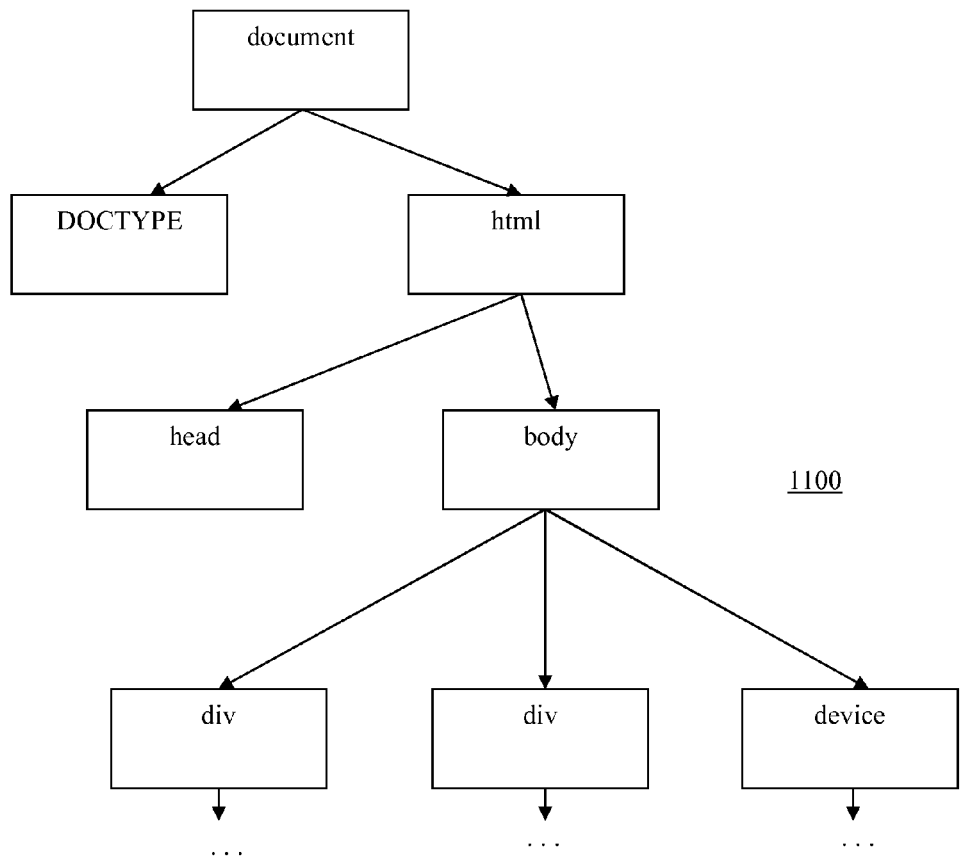
FIG. 11 illustrates a portion of an exemplary DOM model of a webpage.

FIG. 11 illustrates a portion of an exemplary DOM representation 1100 of the code in sections 901-903. This DOM representation is a tree, though other data structures or representations may be used. The document element is the root of the tree. The other elements, also called nodes, are various elements of the document. An element is shown as a child of an element that encloses it. Thus, for example, the head and body elements are children of the html element. Similarly, the body element has three children, two div elements and a device element. Additional elements may be present but are not shown.

Figure 12:
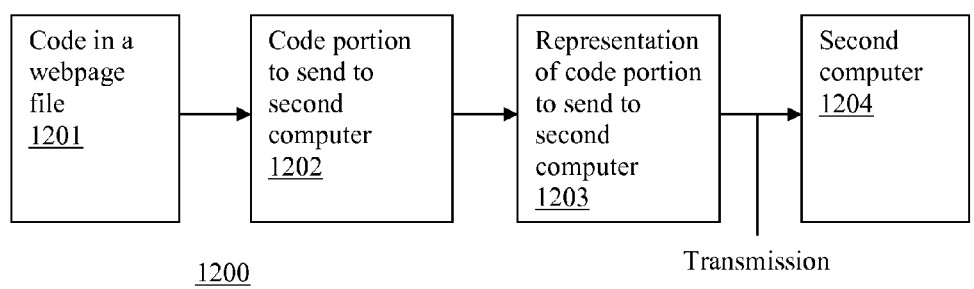
FIG. 12 illustrates an exemplary method of sending an indication of a portion of code from a first computer to a second computer.

FIG. 12 illustrates sequence 1200 where the first computer may first download code in a webpage file 1201, identify a portion of code to send to a second computer 1202, turn that code portion into another representation 1203, and then transmit the representation to the second computer 1204. One possible representation is a serialization of the DOM representing the appropriate code portion. The first computer may interpret a section of code, generate a DOM model of the section, and then serialize the DOM model. Serialization is a process of translating a data structure or object into another format better suited for transmission to another computer or for storage. Another representation that could be used for transmitting code from the first computer to the second computer is a list of HTML tags and their attributes, presented in the same order they appear in the webpage file (for example, open div, open p, "Choose Tire Type", close p, img, src="l_arrow.png", onclick="goleft( );", img, src="normal_tire.png, and so on).

In this way, an indication of the code portion for displaying webpage elements on the second computer may be sent to the second computer, either by sending the code itself or another representation.

Previously it was described that the scripting code of a webpage file may allow the second computer to access an object displayed on the first computer, such as the "car_image" img element in code section 901. Similarly, embodiments may allow scripting code on the first computer to access an object displayed on the second computer. However, such features are optional. It is not necessary that scripting code on the second computer be able to access objects on the first computer system, nor is it necessary that scripting code on the first computer be able to access objects on the second computer system. Some embodiments may effectively sandbox the first computer and second computer so that script on the second computer cannot access elements displayed on the first computer and script on the first computer cannot access elements displayed on the second computer. Alternatively, access may be only one-way, for example script on the second computer may access objects on the first computer but not vice versa; or script on the first computer may access objects on the second computer but not vice versa. Further, in some embodiments, scripting may not be allowed at all on the second computer, or may not be allowed on the first computer.

In the terminology of this patent, an object for display on the first computer is termed "owned" by the first computer and an object for display on the second computer is termed "owned" by the second computer. Elements included within the <device> tag may be owned by the second computer because they are for display by the second computer, whereas elements that are outside of the <device> tag may be owned by the first computer because they are for display by the first computer. The DOM representation of the page may encode information about which computer owns which elements. In a tree representation of the DOM, the descendants of the <device> tag would be elements owned by the second computer, but elements that are not elements of a <device> tag would be elements owned by the first computer. Elements that are "owned" (displayed) by a computer would also be stored at that computer. A computer that does not "own" an element may also store a copy of the element for its own manipulations.

In embodiments allowing scripts on the second computer to access objects owned (displayed) by the first computer, this functionality may be implemented with Remote Procedure Calls (RPC). RPC is an inter-processor communication that allows a computer program to cause a subroutine or procedure to execute in another computer. RPC may be used to allow a programmer to call a function or method on her local computer and have that function be performed on a remote computer and the results (if any) returned to her local computer from the remote computer. RPC may be implemented using many different technologies and/or protocols.

A method is a subroutine associated with a class in object-oriented programming. Objects may have methods that may be called.

In exemplary code section 904, the function chooseTire( ) is called when the user activates the button on the second computer. The first three lines obtain the image object that will be changed (which is owned (displayed) by the first computer) and sets the mfgVal variable to the currently selected tire manufacturer.

The next line of code is image.parentNode, which obtains the parentNode variable of the image object. Since the image object is owned by the first computer, it may be desirable to obtain the value of the parentNode variable by RPC. It is also possible that a copy of the image object is stored on the second computer so an RPC call is not necessary, but an RPC call may be appropriate to get the most up to date information if the first computer may modify the image object and its variables.

Supposing that the parentNode variable of the image object may be obtained by an RPC called image.getParentNode( ), the second computer may call a stub called image.getParentNode( ) (which may be inserted by the Javascript interpreter). The stub may then pack the name of the function and the parameters into a message and send it to the first computer for processing. The packing process is called marshaling. The first computer may receive the message and unpack the parameters (called unmarshaling). The first computer may recognize that the message requests a call to image.getParentNode( ). It may perform the method call on the image object (which it owns) and then pack (marshal) return parameters into a return message to send to the second computer. The second computer may then unpack (unmarshal) the return parameters.

In this manner, an RPC call allows script code to call a function, send an indication of that function and its parameters to another computer (e.g., the first computer) for execution, and receive a return value from the other computer (e.g., the first computer).

A few different implementation possibilities for RPCs will now be discussed.

First, RPCs may be blocking or non-blocking. In a blocking embodiment, the computer making the RPC call blocks when the RPC call is made until it receives a return from the computer to which the RPC was made. FIG. 13A illustrates blocking execution using an excerpt from scripting code 904. In line 1, the RPC call to obtain the parentNode value is made. This blocks the second computer. When the second computer receives a return value from the first computer, then execution continues to line 2.

In a non-blocking embodiment, the computer making the RPC call continues after the call so long as it can execute code that does not depend on the return value from the call. So long as code does not depend on the return value (and supposing there will be no relevant side effects from the RPC call), then there would often be no harm from continuing execution. FIG. 13B illustrates non-blocking execution using the same excerpt from scripting code 904. In line 1, the RPC call to obtain the parentNode value is made and execution continues through lines 2 and 3 because they do not depend on the returned parent value. However, if the RPC has not returned by line 5, then the second computer would block at line 5 because line 5 depends on the returned parent value.

Second, RPCs may use lazy or eager evaluation. In an eager evaluation embodiment, the RPC call is made at the point specified in the code. FIG. 13C illustrates eager evaluation using the same excerpt from scripting code 904. In this example, an RPC call exists at line 1 and so the call is made at line 1.

In a lazy evaluation embodiment, the RPC call is not made until its return value is actually needed. FIG. 13D illustrates a lazy evaluation embodiment using the same excerpt from scripting code 904. In this example, the RPC call is bound at line 1. I use "bound" or "bind" in this case to simply mean that a record of the RPC call is made. This enables the computer to determine later whether the return value of the RPC call is needed. The second computer may then continue and execute lines 2 and 3 which do not depend on the result of the RPC call. When line 5 is reached, it depends on the result of the RPC call and so the RPC call is made at that point.

One advantage of a lazy evaluation in this case is that lines 5 and 6 also may use RPC calls. The parent of the image object is a <div> element for display on the first computer system. Thus, the calls to the removeChild and appendChild methods in lines 5 and 6 may invoke RPC calls to the first computer. So, three RPC calls may be transmitted to the first computer all at one time (image.getParentNode( ), parent.removeChild( ), and parent.appendChild( )), which may increase efficiencies.

Combining multiple RPC calls that appear together into a single transmission is a feature that can be used regardless of whether an embodiment is using lazy evaluation or eager evaluation (or is blocking or non-blocking). In any of the aforementioned embodiments, lines 5 and 6 both may use an RPC and so the calls to those RPCs may be transmitted to the first computer together.

Blocking/non-blocking and lazy/eager functionalities can be mixed and matched in any desired form. Embodiments may be blocking and lazy, blocking and eager, non-blocking and lazy, or non-blocking and eager.

Turning the discussion back to code section 904, it is now possible to explain the operation of the code. The first three lines obtain the image object, which is a DOM object being displayed by the first computer, and the value of the drop down tire manufacturer menu on the second computer. The next line of code obtains the parent of the image object (a <div>), which is also a DOM object. Then the code creates a new image object and assigns it a src value of an image file name based on the identity of the selected tire manufacturer. The code then causes the parent to remove the image DOM object and append the new image object as a child of the parent. The removal of the image DOM object and appending of the new image object may be accomplished by RPC. The second computer may request performance of these calls, with the relevant parameters, and, in response, the functions may be executed by the first computer. As a result, the first computer would then display the new image having file name mfgVal+"_car.png".

An alternative implementation would be to simply change the src attribute of the image object to be mfgVal+"_car.png" (as shown in the comment in code section 904). This implementation may also make use of an RPC call, namely a call to a remote assignment function to assign mfgVal+"_car.png" to the src attribute of the image (which is displayed on the first computer). The second computer may send a request to the first computer to perform the assignment function, the first computer may perform the assignment function and return, and then the first computer may display the new image with file name mfgVal+"_car.png".

While RPC calls have been demonstrated for allowing the second computer to access objects on a first computer, RPC calls may be implemented in the same manner to allow a first computer to access objects, such as DOM objects, on a second computer. In this manner, scripting code on a first computer may be able to access objects owned (displayed) by the second computer.

FIG. 14 illustrates exemplary source code that may be added to code section 901 to include a script in the first computer that accesses objects owned (displayed) by the second computer. The code includes window.onload=start to specify that the start function should be called when the document is loaded. Lines 5 and 6 obtain DOM objects that are displayed on the second computer, namely the "tire_image" object and the "right" object. Line 8 then obtains the parent node of the "tire_image" image by reading the parentNode variable. As discussed above, this may invoke an RPC call. In this instance, the first computer may make an RPC call to the second computer requesting that it call the appropriate function (such as getParentNode( )) and return the value to the first computer. In practice, the first computer may call a stub called image.getParentNode( ) (which may be inserted by the Javascript interpreter). The stub may then pack the name of the function and the parameters into a message and send it to the second computer for processing. The packing process is called marshaling. The second computer may receive the message and unpack the parameters (called unmarshaling). The second computer may recognize that the message requests a call to image.getParentNode( ). It may perform the method call on the image object (which it owns) and then pack (marshal) return parameters into a return message to send to the first computer. The first computer may then unpack (unmarshal) the return parameters.

As before, lazy or eager evaluation may be used and blocking or non-blocking implementations may be used (and these may be combined such as lazy and blocking, lazy and non-blocking, eager and blocking, and eager and non-blocking). Lines 9 and 10 may create a newImage object and assign an image file name to the src attribute of the image object. Lines 12 and 13 call the removeChild and insertBefore methods of the parent node in order to remove the old tire image from the DOM model and add the new tire image. These calls may be implemented by RPC. The first computer may send a request to the second computer to perform these methods with the specified parameters. The second computer may then execute these methods, thereby removing the tire image and inserting the new image before the "right" object. Thus, the tire image on the second computer may be replaced by the new image specified in the scripting code of the first computer.

Although the exemplary code in FIGS. 9A-B only showed one <device> start tag and one <device> end tag, more than one device element may be specified. For example, multiple <device> tag sections (i.e., a section delimited by a device start tag and device end tag) may be used to specify elements for display on a single second computer. In addition, multiple <device> tag sections may be used to specify elements for display on multiple computers, for instance a second computer, third computer, fourth computer, and so on. In the case of multiple computers, the <device> tag may include an attribute to identify which computer the webpage elements are to be displayed on (e.g., <device type="mobile"> and <device type="TV"> and so forth); in addition, different tag names may be used to refer to different connected devices, such as <glasses> to refer to a connected pair of glasses and <phone> to refer to a connected phone.

FIGS. 15A-B illustrate an exemplary embodiment where code for displaying webpage elements on a first computer is stored in a first webpage file and code for displaying webpage elements on a second computer is stored in a second webpage file. The code of files 1500 and 1510 reflects the same output as the code in FIGS. 9A-B but the code has been separated into multiple files.

In an exemplary usage, a first computer may download file 1500 from a web server. The first computer may parse the webpage file 1500 in order to display the appropriate elements. The code 1501 for displaying webpage elements on the first computer is the same as the code 901 shown in a previous example. It may cause display of elements 1001-1006 on the first computer.

Code section 1502 includes a device tag that identifies code for displaying webpage elements on a second computer. As described previously and as shown in the comment, other tag names may be used such as <mobile>, <phone>, <glasses>, or <TV>. The device tag includes a "src" attribute identifying a file where the code for the second computer resides. This "src" attribute "links" to the code for the second computer. The first computer may thus recognize that the linked file should be downloaded and then download the file "second_display.html". The file for displaying code on the second computer may reside on the same server as the file 1500 or may reside on a different server. It may be in the same web domain or a different web domain as the file 1500.

The exemplary file "second_display.html" has code 1510 illustrated in FIG. 15B. The first computer may recognize that all or a portion of the file is code for displaying elements on the second computer and send an indication of webpage elements corresponding to the code to the second computer. In an exemplary embodiment, the first computer sends all or a portion of the file 1510 to the second computer. In this example, all the code in file 1510 is for displaying elements on the second computer. The first computer may send all code in file 1510 to the second computer for the second computer to display the webpage elements.

As described previously, the code of file 1510 need not be sent in text format but may be sent in a variety of formats, such as a serialization of a DOM representation or a list of webpage elements. Thus, an indication of the relevant code portion may be sent from the first computer to the second computer. The second computer may then display the webpage elements specified by the code.

Also, instead of the first computer downloading file 1510 and sending it to the second computer, the first computer may send an identifier of file 1510, such as the file name or address on the network, to the second computer so that the second computer may download the file directly from the server. The first computer may also send an indication that the file contains code for displaying webpage elements on the second computer, so that the second computer recognizes that it should parse the file and display the corresponding webpage elements. The second computer may have a connection to the network independent of the first computer; for instance, the second computer may have a Wi-Fi or cellular connection to the Internet and thereby access web servers. After the second computer has downloaded the file 1510, it may display webpage elements specified by the code in the file 1510.

Webpage file 1510 reflects the same code found in code sections 902-903 shown in previous example (including scripting code 904). The code in file 1510 may cause the display of elements 1011-1017 on a second computer. In addition, scripting code in file 1510 may access and change an image shown on the first computer. This may be accomplished using RPCs as described previously.

The syntax of webpage file 1510 that specifies code for the second computer may be written in a variety of ways, and the syntax used in file 1510 is exemplary. For example, instead of wrapping the content in <html> and <body> tags, the content could instead be wrapped in a <device> tag.

FIGS. 16A-B illustrate exemplary code for displaying elements on a second computer that uses scripting code operating on a first computer. Thus, scripting code on the first computer may be used to specify webpage elements for display on a second computer. In this example, no tags need to be used to specify webpage elements for display on the second computer because the webpage elements are all specified using script.

A first computer may download the webpage file shown in FIGS. 16A-16B from a server. In this example, the code section 1601 is the same as previous example code section 901. It displays elements 1001-1006 on a first computer. The code section 1602, 1603 delimited by <script> and </script> tags defines a script element that contains code for execution by the first computer. The first line of the script section (window.onload=start) specifies that the start function should be called when the document has finished loading. The remainder of the script section defines the "start" function.

The start function includes code for adding elements to a DOM object corresponding to a connected device. In this example, the connected device is a pair of electronic glasses, but the device could be any computer. By adding elements to the DOM object corresponding to the connected device, the first computer indicates that those newly added elements should be displayed on the connected device. After adding the elements, the first computer may send an indication of the newly added webpage elements to the second computer for display. Thus, the first computer enables the second computer to display webpage elements specified by portions of the scripting code. Javascript is used in this example, but other scripting languages can also be used.

In the following example, a device object is obtained that corresponds to the second computer. DOM objects are added to the device object, or DOM descendants of the device object, in order to cause the webpage elements corresponding to the newly added DOM objects to be displayed on the second computer.

In this exemplary code 1602, 1603, the first line of the start function calls the function getAvailableDevices( ) to obtain a list of available devices connected to the first computer and stores a reference to the list in the variable devicesList. The second line stores a reference to the zero-th element of the list in the variable glasses. The example supposes that the zero-th element of the list of available devices is a pair of electronic glasses. The glasses variable is a reference to a device object that corresponds to the pair of glasses.

The fourth line of code creates a "p" (paragraph) element by calling the document.createElement function and stores a reference to it in the variable "paragraph." The fifth line sets an attribute of the newly created "p" element so that it is centered. The sixth line creates a text node with text "Choose Tire Type" using a Javascript call to document.createTextNode. A text node stores text. The seventh line appends the text node as a child of the "p" node so that the text is part of the paragraph defined by the "p" node.

The fourth line of code section 1603 appends the "p" node as a child of the glasses object. Since the glasses object corresponds to a second computer, the first computer may recognize that this line of code is adding a DOM object for displaying a webpage element on a second computer. The first computer may send a representation of the DOM object (e.g., the paragraph element and its attributes and its descendants, such as the text node) to the second computer for display. The second computer may attach the DOM object (e.g., the paragraph element and its attributes and its descendants, such as the text node) to a DOM model representing DOM objects displayed on the second computer. The first computer may send this representation of the DOM object when this line of code is run, or it may batch several DOM objects for sending before making the transmission. The DOM object may be represented in various possible ways when it is sent; for example, it could be serialized, or it could be represented using code (such as portions of Javascript code 1602, 1603).

As noted in the code comment, other forms of syntax may be used. For example, the device object ("glasses") may have children and descendants. In this example the device object may have a "body" child to which the paragraph element could alternatively be added, for similar effect.

Further, the sixth line in code section 1603 shows that DOM objects can also be added to the display of the second computer by adding them to descendants of the device object (rather than the device object itself). The paragraph object was already added as a child of the device object. Thus, this line adds a new text node "!" to the paragraph element. The first computer may recognize that the paragraph element is a descendant of the device object and that elements added to the paragraph element are for display on the second computer. It may send a representation of the DOM object (text node containing "!") to the second computer for display as part of the paragraph element. The second computer may append the text node "!" as a child of the paragraph element in its DOM representation.

The eight and ninth lines of code section 1603 create a new image object with source "normal_tire.png". The fourteenth line of code section 1603 appends the image as a child of the device object. This may cause the display of the image on the second computer. The first computer may send a representation of the new DOM object (image object) to the second computer for display. The second computer may append the image object to its DOM model.

The scripting code in sections 1602, 1603 has the effect of displaying on the second computer the text "Choose Tire Type!" in a centered paragraph, with the image "normal_tire.png" displayed underneath it.

FIG. 16C illustrates that script may be stored in a separate file from the markup code. In this example, the code section 1611 is the same as code section 1601. Meanwhile, code section 1612 includes a <script> tag that links to a separate file "external.js". The first computer may parse and read this and retrieve the external.js file. Upon retrieval, the first computer may run the necessary code in external.js. For example, the external.js file may include the script code that was inlined in code sections 1602, 1603 (the opening and closing <script> tags and HTML comments would not be needed in the external.js file). Thus, the code in FIG. 16C may have the same effect as the code in FIGS. 16A-B.

While the above examples have illustrated webpages having components on both the first computer and second computer, other embodiments may involve webpages that are downloaded by the first computer but only have webpage elements displayed on the second computer.

FIG. 17 illustrates an exemplary webpage file that includes code only for displaying elements on the second computer. There is no content in the <body> element that is to be displayed on the first computer. The first computer may download the file 1700. It may identify code portions for displaying elements on the second computer and send an indication of webpage elements corresponding to the code to the second computer. It may send the code portions, or a representation of them, to the second computer.

The script code 1701 is enclosed in the <device> tags and thus may be executed on the second computer. The script code specifies a start function that is to be called when the document has finished loading (see window.onload=start). Note that the device tag in this example has an id attribute with value "the_device". Thus, the function document.getElementById( ) may be used with parameter "the_device" to obtain a reference to the device object. In this example, such a reference is obtained and stored in the variable "myDevice". The script creates a new image and appends it as a child to the device object. Thus, the script may cause the new image to be added to the display on the second computer.

As described above, a number of possible syntaxes may be used to specify webpage components for display on the first computer or second computer, respectively. FIG. 18A illustrates another possible syntax of a webpage file written in markup language that contains some webpage elements for display on a first computer and other webpage elements for display on a second computer. A first computer may download the exemplary file 1800. The file 1800 includes a <viewset> element defined by <viewset> tags. Inside the <viewset> element are <view> elements defined by <view> tags. The <view> tags define views that may be shown on different devices. In this example, the <view> tags have a "src" attribute that defines the file containing the content to be displayed. In this example, the <view> tags also have a "target" attribute indicating the target computer for displaying the webpage elements. The target "this" is used to indicate the current device, which in this example would be the first computer that downloaded the file 1800. The target "device" is used to indicate a second computer. Other names for targets may be used such as "mobile," "phone," "glasses," or "TV."

In the example file 1800 the two views are targeted to two different computers, but, in some embodiments, multiple views may be targeted to a single computer, which may display the multiple views in different portions of the screen.

A viewset and views may be defined using tags having various names, not necessarily <viewset> and <view>. For example, the <frameset> and <frame> tags that are used in some versions of HTML could be used to define a viewset and views. The <frameset> tag may define a viewset and <frame> tag may define a view.

When the first computer downloads the file 1800 and parses it, it may then download the "first_display.html" and "second_display.html" files for displaying the webpage. These files may be located on the same or a different server as file 1800, and these files may be located in the same web domain or a different web domain as file 1800. The first computer may display the webpage elements specified by the code in the "first_display.html" file because the specified target is "this." The first computer may send an indication of webpage elements in the "second_display.html" file to the second computer for display because the specified target is "device." For example, the code in file "second_dis-play.html" may be transmitted (in various forms) to the second computer. After receipt, the second computer may display the webpage elements specified by the code.

FIG. 18B illustrates an exemplary file 1801 that may be the "first_display.html." The file includes markup language specifying webpage elements for display on the first computer. The code causes the display of elements 1001-1006.

The "second_display.html" file may be specified by code 1510 as shown in FIG. 15B and previously described. The "second_display.html" file specifies code for displaying webpage elements on the second computer. It causes the display of elements 1011-1017 and also includes script code.

As described above, some web browsers and computer applications may represent a document using a DOM model. Also, I have given examples of how a DOM object may represent a second computer, so that descendants of the DOM object representing the second device are displayed or executed on the second computer. A DOM model may be laid out in many ways. A tree representation is just one exemplary possibility. I provide some exemplary, non-limiting DOM models using a tree representation below.

Figure 19A:
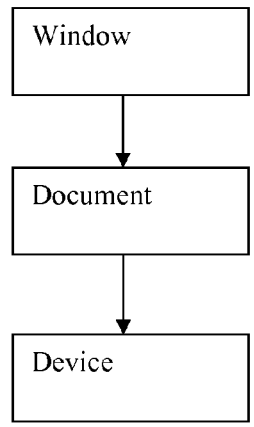
FIGS. 19A-D illustrate exemplary DOM representations of a webpage.

FIG. 19A illustrates an exemplary DOM representation 1900. As shown, some DOM representations may include a window object as the root of the DOM model. Window objects may include attributes or functions for modifying the window containing the web document. For example, sometimes they allow manipulation of the size, toolbar, or other view options of the window. In this example, the window is the root and the document is its child. The document then has a device object representing the second computer as its child. DOM representation 1900 is simplified and many other DOM objects may be present in the DOM model. Window, document, and device may have additional children and descendants not shown here.

Exemplary code is shown to the right of the DOM representation 1900. A function document.getAvailableDevices( ) may return a list of connected devices in the form of an array. A function document.getDevice( ) may return a single connected device, which may be desired if only a single device is connected to the first computer or if it is desired to return only a single highest-priority device that is connected to the first computer. A function document.getElementById(name) may be used to return the object with specified name. In this example, I suppose that the device object is named "the_device" so that the function call returns a reference to the device object. Also, document.device syntax may optionally be used to access the device.

Figure 19B:
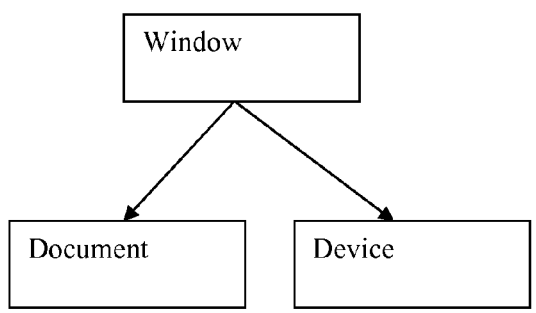

FIG. 19B illustrates an exemplary DOM representation 1901. In this example, a window object is the root of the DOM model and a document object and device object are its children. As before, this DOM model 1901 is simplified and many other nodes may be present.

Exemplary code is shown to the right of the DOM representation 1901. A function window.getAvailableDevices( ) may return a list of connected devices in the form of an array. A function window.getDevice( ) may return a single connected device, which may be desired if only a single device is connected to the first computer or if it is desired to return only a single highest-priority device that is connected to the first computer. A function window.getElementById (name) may be used to return the object with specified name. In this example, I suppose that the device object is named "the_device" so that the function call returns a reference to the device object. Also, window.device syntax may optionally be used to access the device.

Figure 19C:
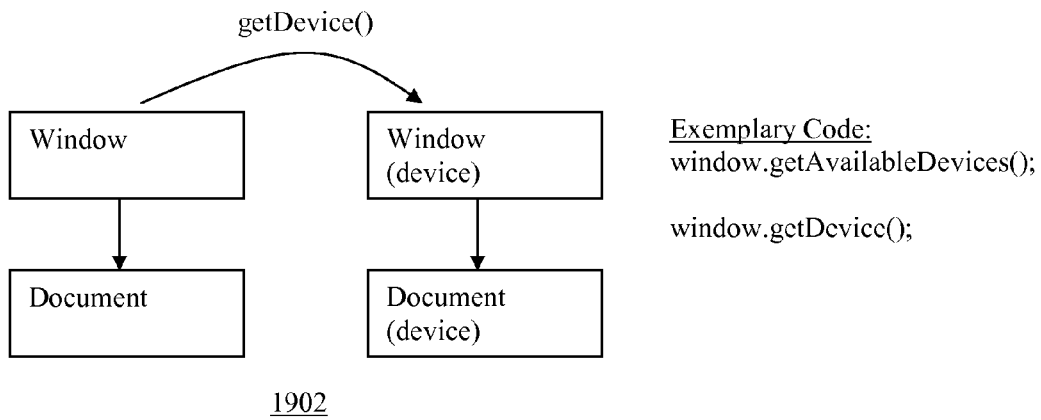

FIG. 19C illustrates an exemplary DOM representation 1902. This representation 1902 includes two trees. A set of multiple trees may be referred to as a "forest." The tree on the left represents the webpage elements displayed on the first computer, while the tree on the right represents webpage elements displayed on the second computer. The "Window (device)" object and "Document (device)" object may represent a window and device on the second computer. Adding DOM objects as descendants of the "Document (device)" object may cause those objects to be displayed on the second computer. An arrow is shown with the "getDevice( )" function indicating that function calls such as getDevice( ) may return a reference to the tree on the right, thereby allowing access to the DOM model of elements on the second computer. As before, this DOM model 1902 is simplified and many other nodes may be present.

Exemplary code is shown to the right of the DOM representation 1902. A function window.getAvailableDevices( ) may return a list of references to the DOM models of multiple connected devices in the form of an array. A function window.getDevice( ) may return a reference to the DOM model of a single connected device, which may be desired if only a single device is connected to the first computer or if it is desired to return only a single highest-priority device that is connected to the first computer.

Figure 19D:
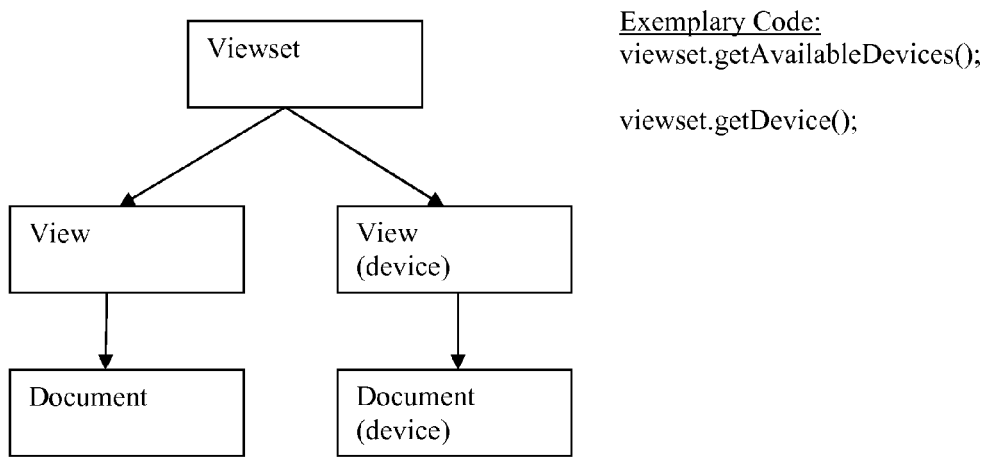

FIG. 19D illustrates an exemplary DOM representation 1903 that may apply when using the viewset syntax as shown in FIGS. 18A-B. In representation 1904, a viewset object is the top of the hierarchy and has view object children. In this example, there are two view object children of the viewset object. The view objects may have a child document object. The "View (device)" and "Document (device)" objects may represent a view and object on the second computer. Adding DOM objects as descendants of the "Document (device)" object may cause those objects to be displayed on the second computer. As before, this DOM model 1903 is simplified and many other nodes may be present.

Exemplary code is shown to the right of the DOM representation 1903. A function viewset.getAvailableDevices( ) may return a list of references to the view objects of multiple connected devices in the form of an array. A function viewset.getDevice( ) may return a reference to the view object of a single connected device, which may be desired if only a single device is connected to the first computer or if it is desired to return only a single highest-priority device that is connected to the first computer.

IV. Exemplary Methods

This section discusses exemplary methods that may be used in some embodiments of the invention.

Figure 20A:
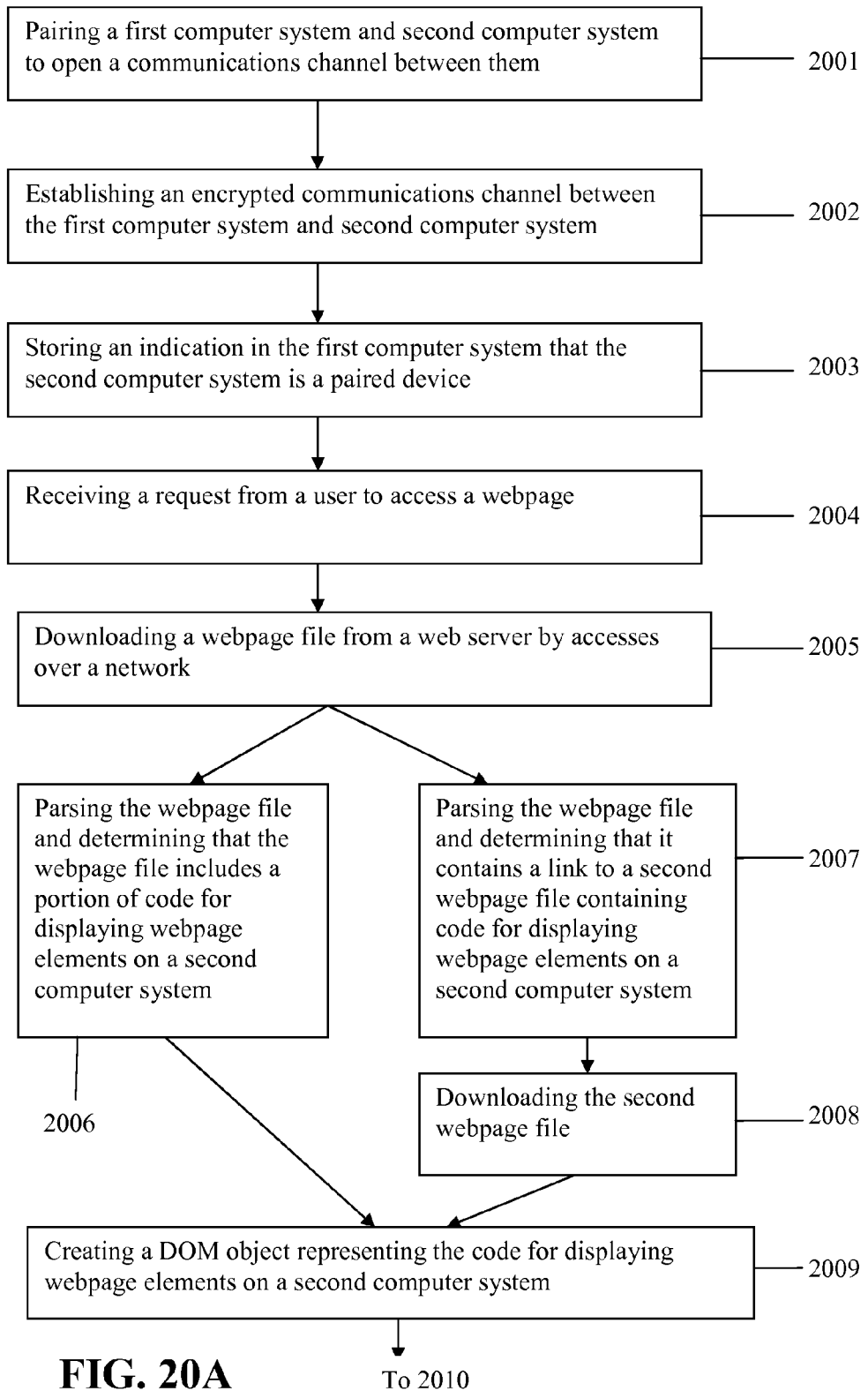
FIGS. 20A-B show a flow chart of an exemplary method for displaying webpage elements on a first and second computer.
Figure 20B:
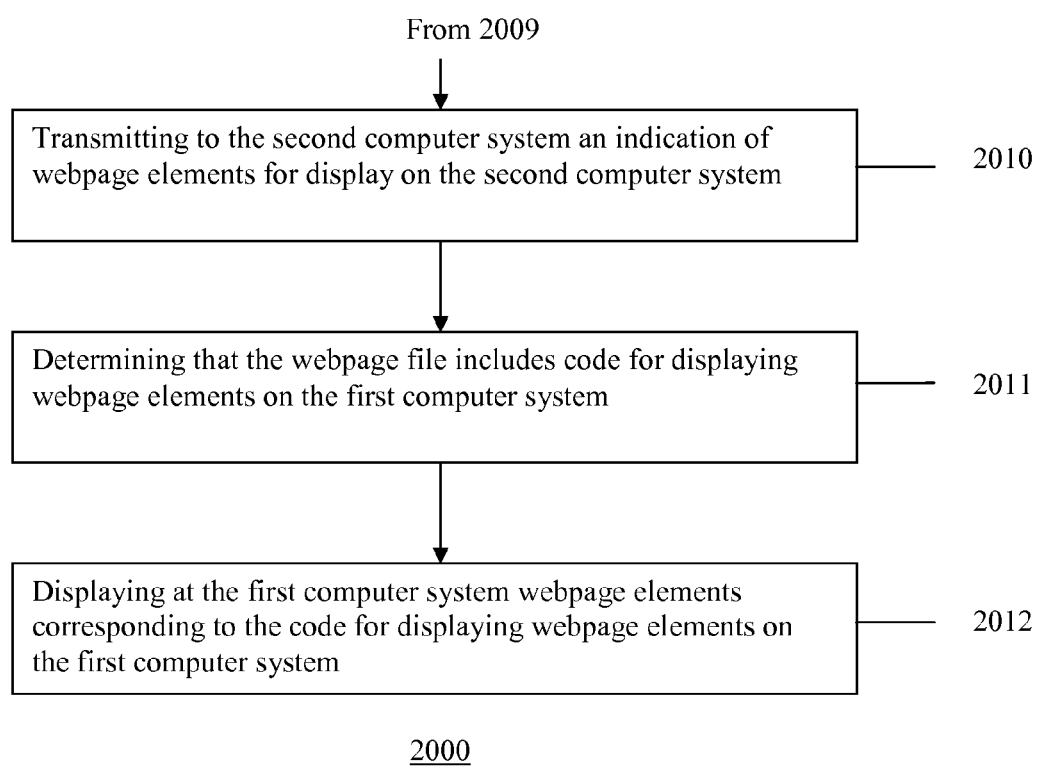

FIGS. 20A-B illustrate an exemplary method 2000 that may be performed in some embodiments of the invention. Method 2000 may allow downloading a webpage by a first computer and displaying elements of the webpage on a first computer and second computer. The method may be performed in an environment including a first computer and a second computer, where the first computer is connected to a server over a network. The first computer may include a web browser or other web-enabled computer application, which may perform some or all of the steps of method 2000. Environment 600 is one environment where method 2000 may be performed.

The first computer system may pair itself with the second computer system (act 2001). Pairing is an optional process where two computers can be associated with each other so that they can transmit and/or receive data from the other computer. Pairing may be used to open a communications channel between the two computers. Bluetooth is one communications protocol that uses the term "pairing" but the term "pairing" as used in this patent is broader than just Bluetooth pairing and includes pairing in any communications protocol.

In embodiments of the invention, the first computer and second computer may be physically separate. Being physically separate means that the two computers are two distinct units. Two computers connected by a cable, such as a USB cable, are still physically separate if they are two distinct units.

The first computer system may also establish an encrypted communications channel with the second computer system (act 2002). One way to obtain an encrypted communications channel is to use a key exchange protocol. A key exchange protocol may be used to establish a shared secret between the first computer and second computer. The shared secret, or another key derived from the shared secret, may be used to encrypt the communications channel. "Encrypt a communications channel" means to encrypt messages sent on a communications channel.

The Diffie-Hellman protocol and its variants such as Elliptic Curve Diffie-Hellman are examples of key exchange protocols. One exemplary version of Diffie-Hellman may be described as follows: the first computer system and the second computer system each having a Private Key and Public Key. The Public Key is easy to derive from the Private Key. However, it is computationally difficult to calculate the Private Key from the Public Key. Given key pairs A and B, there is a function F such that F(PublicA, PrivateB)=F(PublicB, PrivateA). The result of the function is the shared secret that allows opening a secure communication channel. To use the algorithm, the first computer system sends its Public Key A to the second computer but does not send its Private Key A, and the second computer sends its Public Key B to the first computer system but does not send its Private Key B. The first computer system computes F(PublicB, PrivateA) and the second computer computes F(PublicA, PrivateB). The result obtained is identical in the first computer system and second computer system, thereby creating a shared secret.

Variants of the Diffie-Hellman protocol include the basic version where the parties agree on a prime p and base g. A party determines a private key a and a public key g^a mod p. The function F(public, private)=public^(private) mod p. Another variant is Elliptic Curve Diffie-Hellman (ECDH). The Elliptic Curve Diffie-Hellman protocol is based on the difficulty of solving the elliptic curve discrete logarithm problem. One publicly available implementation of ECDH is Curve25519 by D. J. Bernstein available at http://cr.yp.to/ecdh.html.

Encryption is optional. It is also possible to communicate between the first computer and second computer using an open communications channel.

When the first computer and second computer are paired, the first computer may store an indication that the second computer system is a paired device (act 2003). Similarly, the second computer system may store an indication that the first computer system is a paired device.

The first computer may receive an indication from a user to access a webpage (act 2004). This request may be received in various ways. For example, it may be received by the user activating a link or user interface element in a web browser or other computer application. It may be received by the user entering an address, such as a Uniform Resource Locator (URL), into the address field of a web browser or other computer application.

In response to the user's request, the first computer may download the webpage file requested by the user from a web server by accesses over a network (act 2005). The downloading may be performed by the web browser or other computer application. The webpage file may comprise code, such as HTML code or Javascript.

The first computer may parse the downloaded webpage file. The parsing may be performed by a web browser or other computer application. The first computer may determine that the webpage file includes a portion of code (e.g., HTML code) for displaying webpage elements on the second computer system (act 2006). This portion of code for displaying webpage elements on the second computer system may be delimited by one or more tags (e.g., HTML tags) that identify the code as being for displaying webpage elements on the second computer system. Examples have been given of device tags (e.g., <device>, <mobile>, <phone>, <glasses>, or <TV>) that identify code within the tags as being for display on the second computer. For example, see code sections 902, 903.

Alternatively or in addition, the first computer may parse the webpage file and determine that the webpage file includes a link to a second webpage file containing a portion of code for displaying webpage elements on a second computer system (act 2007). In an HTML embodiment, the first computer may determine that the first webpage file includes an HTML tag identifying a second webpage file and the HTML tag may identify that the second webpage file includes a portion of code for displaying webpage elements on the second computer system. An HTML tag may identify the second webpage file by including a link to the file as an attribute of the tag. As an example, see code section 1502, which includes an HTML device tag with a link to a second webpage file as part of the src attribute. The HTML device tag identifies the second webpage file as including a portion of HTML code for displaying webpage elements on the second computer system. The first computer system may then download the second webpage file by accesses over the network (act 2008).

Whether by step 2006 or steps 2007, 2008, the first computer has identified code for displaying webpage elements on a second computer system. The first computer may optionally create a DOM object representing the code for displaying webpage elements on a second computer system (e.g., the code inlined in the initial webpage file or the code portion from the second webpage file) (act 2009). The first computer may make this DOM object accessible to scripting code via the DOM of the web browser or other computer application. In such a case, then scripting code may call methods or manipulate variables of the DOM object using the DOM interface. As an example, FIG. 11 illustrates a device object that is part of a DOM model of a webpage. In that example, the device object represents the code for displaying webpage elements on a second computer that is enclosed in device tags. In that example, webpage elements for display on the second computer are descendants of the device object. Other examples of DOM objects representing code for displaying webpage elements on a second computer system are illustrated in DOM models 1900-1903.

The first computer may transmit over the communication channel between the first and second computer an indication of webpage elements for the second computer to display (act 2010). An "indication of webpage elements" means data that allows display of the webpage elements. Code (e.g., HTML, Javascript) that specifies a webpage element is one kind of "indication of a webpage element." Other representations, such as a serialization of DOM objects or a list of markup tags and content, may also be an "indication of a webpage element."

Thus, in one embodiment, the first computer transmits to the second computer over the communications channel an indication of the portion of code for displaying webpage elements on the second computer system. As described previously, an indication of the code portion may be sent in many possible formats (see, e.g., FIG. 12). It may comprise the code itself, or may comprise other representations, such as a serialization of a DOM representation or a list of tags. The first computer may thereby enable the second computer system to display webpage elements corresponding to the portion of code for displaying webpage elements on the second computer system.

Also, as I have previously described, an alternative to the first computer downloading and transmitting a portion of code to the second computer is that the first computer recognizes a link to a file containing code for displaying webpage elements on a second computer and sends an indication of the file to the second computer for the second computer to download the file directly. In that case, the first computer does not need to perform step 2008 (downloading the second webpage file), and the second computer downloads the file from the server. The indication of the file sent by the first computer to the second computer is an indication of webpage elements for the second computer to display because it allows the second computer to download the file specifying webpage elements. I gave an example of the aforementioned feature with respect to code section 1502. In that example, the first computer may recognize that the src attribute of the device tag identifies a file containing code for displaying elements on a second computer and may send an indication of the file to the second computer for the second computer to download. The second computer may download the webpage file. The webpage file may contain code that indicates webpage elements to display.

After receiving the indication of the webpage elements for display (from the first computer or the server), the second computer may load and display the webpage elements. When the indication of webpage elements is code, the second computer may interpret the code in order to generate the webpage elements. For example, see elements 1011-1017 displayed on a second computer.

The first computer may also determine that the webpage file includes a portion of code for displaying webpage elements on the first computer system (act 2011). For example, see code section 901, which is code for displaying webpage elements on a first computer system. The first computer may display at the first computer system webpage elements corresponding to the portion of code for displaying webpage elements on the first computer system (act 2012). For example, see elements 1001-1006 displayed on the second computer system.

The above method 2000 is exemplary. Steps can be eliminated, can be performed in different orders or in parallel, and may be split up to be performed by different entities in a network environment. Steps are optional unless stated otherwise. For example, step 2011 and/or step 2012 for determining that the webpage includes code for displaying webpage elements on the first computer and displaying webpage elements on a first computer may occur before steps 2006, 2007 for determining that the webpage includes code (or a link to code) for displaying webpage elements on a second computer system. The first computer may determine that code in the webpage is for displaying elements on the first computer and/or second computer system in various orders. Also, steps 2011 and/or 2012 could occur after steps 2006, 2007 but before step 2010 of transmitting an indication of webpage elements to the second computer system.

Method 2000 may also be used to display elements of a webpage on a second computer only and not the first computer by eliminating steps 2011 and 2012. Performance of steps 2001-2010 may be used to display elements on a second computer without displaying elements on a first computer.

Figure 21A:
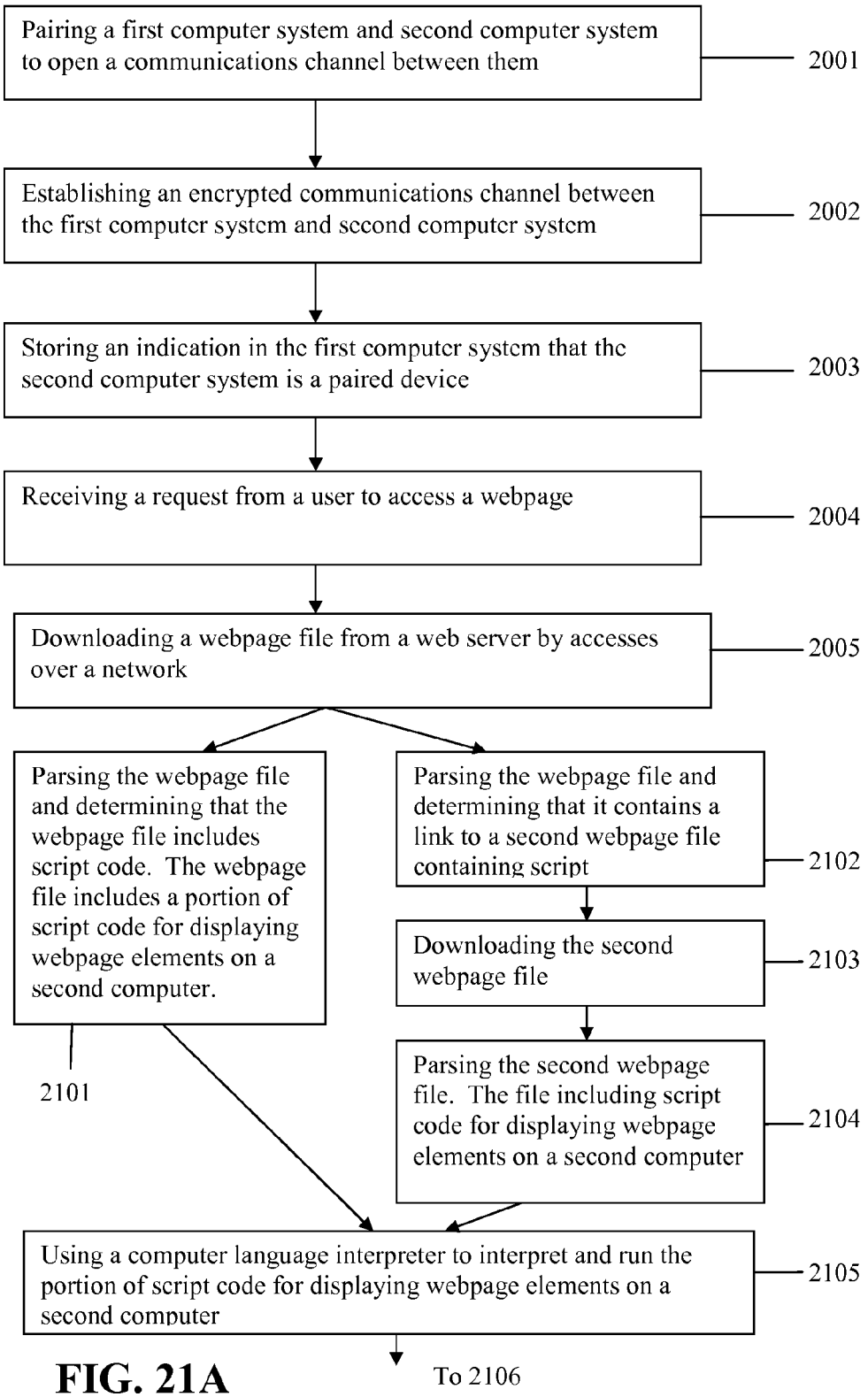
FIGS. 21A-B show a flow chart of an exemplary method for displaying webpage elements on a first and second computer and using script code.
Figure 21B:
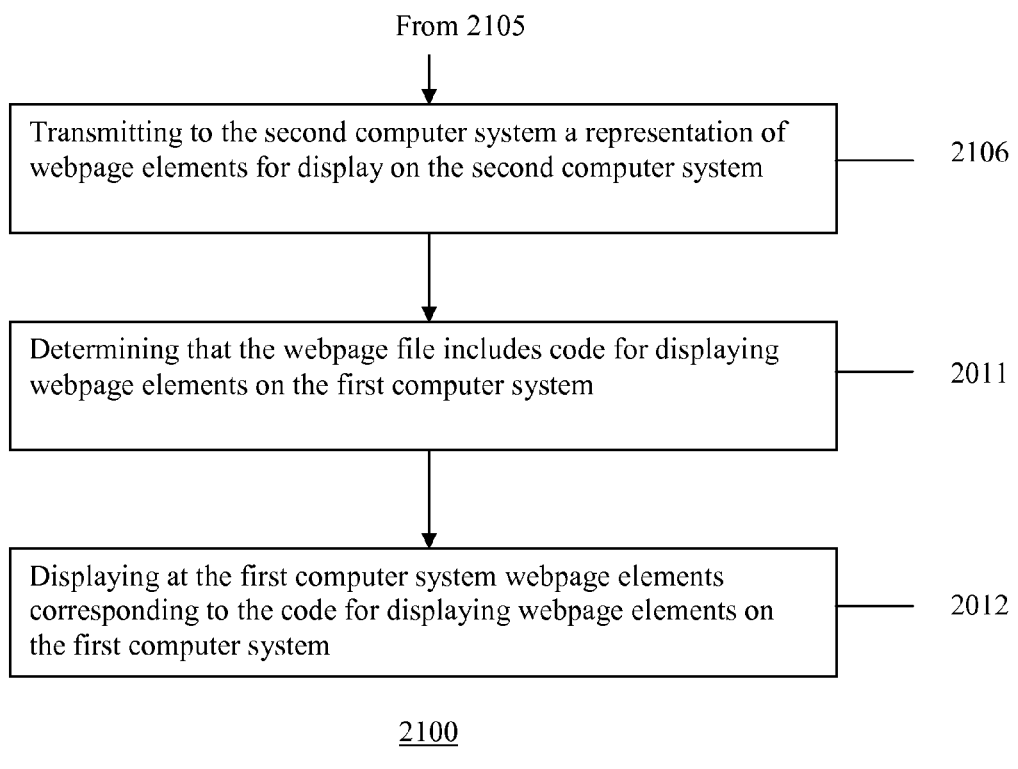

FIGS. 21A-B illustrate an exemplary method 2100 that may be performed in some embodiments of the invention. Method 2100 may allow downloading a webpage by a first computer and displaying elements of the webpage on a first computer and second computer. The method may be performed in an environment including a first computer and a second computer, where the first computer is connected to a server over a network. The first computer may include a web browser or other web-enabled computer application, which may perform some or all of the steps of method 2100. Environment 600 is one environment where method 2100 may be performed.

Exemplary method 2100 includes steps 2001-2005, which have been previously described with respect to method 2000.

After the first computer has downloaded a webpage file from a web server, the first computer may parse the webpage file and determine that the webpage file includes script code (act 2101). The first computer may determine that the webpage file includes script code because of <script> tags that delimit the areas of script code. See, for example, code sections 1602, 1603. Script code may be Javascript or other kinds of script. In method 2100, the script code includes a portion of code for displaying webpage elements on the second computer system.

Alternatively or in addition, the first computer may parse the webpage file and determine that it contains a link to a second webpage file containing script (act 2102). In some embodiments, this step may be performed by the first computer determining that the webpage file includes a tag (e.g., HTML tag) identifying a second webpage file, where the tag identifies that the second webpage file includes scripting code. For example, a <script> tag may have a src attribute that identifies a file containing script code. The <script> tag identifies that the linked file contains script. For example, see code section 1612. The first computer may download the second webpage file by accesses over the network (act 2103). The first computer may parse the second webpage file (act 2104). The second webpage file may include a portion of script code for displaying webpage elements on a second computer.

Thus, the webpage may include script code for displaying webpage elements on a second computer inline in the initial webpage file (see step 2101), or in a second webpage file that is linked from the initial webpage file (see steps 2102-2104). In either case, the script may have a portion of code including a reference to a DOM object corresponding to the second computer system and including calls to one or more methods of the DOM object to add webpage elements to the DOM object for display on the second computer system. To "add webpage elements" to the DOM object includes adding child nodes or descendant nodes of the DOM object. For example, code section 1602, 1603 illustrates that a DOM object may correspond to the second computer (see "glasses" variable storing a reference to the DOM object in code section 1602). Code sections 1602, 1603 illustrate use of the appendChild( ) method to add webpage elements as child nodes of the DOM object and thereby cause their display on the second computer. Code section 1603 also illustrates adding a webpage element as a descendant, but not direct child, of the DOM object representing the second computer in order to cause its display (see paragraph.appendChild(document.createTextNode("!")), which adds a child to the paragraph element which is a child of the glasses object). Also, FIGS. 19A-D illustrate various method calls that may be used in some embodiments to retrieve a reference to a DOM object corresponding to the second computer system.

Further, the first computer may use a computer language interpreter to interpret and run the portion of script code for displaying webpage elements on a second computer (act 2105). In some embodiments, this step comprises using a Javascript interpreter to interpret and run the portion of Javascript code.

The first computer may transmit to the second computer system over the communications channel with the second computer system a representation of webpage elements for display on the second computer system (act 2106). As described previously, the representation of webpage elements for display on the second computer system may be sent in various formats. The script code that generated the webpage elements may comprise a "representation" of the webpage elements, also a serialization of the DOM objects of the webpage elements may comprise a "representation" of the webpage elements, and other representations are also allowed. Thereby, the first computer may enable the second computer system to display webpage elements specified by the portion of script code for displaying webpage elements on the second computer system.

The second computer may load and display webpage elements corresponding to the representation of webpage elements it receives from the first computer system.

Exemplary method 2100 may also include steps 2011 and 2012, which have been previously discussed.

The above method 2100 is exemplary. Steps can be eliminated, can be performed in different orders or in parallel, and may be split up to be performed by different entities in a network environment. Steps are optional unless stated otherwise. For example, step 2011 and/or step 2012 for determining that the webpage includes code for displaying webpage elements on the first computer and displaying webpage elements on a first computer may occur before steps 2101, 2102 for determining that the webpage includes script (or a link to script). Also, steps 2011 and/or 2012 could occur after steps 2101, 2102 but before step 2106 of transmitting a representation of webpage elements to the second computer system.

Also, method 2100 may be used to display elements of a webpage on a second computer only and not the first computer by eliminating steps 2011 and 2012. Performance of steps 2001-2005 and steps 2101-2106 may be used to display elements on a second computer without displaying elements on a first computer.

As discussed previously, an optional feature in some embodiments may allow script code on a second computer to access an object on the first computer, or, vice versa, may allow script code on a first computer to access an object on the second computer.

Figure 22A:
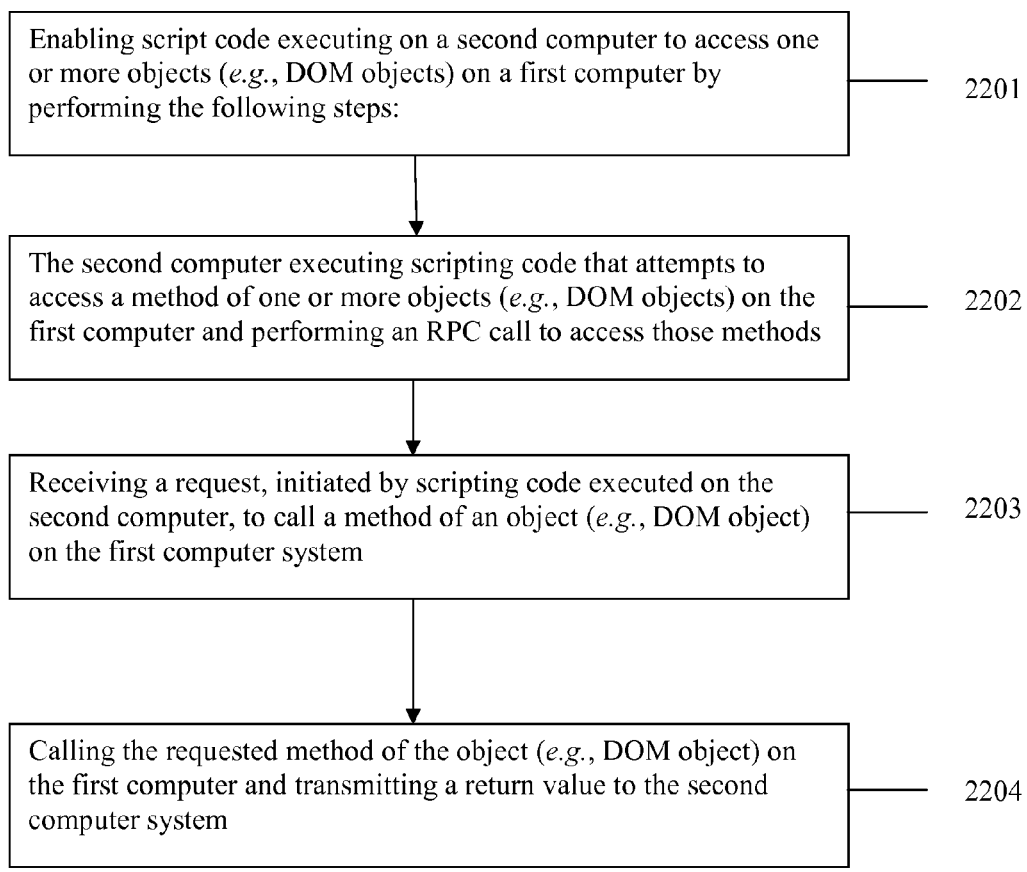
FIGS. 22A-C show flow charts illustrating exemplary methods for enabling script code on a second computer to access objects on a first computer or for enabling script code on a first computer to access objects on a second computer.

FIG. 22A illustrates an exemplary method 2200 that may be performed in some embodiments of the invention. Steps of method 2200 may be performed by a web browser or other computer application on the first computer/second computer.

The method 2200 includes enabling script code on a second computer to access one or more objects (e.g., DOM objects) on a first computer by performing a series of steps (act 2201). The second computer may execute script code that attempts to access a method of one or more objects on the first computer (act 2202). The second computer may thus perform an RPC call to access the methods of those objects.

The first computer may receive a request, initiated by scripting code executed on a second computer system, to call a method of an object stored on the first computer system (act 2203). The first computer may call the requested method of the object on the first computer and transmit a return value to the second computer system (act 2204).

As an example, code section 904 includes script code on a second computer system for accessing an object on a first computer system. It includes calls to methods of objects on the first computer system. Thus, upon execution of that code, the method 2200 may be performed.

The computer initiating an RPC call may call a client stub procedure and pass parameters to the stub. The stub may marshal parameters into a message and send the message to the computer that will perform the RPC call. The receiving computer may then demarshal the parameters and call the desired function. It may marshal return values into a message and send it to the computer that initiated the RPC call. That computer may receive and demarshal the return value.

The above method 2200 is exemplary. Steps can be eliminated, can be performed in different orders or in parallel, and may be split up to be performed by different entities in a network environment. Steps are optional unless stated otherwise.

Figure 22B:
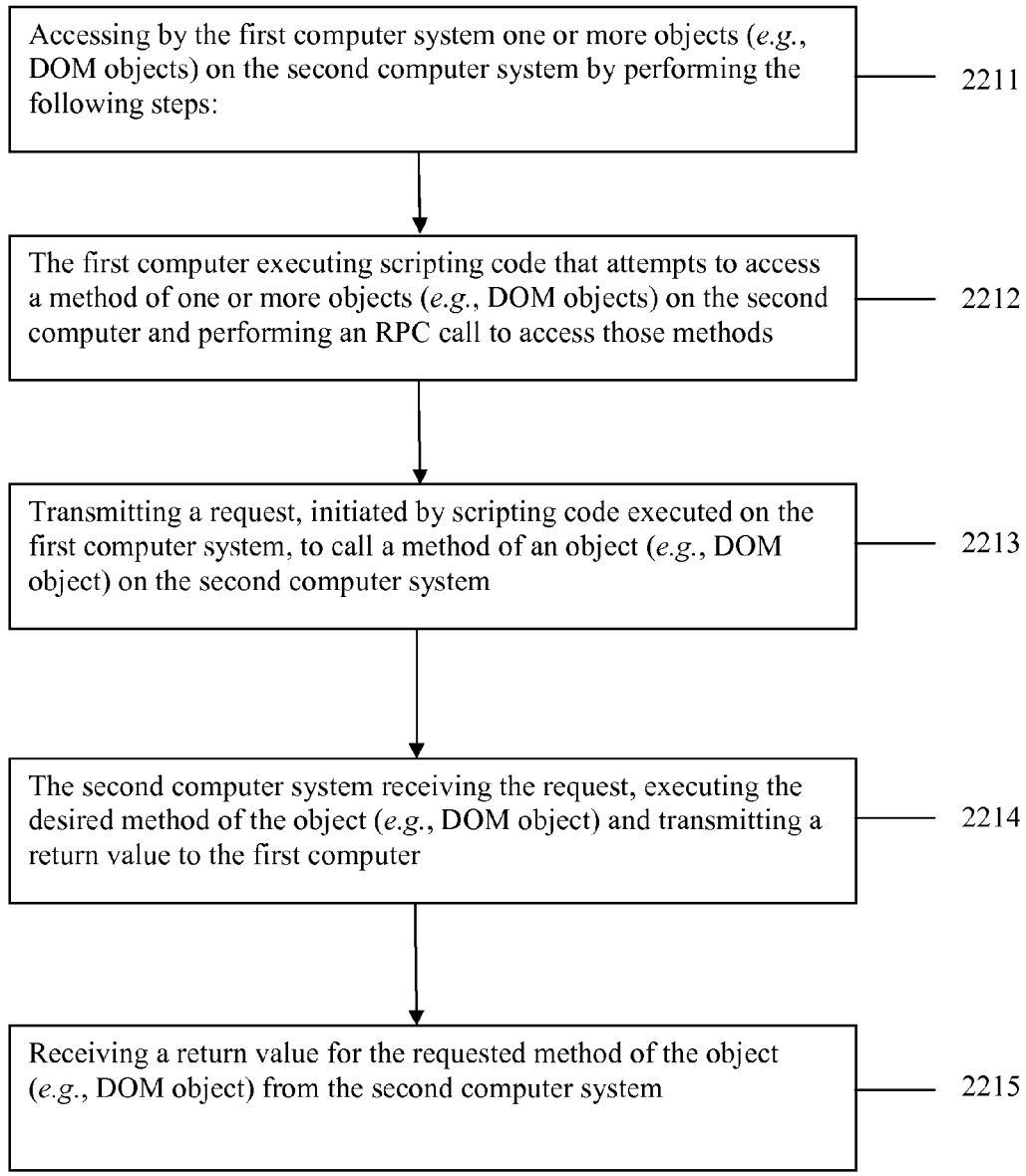

FIG. 22B illustrates an exemplary method 2210 that may be performed in some embodiments of the invention. Steps of method 2210 may be performed by a web browser or other computer application on the first computer/second computer.

The method 2210 includes accessing by the first computer system one or more objects (e.g., DOM objects) on the second computer system by performing a series of steps (act 2211). The first computer may execute script code that attempts to access a method of one or more objects on the second computer and may perform an RPC call to access those methods (act 2212). The first computer may transmit a request, initiated by scripting code executed on the first computer system, to call a method of an object on the second computer system (act 2213). The second computer may receive the request, execute the desired method of the object, and transmit a return value to the first computer (act 2214). The first computer may receive a return value for the requested method of the object from the second computer system (act 2215).

As an example, FIG. 14 includes script code for execution on a first computer that accesses objects on a second computer system. It includes calls to methods of objects on the second computer system. Thus, upon execution of that code, the method 2210 may be performed.

The above method 2210 is exemplary. Steps can be eliminated, can be performed in different orders or in parallel, and may be split up to be performed by different entities in a network environment. Steps are optional unless stated otherwise.

The methods 2200 and 2210 may be performed in embodiments that also perform methods 2000 or 2100. In some embodiments, the methods 2200 or 2210 may be performed after the webpage has finished its initial loading and display. For example, the methods 2200, 2210 may be performed in response to script code in an event handler that is called after the initial loading and display of the webpage has completed.

Figure 22C:
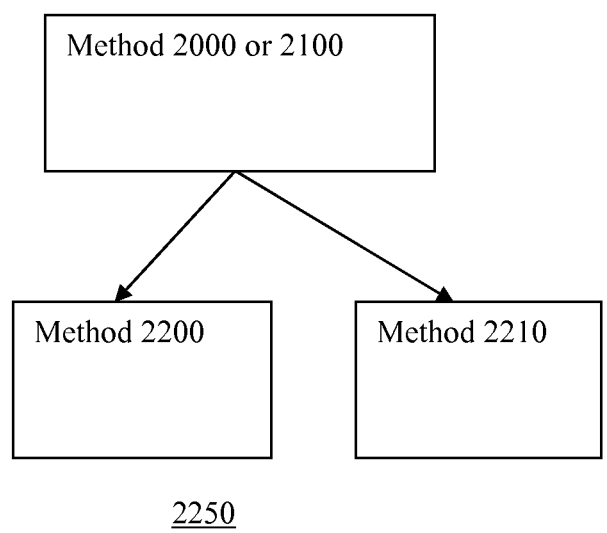

FIG. 22C illustrates a method 2250 including both method 2000, 2100 and method 2200, 2210. Method 2250 is exemplary and the methods can be performed in different orders, or in parallel, than as shown in the exemplary diagram. Steps from methods 2000, 2100 may be interleaved with steps from methods 2200, 2210.

Methods 2200 and 2210 may also be performed independently of methods 2000 or 2100. Methods 2200 and 2210 may be performed in environments that do not include the feature that a first computer downloads a webpage file including code for displaying webpage components on a second computer.

Figure 23A:
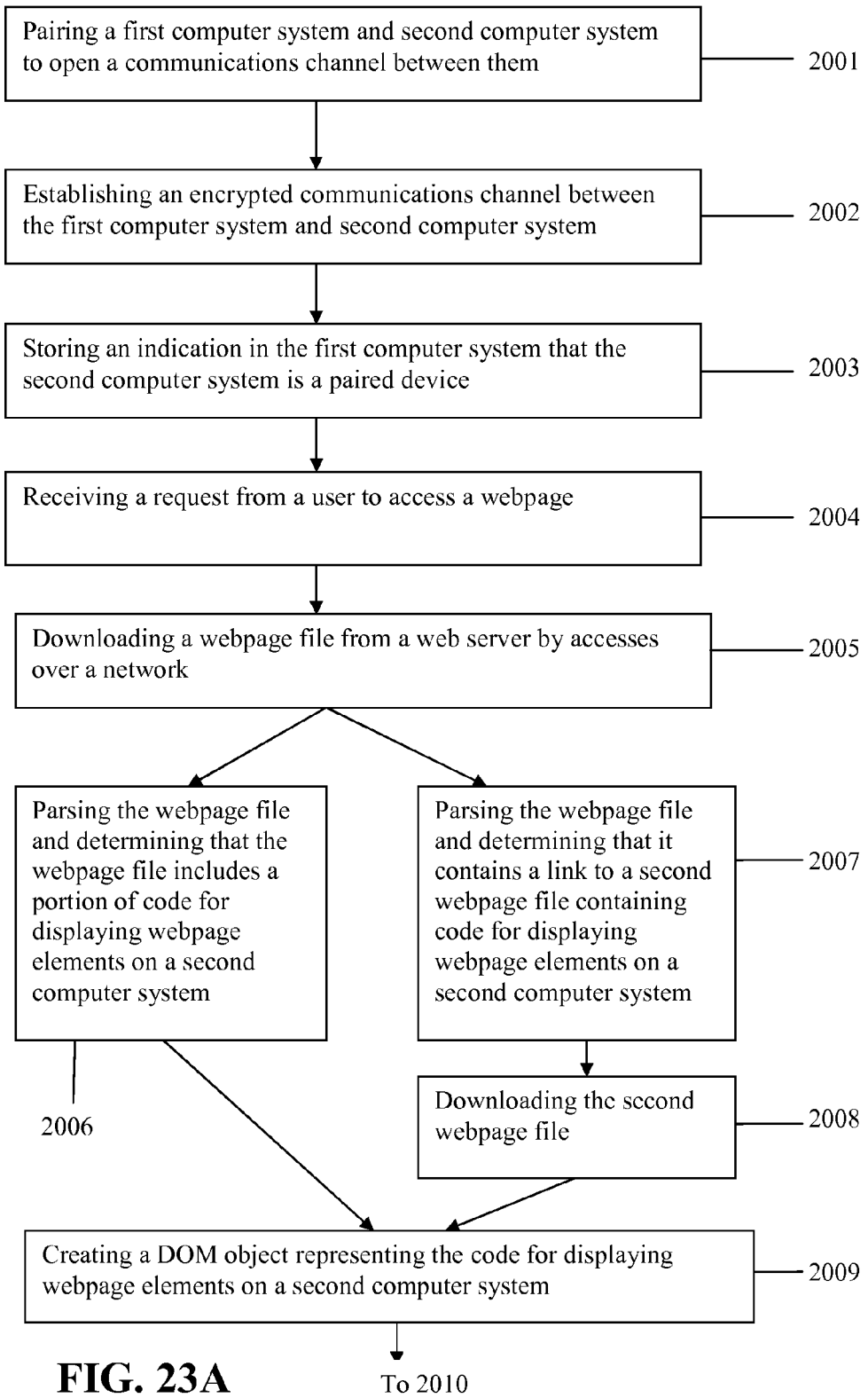
FIGS. 23A-C show flow charts illustrating an exemplary method for triggering a finished loading event when the first and second computer have finished loading webpage elements.
Figure 23B:
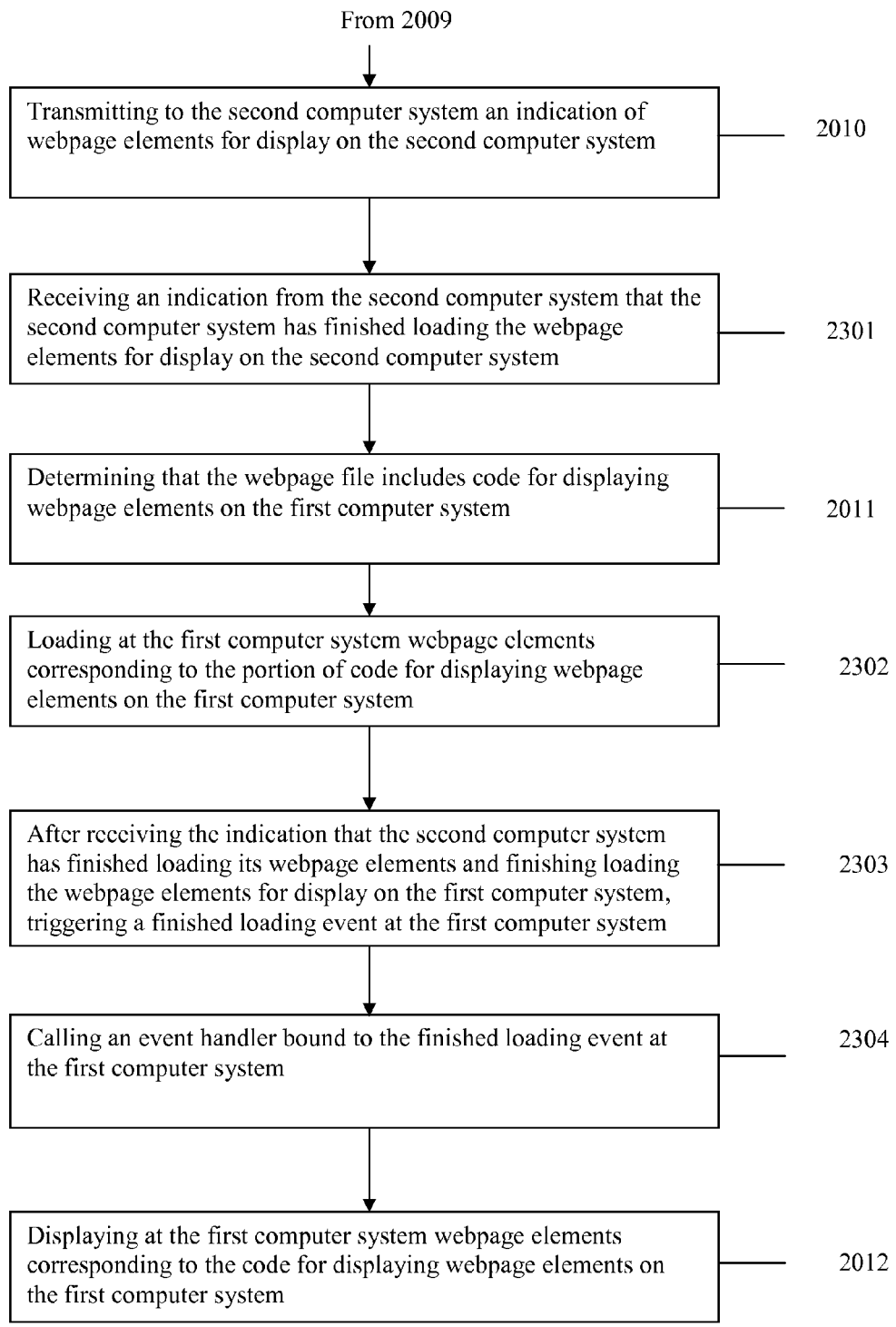

FIG. 23 illustrates a method 2300 that may be performed in some embodiments of the invention. Steps of method 2300 may be performed by a web browser or other computer application. The method 2300 allows for the receipt of a signal from the second computer system indicating that the second computer system has finished loading its webpage elements. Generally, loading has completed when the webpage elements have completed downloading to the local computer and the webpage is ready for display. Then, when the first computer has also finished loading its webpage elements for display, it may trigger a finished loading event. A "finished loading event" is an event that indicates that loading has completed. Event handlers may be bound to different events, in which case the handler would be called when the event occurs. Thus, an event handler may be bound to the finished loading event and may be called when the finished loading event occurs.

The exemplary method 2300 includes the steps 2001-2012, which have been previously described. In method 2300, when the second computer finishes loading its webpage elements, it may send an indication that it has finished loading to the first computer. The second computer has finished loading its webpage elements when it has finished receiving the webpage elements (e.g., from the first computer or by direct download from the server) and the webpage elements are ready for display. The first computer may receive an indication from the second computer system that the second computer system has finished loading the webpage elements for display on the second computer system (act 2301).

The first computer may also determine that the webpage includes a portion of code (e.g., HTML code) for displaying webpage elements on the first computer (act 2011). The first computer may load webpage elements corresponding to the portion of code for displaying webpage elements on the first computer (act 2302). In other words, it may load the webpage elements that it itself is to display. The first computer finishes loading the webpage elements when it has finished downloading the webpage elements (e.g., from the server or elsewhere) and they are ready for display. After the first computer has received an indication that the second computer system has finished loading its webpage elements for display on the second computer system and the first computer has finished loading the webpage elements corresponding to the portion of code for displaying webpage elements on the first computer system, then the first computer may trigger a finished loading event at the first computer system (act 2303). Further, there may be an event handler bound to the finished loading event. If so, the first computer may call the event handler bound to the finished loading event (act 2304).

By triggering a finished loading event and allowing the calling of event handlers bound to the finished loading event (if any), the first computer allows running code in event handlers when it is sure that the webpage has completed loading at the first computer and second computer.

The above method 2300 is exemplary. Steps can be eliminated, can be performed in different orders or in parallel, and may be split up to be performed by different entities in a network environment. Steps are optional unless stated otherwise. Also, the second computer may generally proceed asynchronously from the first computer system and so it may finish loading its webpage elements at various times. Thus, the step 2301 of receiving an indication that the second computer system has finished loading its webpage elements may occur at various times in the method 2300. In some cases, it may occur after the first computer has finished loading, and even displaying, its webpage elements. Thus, it should be understood that the steps of method 2300 may occur in various other orders.

Further, step 2011 and/or step 2302 and/or step 2012 for determining that the webpage includes code for displaying webpage elements on the first computer, loading webpage elements, and displaying webpage elements on a first computer may occur before steps 2006, 2007 for determining that the webpage includes code (or a link to code) for displaying webpage elements on a second computer system. The first computer may determine that code in the webpage is for displaying elements on the first computer and/or second computer system in various orders. Also, steps 2011 and/or step 2302 and/or step 2012 could occur after steps 2006, 2007 but before step 2010 of transmitting an indication of webpage elements to the second computer system.

Figure 23C:
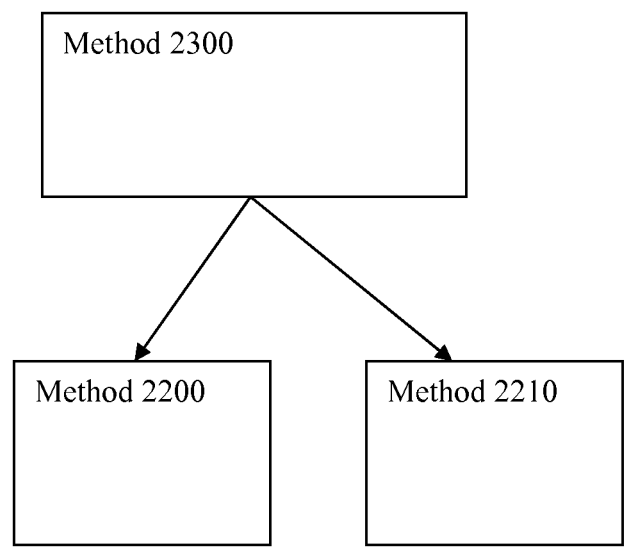

Also, the methods 2200 and 2210, which allow script code on a second computer to access an object on the first computer, or, vice versa, allow script code on a first computer to access an object on the second computer, may be performed in embodiments that perform method 2300. In some embodiments, methods 2200 and/or 2210 are performed after the webpage has finished loading and display. FIG. 23C illustrates a method 2350 including method 2300 and methods 2200, 2210. Method 2350 is exemplary and the methods can be performed in different orders, or in parallel, than as shown in the exemplary diagram. Steps from method 2300 may be interleaved with steps from methods 2200, 2210.

Figure 25:
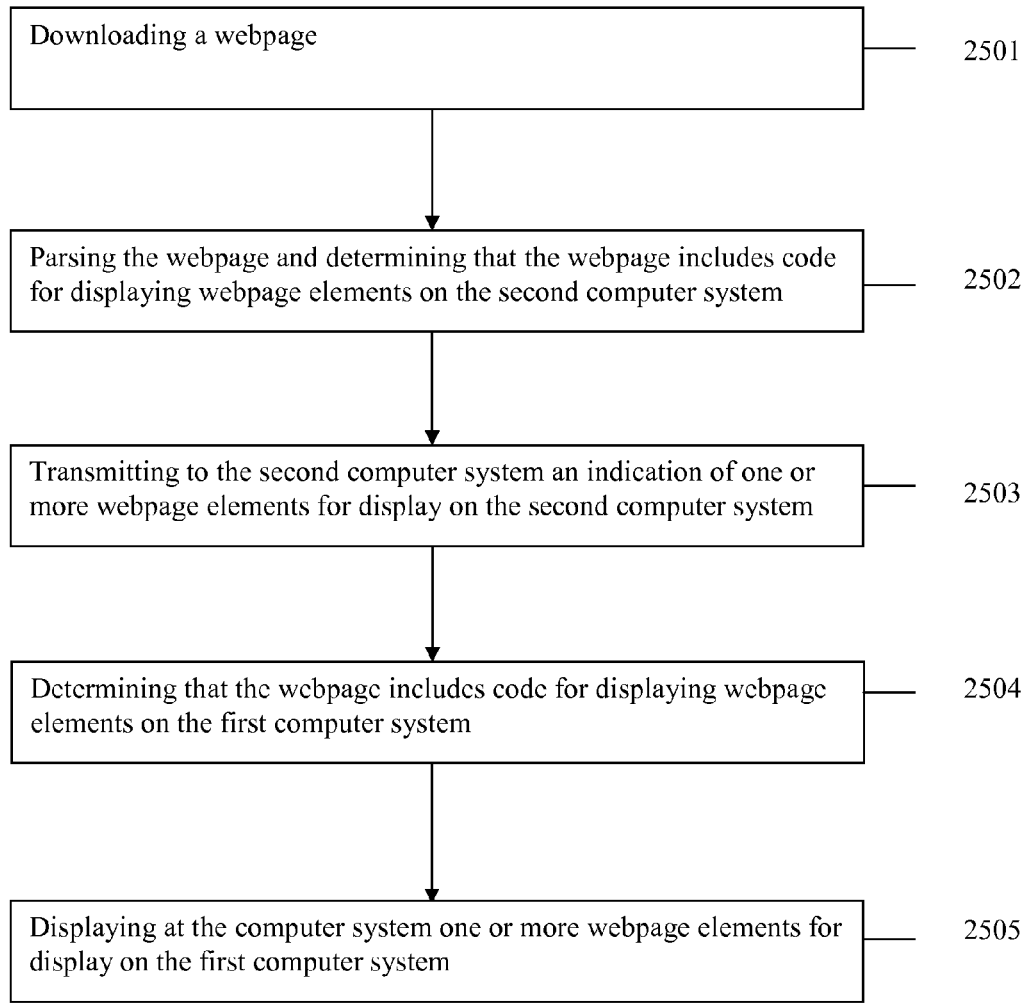
FIG. 25 shows a flow chart describing an exemplary method for displaying webpage elements on a first and second computer.

FIG. 25 illustrates another exemplary method 2500 that may be performed by some embodiments. Method 2500 summarizes some of the aspects of methods 2000 and 2100. Method 2500 may allow downloading a webpage by a first computer and displaying elements of the webpage on a first computer and second computer. The method may be performed in an environment including a first computer and a second computer, where the first computer is connected to a server over a network. Environment 600 is one environment where method 2500 may be performed. Steps of method 2500 may be performed by a web browser or other computer application.

The first computer may download a webpage from a web server by accesses over a network (act 2501). A webpage may comprise one or more webpage files. The first computer may parse the webpage and determine that the webpage includes code for displaying webpage elements on the second computer system (act 2502). Webpage code for displaying webpage elements on the second computer system may be in an initial webpage file downloaded by the first computer or in additional webpage files, such as in additional webpage files linked from the initial webpage file or other webpage files. The first computer may transmit to the second computer system an indication of one or more webpage elements for display on the second computer system, thereby enabling the second computer system to display the one or more webpage elements for display on the second computer system (act 2503). As described previously, an indication of a webpage element is data that allows display of the webpage element and may take the form of code (e.g., HTML, Javascript), serialized DOM representations, or other representations. An indication of webpage elements may also take the form of a link to a webpage file that the second computer may download for display. In addition, the first computer may determine that the webpage includes code for displaying webpage elements on the first computer system (act 2504). It may display at the first computer system one or more webpage elements that are for display on the first computer system (act 2505).

The above method 2500 is exemplary. Steps can be eliminated, can be performed in different orders or in parallel, and may be split up to be performed by different entities in a network environment. Steps are optional unless stated otherwise. For example, step 2504 and/or step 2505 for determining that the webpage includes code for displaying webpage elements on the first computer and displaying webpage elements on a first computer may occur before step 2502 for determining that the webpage includes code for displaying webpage elements on a second computer system. The first computer may determine that code in the webpage is for displaying elements on the first computer and/or second computer system in various orders. Also, steps 2504 and/or 2505 could occur after step 2502 but before step 2503 of transmitting an indication of webpage elements to the second computer system.

Method 2500 may also be used to display elements of a webpage on a second computer only and not the first computer by eliminating steps 2504 and 2505. Performance of steps 2501-2503 may be used to display elements on a second computer without displaying elements on a first computer.

V. Exemplary Applications

This section describes exemplary applications of some of the features described herein. The following applications are only non-limiting examples. A wide variety of applications of the above features may be made.

Figure 24A:
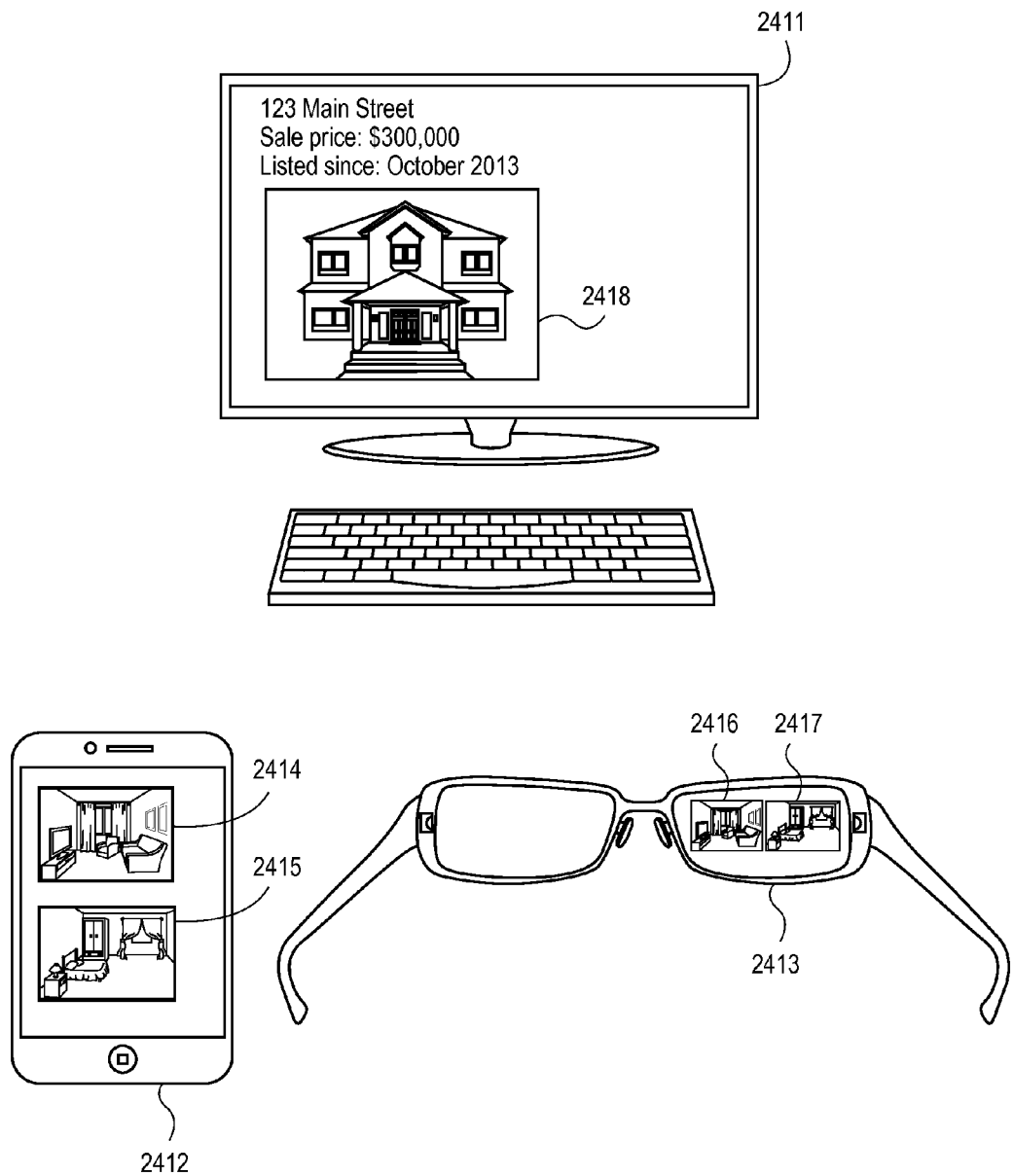
FIGS. 24A-C illustrate exemplary applications of some embodiments.
Figure 24B:
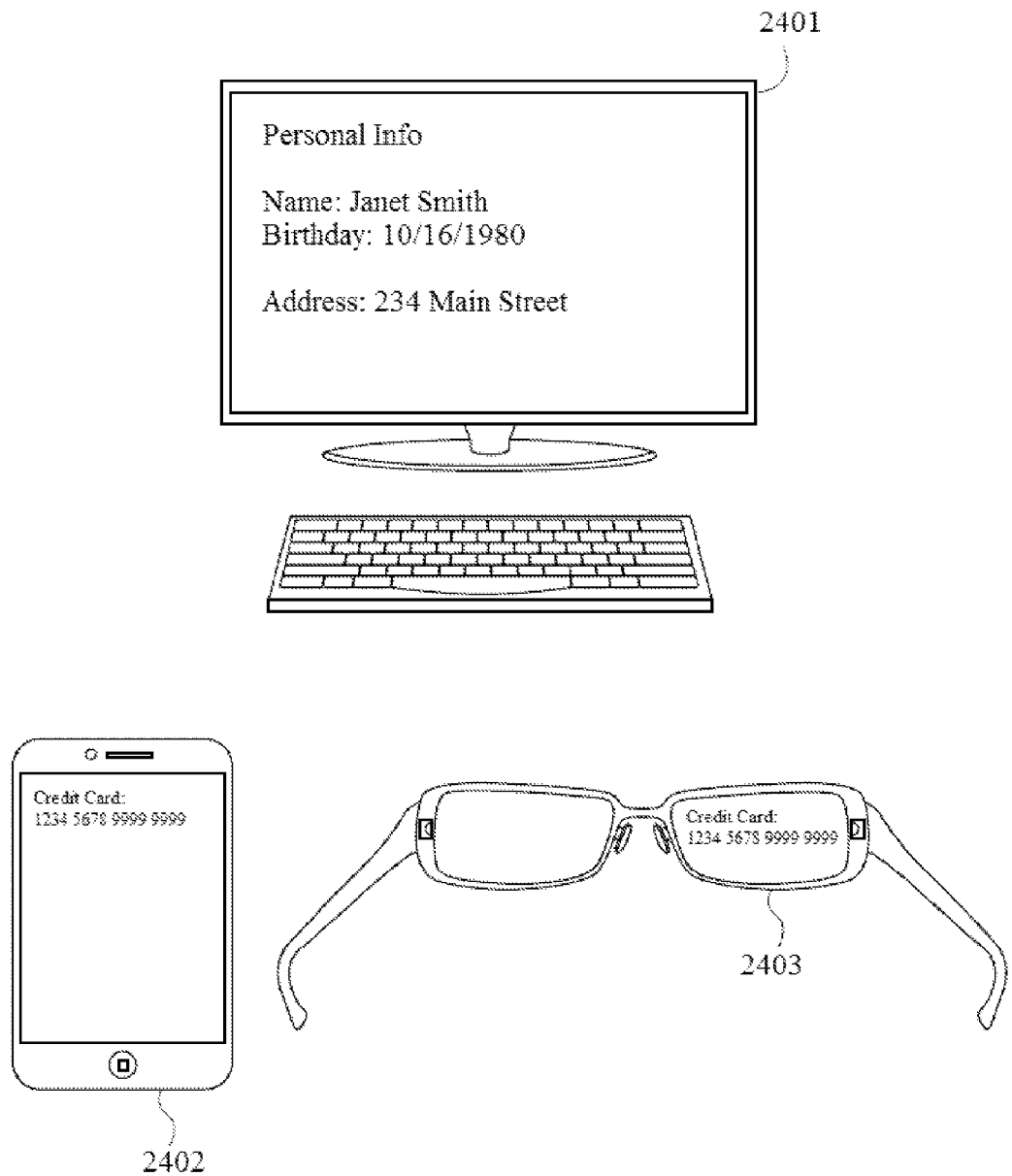
Figure 24C:
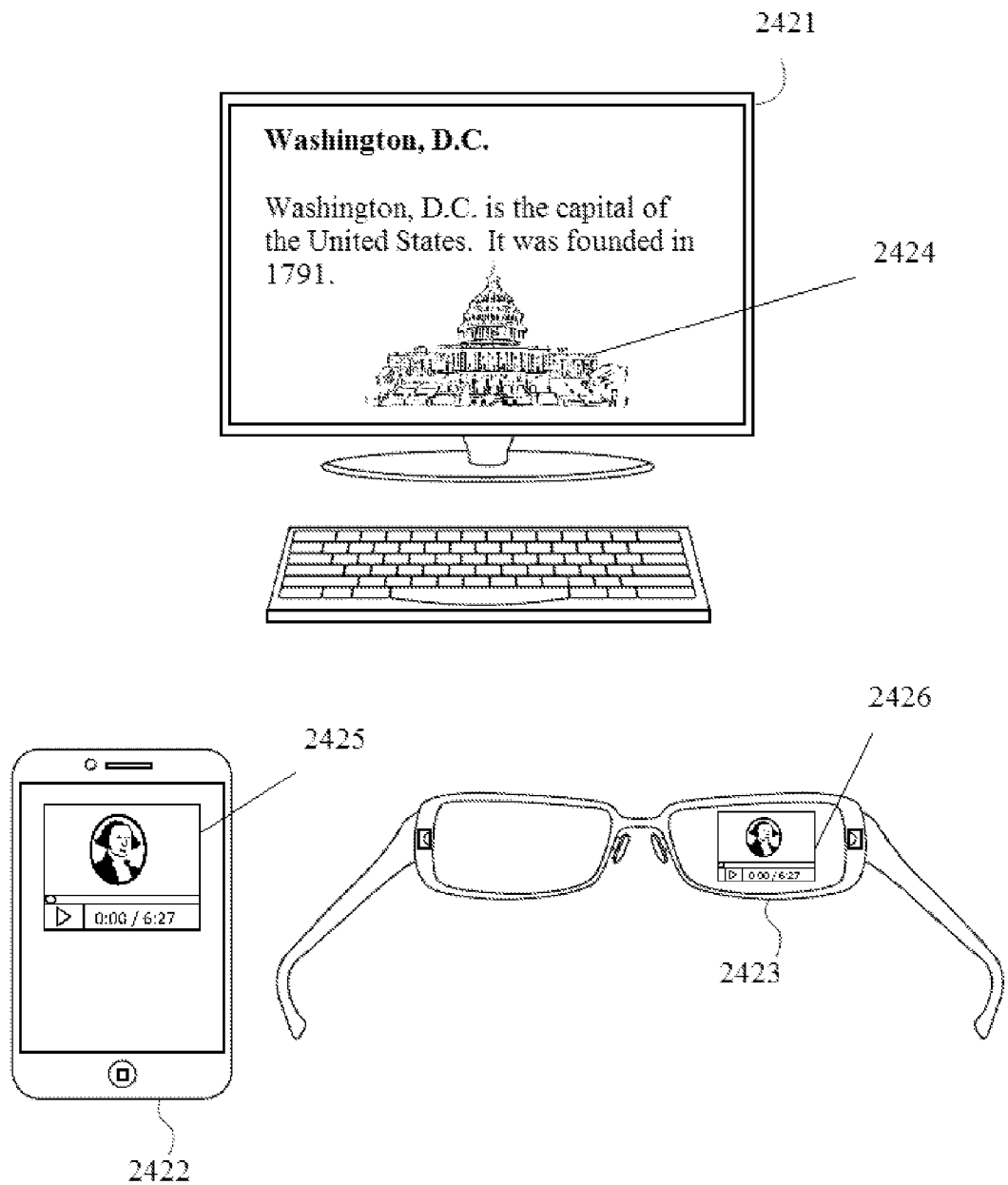

FIGS. 24A-C show example applications illustrated in an environment including a desktop computer and a mobile phone and electronic glasses. The desktop computer is acting as a first computer in these examples. The mobile phone and electronic glasses are acting as a second computer in these examples. Both a mobile phone and electronic glasses are shown for illustrative purposes, though the features herein may be practiced with one first computer and one second computer. The following examples may be practiced with just a desktop computer and either the mobile phone or electronic glasses.

FIG. 24A illustrates an exemplary webpage for showing a house that is for sale. The first computer 2411 downloads a webpage including code for displaying webpage elements on a first computer 2411 and a second computer. The first computer 2411 displays the address, price, listing date, and an image of the outside of the house 2418.

The webpage code may specify additional information to show on the second computer. In this example, the webpage code specifies interior views of the house, such as images 2414, 2415, that should be shown on a second computer such as mobile phone 2412. Image 2414 shows a living room of the house and image 2415 shows a bedroom.

Glasses 2413 is also illustrated showing the interior images of the house 2416, 2417, reflecting a living room and bedroom.

FIG. 24B illustrates an exemplary webpage showing personal information of a user. For privacy purposes, it may be desirable to show some non-sensitive information on a first computer and show private information on a second computer. If the user is in a public place, it may be desirable to show private information only on a second computer that is more difficult for bystanders to observe.

The first computer 2401 downloads a webpage including code for displaying webpage elements on a first computer 2401 and a second computer. The first computer displays some information about a user "Janet Smith."

The webpage code may specify additional private information to show on the second computer. In this example, the webpage code specifies that the user's credit card information be shown on the second computer, such as mobile phone 2402 or glasses 2403. The user may thus better protect her credit card number from observation by bystanders. A webpage might specify other private information to display on a second computer such as a social security number, bank account number, or password.

FIG. 24C illustrates a webpage describing Washington, D.C. To provide a more immersive experience to the user, the webpage may specify some elements to be displayed on the first computer 2421 and other elements to be displayed on a second computer such as mobile phone 2422 or glasses 2423.

In this example, first computer 2421 downloads a webpage including code for displaying webpage elements on a first computer and second computer. The first computer displays content such as a description of Washington, D.C. and a picture of the Capitol building 2424.

The webpage provides for additional content to be displayed on a second computer. The second computer, such as mobile phone 2422, displays a video 2425 about George Washington that is specified by the webpage. The video 2425 may be specified by tags in a markup language or provided by plug-ins or other computer programs.

Glasses 2423 is also illustrated displaying the video 2426 specified by the webpage.

VI. Exemplary Embodiments

Following is a listing of some exemplary embodiments. These examples are non-limiting.

---
Some Example Embodiments
---

1) A method for downloading a webpage to a first computer system and displaying elements of the webpage on the first computer system and a second computer system, the first computer system connected to a web server over a network, the first computer system including a web browser, the method comprising:
pairing the first computer system and the second
computer system to open a communications channel between the first computer system and the second computer system, where the first computer system is physically separate from the second computer system; using a key exchange protocol to establish a shared secret with the second computer system for encrypting the communications channel, and encrypting the communications channel;
storing an indication in the first computer system that the second computer system is a paired device;
receiving at the web browser a request from a user to access a webpage;
in response to the user's request, downloading a webpage file from the web server by accesses over the network;
parsing the webpage file by the web browser, and determining that the webpage file includes a portion of HyperText Markup Language ---
-continued Some Example Embodiments
---

(HTML) code for displaying webpage elements on the second computer system,
the portion of HTML code for displaying webpage elements
on the second computer system delimited by one or more HTML tags
that identify the HTML code as being for displaying webpage elements
on the second computer system;
creating a Document Object Model (DOM) object representing the
portion of HTML code for displaying webpage elements on the second
computer system, and making the DOM object accessible to scripting code
via a DOM of the web browser;
transmitting to the second computer system over the encrypted
communications channel an indication of the portion of HTML code
for displaying webpage elements on the second computer system,
whereby the first computer system enables the second computer system
to display webpage elements corresponding
to the portion of HTML code for displaying webpage elements on the
second computer system;
determining that the webpage file includes a portion of HTML code
for displaying webpage elements on the first computer system;
displaying at the first computer system webpage elements corresponding
to the portion of HTML code for displaying webpage elements on the
first computer system.
2) A method for downloading a webpage to a first computer system and
displaying elements of the webpage on the first computer system and a
second computer system, the first computer system connected to a web
server over a network, the first computer system including a web browser,
the method comprising:
pairing the first computer system and the second
computer system to open a communications channel between the first
computer system and the second computer system, where the first
computer system is physically separate from the second computer system;
using a key exchange protocol to establish a shared secret with the second
computer system for encrypting the communications channel, and
encrypting the communications channel;
storing an indication in the first computer system that the second
computer system is a paired device;
receiving at the first computer system a request from a user to access
a webpage;
in response to the user's request, downloading a first
webpage file from the web server by accesses over the network;
parsing the first webpage file, and determining that the first
webpage file includes an HTML tag identifying a second
webpage file, wherein the HTML tag identifies that the second
webpage file includes a portion of HTML code for displaying webpage
elements on the second computer system;
downloading the second webpage file by accesses over the network;
transmitting to the second computer system over the encrypted
communications channel an indication of the portion of HTML code
for displaying webpage elements on the second computer system from
the second webpage file, whereby the first computer system enables the
second computer system to display webpage elements corresponding to
the portion of HTML code for displaying webpage elements on the
second computer system; determining that the first webpage file
includes a portion of HTML code for displaying webpage elements on
the first computer system; displaying at the first computer system
webpage elements corresponding to the portion of HTML code for
displaying webpage elements on the first computer system.
3) A method for downloading a webpage to a first computer system
and displaying elements of the webpage on the first computer system
and a second computer system, the first computer system connected to
a web server over a network, the first computer system including a web
browser, the method comprising: pairing the first computer system and
the second computer system to open a communications channel between
the first computer system and the second computer system, where the first
computer system is physically separate from the second computer system;
using a key exchange protocol to establish a shared secret with the second
computer system for encrypting the communications channel,
and encrypting the communications channel;
storing an indication in the first computer system that the second
computer system is a paired device;
receiving at the first computer system a request from a user to access
a webpage; in response to the user's request, downloading a webpage
file from the web server by accesses over the network;
parsing the webpage file, the webpage file including a portion of
Javascript code for displaying webpage elements on the second computer
system, the portion of Javascript code including a reference to a
Document Object Model (DOM) object corresponding to the second

| Some Example Embodiments |
|---|
| computer system and including calls to one or more methods of the DOM object to add webpage elements to the DOM object for display on the second computer system; using a Javascript interpreter to interpret and run the portion of Javascript code; transmitting to the second computer system over the encrypted communications channel a representation of webpage elements for display on the second computer system, whereby the first computer system enables the second computer system to display webpage elements specified by the portion of Javascript code for displaying webpage elements on the second computer system; determining that the webpage file includes a portion of HTML code for displaying webpage elements on the first computer system; displaying at the first computer system webpage elements corresponding to the portion of HTML code for displaying webpage elements on the first computer system.
4) A method for downloading a webpage to a first computer system and displaying elements of the webpage on the first computer system and a second computer system, the first computer system connected to a web server over a network, the first computer system including a web browser, the method comprising:
pairing the first computer system and the second computer system to open a communications channel between the first computer system and the second computer system, where the first computer system is physically separate from the second computer system; using a key exchange protocol to establish a shared secret with the second computer system for encrypting the communications channel, and encrypting the communications channel;
storing an indication in the first computer system that the second computer system is a paired device;
receiving at the first computer system a request from a user to access a webpage; in response to the user's request, downloading a first webpage file from the web server by accesses over the network;
parsing the first webpage file, and determining that the first webpage file includes an HTML tag identifying a second webpage file, wherein the HTML tag identifies that the second webpage file contains scripting code; downloading the second webpage file by accesses over the network; parsing the second webpage file, the second webpage file including a portion of Javascript code for displaying webpage elements on the second computer system, the portion of Javascript code including a reference to a Document Object Model (DOM) object corresponding to the second computer system and including calls to one or more methods of the DOM object to add webpage elements to the DOM object for display on the second computer system; using a Javascript interpreter to interpret and run the portion of Javascript code; transmitting to the second computer system over the encrypted communications channel a representation of webpage elements for display on the second computer system, whereby the first computer system enables the second computer system to display webpage elements specified by the portion of Javascript code for displaying webpage elements on the second computer system; determining that the first webpage file includes a portion of HTML code for displaying webpage elements on the first computer system; displaying at the first computer system webpage elements corresponding to the portion of HTML code for displaying webpage elements on the first computer system.
5) A method for downloading a webpage to a first computer system and displaying elements of the webpage on the first computer system and a second computer system, the first computer system connected to a web server over a network, the first computer system including a web browser, the method comprising: pairing the first computer system and the second computer system to open a communications channel between the first computer system and the second computer system, where the first computer system is physically separate from the second computer system; using a key exchange protocol to establish a shared secret with the second computer system for encrypting the communications channel, and encrypting the communications channel;
storing an indication in the first computer system that the second computer system is a paired device;
receiving at the web browser a request from a user to access a webpage; in response to the user's request, downloading a webpage file from the web server by accesses over the network;
parsing the webpage file by the web browser, and determining that the webpage file includes a portion of HyperText Markup Language (HTML) code for displaying webpage elements on the second computer system, the portion of HTML code for displaying webpage elements on the second computer system delimited by one or more HTML tags that identify the HTML code as being for displaying webpage elements on the second computer system;
creating a Document Object Model (DOM) object representing the portion of HTML code for displaying webpage elements on the second computer system, and making the DOM object accessible to scripting code via a DOM of the web browser;
transmitting to the second computer system over the encrypted communications channel an indication of the portion of HTML code for displaying webpage elements on the second computer system, whereby the first computer system enables the second computer system to display webpage elements corresponding to the portion of HTML code for displaying webpage elements on the second computer system; determining that the webpage file includes a portion of HTML code for displaying webpage elements on the first computer system; displaying at the first computer system webpage elements corresponding to the portion of HTML code for displaying webpage elements on the first computer system;
enabling scripting code executing on the second computer system to access one or more DOM objects on the first computer system by: receiving a request, initiated by scripting code executed on the second computer system, to call a method of a DOM object on the first computer system;
calling the requested method of the DOM object on the first computer and transmitting a return value to the second computer system.
6) A method for downloading a webpage to a first computer system and displaying elements of the webpage on the first computer system and a second computer system, the first computer system connected to a web server over a network, the first computer system including a web browser, the method comprising: pairing the first computer system and the second computer system to open a communications channel between the first computer system and the second computer system, where the first computer system is physically separate from the second computer system; using a key exchange protocol to establish a shared secret with the second computer system for encrypting the communications channel, and encrypting the communications channel;
storing an indication in the first computer system that the second computer system is a paired device;
receiving at the web browser a request from a user to access a webpage; in response to the user's request, downloading a webpage file from the web server by accesses over the network;
parsing the webpage file by the web browser, and determining that the webpage file includes a portion of HyperText Markup Language (HTML) code for displaying webpage elements on the second computer system, the portion of HTML code for displaying webpage elements on the second computer system delimited by one or more HTML tags that identify the HTML code as being for displaying webpage elements on the second computer system;
creating a Document Object Model (DOM) object representing the portion of HTML code for displaying webpage elements on the second computer system, and making the DOM object accessible to scripting code via a DOM of the web browser;
transmitting to the second computer system over the encrypted communications channel an indication of the portion of HTML code for displaying webpage elements on the second computer system, whereby the first computer system enables the second computer system to display webpage elements corresponding to the portion of HTML code for displaying webpage elements on the second computer system; determining that the webpage file includes a portion of HTML code for displaying webpage elements on the first computer system; displaying at the first computer system webpage elements corresponding to the portion of HTML code for displaying webpage elements on the first computer system;
accessing by the first computer system one or more DOM objects on the second computer system by:
transmitting a request, initiated by scripting code executed on the first computer system, to call a method of a DOM object on the second computer system;
receiving a return value for the requested method of the DOM object from the second computer system.
7) A method for downloading a webpage to a first computer system and displaying elements of the webpage on the first computer system and a second computer system, the first computer system connected to a web server over a network, the first computer system including a web browser, the method comprising: pairing the first computer system and the second computer system to open a communications channel between the first computer system and the second computer system, where the first computer system is physically separate from the second computer system;
using a key exchange protocol to establish a shared secret with the second computer system for encrypting the communications channel, |

-continued

Some Example Embodiments and encrypting the communications channel;
storing an indication in the first computer system that the second computer system is a paired device;
receiving at the web browser a request from a user to access a webpage;
in response to the user's request, downloading a webpage file from the web server by accesses over the network;
parsing the webpage file by the web browser, and determining that the webpage file includes a portion of HyperText Markup Language (HTML) code for displaying webpage elements on the second computer system, the portion of HTML code for displaying webpage elements on the second computer system delimited by one or more HTML tags that identify the HTML code as being for displaying webpage elements on the second computer system;
creating a Document Object Model (DOM) object representing the portion of HTML code for displaying webpage elements on the second computer system, and making the DOM object accessible to scripting code via a DOM of the web browser;
transmitting to the second computer system over the encrypted communications channel an indication of the portion of HTML code for displaying webpage elements on the second computer system, whereby the first computer system enables the second computer system to display webpage elements corresponding to the portion of HTML code for displaying webpage elements on the second computer system;
receiving an indication from the second computer system that the second computer system has finished loading the webpage elements for display on the second computer system;
determining that the webpage file includes a portion of HTML code for displaying webpage elements on the first computer system;
loading at the first computer system webpage elements corresponding to the portion of HTML code for displaying webpage elements on the first computer system;
after receiving the indication that the second computer system has finished loading the webpage elements for display on the second computer system and finishing loading the webpage elements corresponding to the portion of HTML code for displaying webpage elements on the first computer system, triggering a finished loading event at the first computer system; calling an event handler bound to the finished loading event at the first computer system;
displaying at the first computer system webpage elements corresponding to the portion of HTML code for displaying webpage elements on the first computer system.
8) A method for downloading a webpage to a first computer system and displaying elements of the webpage on the first computer system and a second computer system, the first computer system connected to a web server over a network, the method comprising:
downloading a webpage from the web server by accesses over the network; parsing the webpage and determining that the webpage includes code for displaying webpage elements on the second computer system; transmitting to the second computer system an indication of one or more webpage elements for display on the second computer system, whereby the first computer system enables the second computer system to display the one or more webpage elements for display on the second computer system;
determining that the webpage includes code for displaying webpage elements on the first computer system;
displaying at the first computer system one or more webpage elements for display on the first computer system.
9) Non-transitory computer readable mediums containing instructions for performing the above methods.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims.

What is claimed:

1. A method for downloading a webpage to a first computer system and displaying elements of the webpage on the first computer system and a second computer system, the first computer system connected to a web server over a network, the first computer system including a web browser, the method comprising:
   receiving at the web browser of the first computer system a request from a user to access a webpage;
   in response to the user's request, downloading a webpage file from the web server by accesses over the network;
   parsing the webpage file by the web browser, and determining that the webpage file includes a portion of HyperText Markup Language (HTML) code for displaying webpage elements on the second computer system, wherein the portion of HTML code for displaying webpage elements on the second computer system is delimited by one or more HTML tags that identify the HTML code as being for displaying webpage elements on the second computer system;
   transmitting to the second computer system over a communications channel an indication of the portion of HTML code for displaying webpage elements on the second computer system, whereby the first computer system enables the second computer system to display webpage elements corresponding to the portion of HTML code for displaying webpage elements on the second computer system;
   determining that the webpage file includes a portion of HTML code for displaying webpage elements on the first computer system;
   receiving an indication from the second computer system that the second computer system has finished loading the webpage elements to be displayed on the second computer system;
   loading at the first computer system webpage elements corresponding to the portion of HTML code for displaying webpage elements on the first computer system;
   after receiving the indication that the second computer system has finished loading the webpage elements to be displayed on the second computer system and finishing loading the webpage elements corresponding to the portion of HTML code for displaying webpage elements on the first computer system, triggering a finished loading event at the first computer system;
   calling an event handler bound to the finished loading event at the first computer system;
   displaying at the first computer system webpage elements corresponding to the portion of HTML code for displaying webpage elements on the first computer system.

2. The method of claim 1, further comprising creating a Document Object Model (DOM) object representing the portion of HTML code for displaying webpage elements on the second computer system, and making the DOM object accessible to script code via a DOM of the web browser.

3. The method of claim 2, wherein the webpage includes script code that, when executed, manipulates the DOM object representing the portion of HTML code for displaying webpage elements on the second computer system.

4. The method of claim 1, wherein the portion of HTML code for displaying webpage elements on the second computer system is preceded by an opening tag and followed by a closing tag, the opening tag and closing tag identifying the HTML code as being for displaying webpage elements on the second computer system.

5. The method of claim 1, wherein the event handler bound to the finished loading event causes the display of one or more webpage elements on the first computer system.

6. The method of claim 1, further comprising:
the first computer system enabling script code executed on the second computer system to access one or more DOM objects on the first computer system by:
- receiving a request, initiated by script code executed on the second computer system, to call a method of a DOM object on the first computer system;
- calling the requested method of the DOM object on the first computer system and transmitting a return value to the second computer system.

7. The method of claim 1, further comprising:
accessing by the first computer system one or more DOM objects on the second computer system by:
- transmitting a request, initiated by script code executed on the first computer system, to call a method of a DOM object on the second computer system;
- receiving a return value for the requested method of the DOM object from the second computer system.

8. The method of claim 1, further comprising:
parsing the webpage file by the web browser, and determining that the webpage file includes a portion of HTML code for displaying webpage elements on a third computer system, wherein the portion of HTML code for displaying webpage elements on the third computer system is delimited by one or more HTML tags that identify the HTML code as being for displaying webpage elements on the third computer system;

transmitting to the third computer system over a communications channel an indication of the portion of HTML code for displaying webpage elements on the third computer system, whereby the first computer system enables the third computer system to display webpage elements corresponding to the portion of HTML code for displaying webpage elements on the third computer system.

9. The method of claim 1, wherein the HTML code for displaying webpage elements on the second computer system includes code for displaying a video on the second computer system.

* * * * *